(12) United States Patent
Sievers et al.

(10) Patent No.: US 11,249,269 B2
(45) Date of Patent: Feb. 15, 2022

(54) MULTI-LEVEL OPTICAL CASSETTE

(71) Applicant: CommScope Technologies LLC, Hickory, NC (US)

(72) Inventors: Scott C. Sievers, Jordan, MN (US); Jonathan R. Kaml, Shakopee, MN (US)

(73) Assignee: CommScope Technologies LLC, Hickory, NC (US)

(*) Notice: Subject to any disclaimer, the term of this patent is extended or adjusted under 35 U.S.C. 154(b) by 35 days.

(21) Appl. No.: 16/540,681

(22) Filed: Aug. 14, 2019

(65) Prior Publication Data

US 2020/0057226 A1   Feb. 20, 2020

Related U.S. Application Data

(60) Provisional application No. 62/811,786, filed on Feb. 28, 2019, provisional application No. 62/718,466, filed on Aug. 14, 2019.

(51) Int. Cl.
*G02B 6/44* (2006.01)

(52) U.S. Cl.
CPC .................. *G02B 6/4455* (2013.01)

(58) Field of Classification Search
CPC .. G02B 6/4452; G02B 6/4453; G02B 6/4454; G02B 6/4455
USPC ........................................................ 385/135
See application file for complete search history.

(56) References Cited

U.S. PATENT DOCUMENTS

| | | | | |
|---|---|---|---|---|
| 5,530,786 A | * | 6/1996 | Radliff | G02B 6/3801 385/136 |
| 5,778,132 A | * | 7/1998 | Csipkes | H01S 3/06704 359/341.1 |
| 6,810,193 B1 | * | 10/2004 | Muller | G02B 6/4454 385/134 |
| 10,401,584 B2 | * | 9/2019 | Coan | G02B 6/3897 |
| 10,514,518 B1 | * | 12/2019 | Livingston | G02B 6/3825 |
| 10,795,105 B1 | * | 10/2020 | Li | G02B 6/4454 |
| 10,802,237 B2 | * | 10/2020 | Bakatsias | G02B 6/4455 |
| 2009/0257727 A1 | * | 10/2009 | Laurisch | G02B 6/4453 385/135 |
| 2012/0328258 A1 | * | 12/2012 | Barron | G02B 6/4454 385/135 |
| 2013/0315549 A1 | * | 11/2013 | Rudenick | G02B 6/4454 385/135 |
| 2014/0205254 A1 | * | 7/2014 | Rudenick | G02B 6/4452 385/135 |
| 2017/0235076 A1 | * | 8/2017 | Solheid | H04Q 1/14 385/135 |
| 2018/0095232 A1 | * | 4/2018 | Feng | G02B 6/4452 |

(Continued)

FOREIGN PATENT DOCUMENTS

| | | | | |
|---|---|---|---|---|
| CA | 2838083 A1 | * | 12/2012 | ......... G02B 6/4469 |
| WO | 2019/079419 A1 | | 4/2019 | |

*Primary Examiner* — Sung H Pak
(74) *Attorney, Agent, or Firm* — Merchant & Gould P.C.

(57) ABSTRACT

An optical cassette includes a body defining a first termination region defined at the first end of the body; a second termination region defined at the second end of the body; a cable routing region disposed at a first level of the body; an optical splice holding region disposed at a second level of the body; and an optical coupler holding region disposed at the second level of the body. The first level is defined by a base of the body and the second level is defined by a divider tray that pivots relative to the body.

18 Claims, 39 Drawing Sheets

(56) References Cited

U.S. PATENT DOCUMENTS

2018/0157000 A1\* 6/2018 Bakatsias ............. G02B 6/4455
2018/0306993 A1\* 10/2018 Hill ...................... G02B 6/4453
2018/0372978 A1   12/2018 Wentworth et al.
2019/0064463 A1\* 2/2019 Bandy .................... G02B 6/445
2019/0250356 A1\* 8/2019 Zhong .................. G02B 6/4454

\* cited by examiner

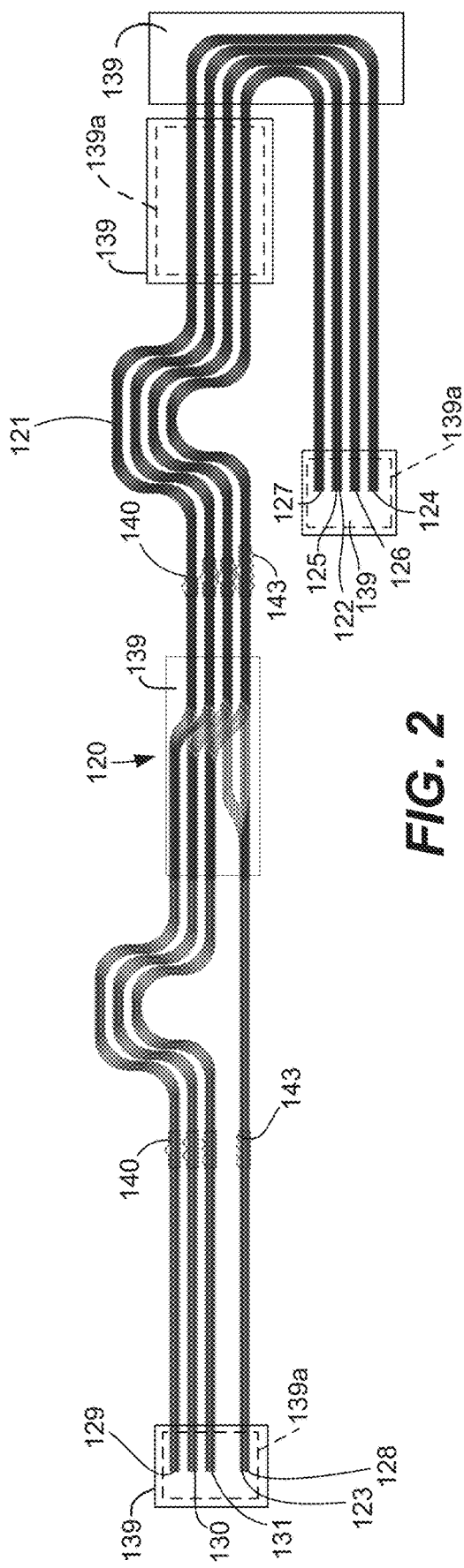
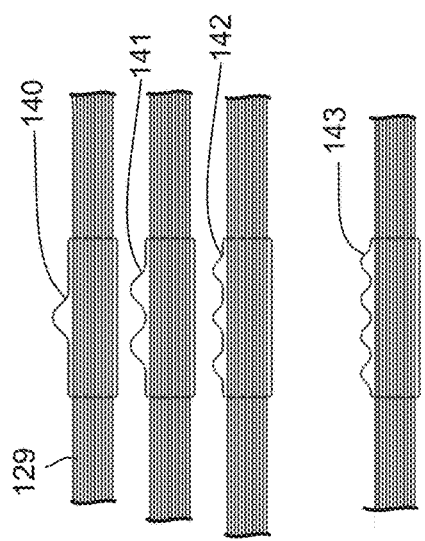
FIG. 2
FIG. 3

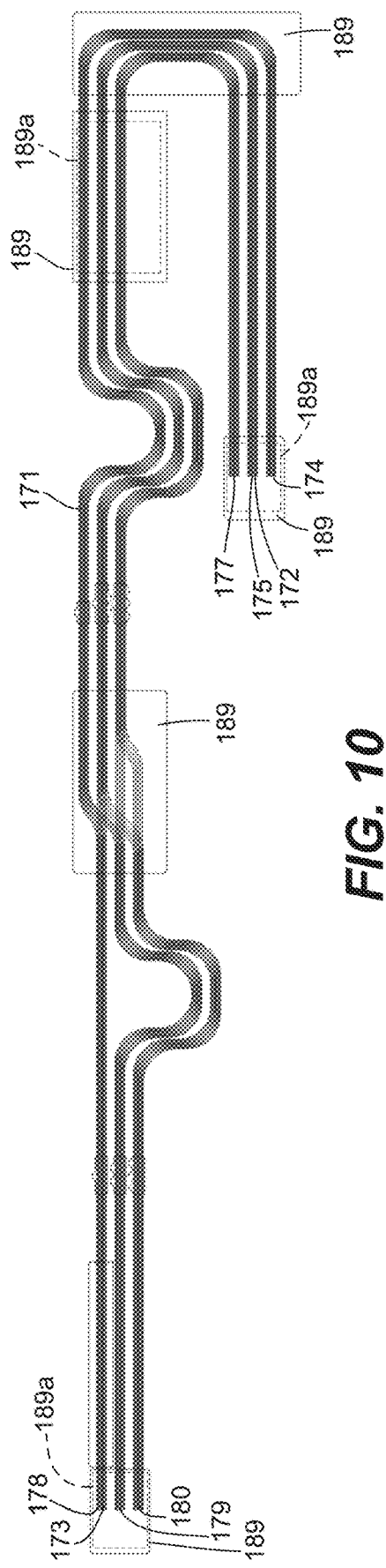
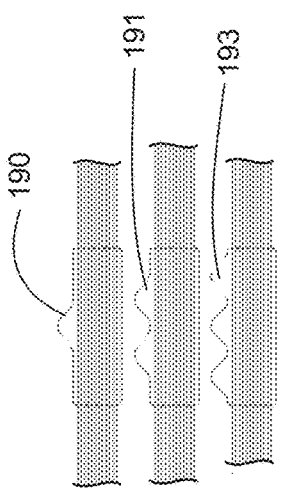
FIG. 10
FIG. 11

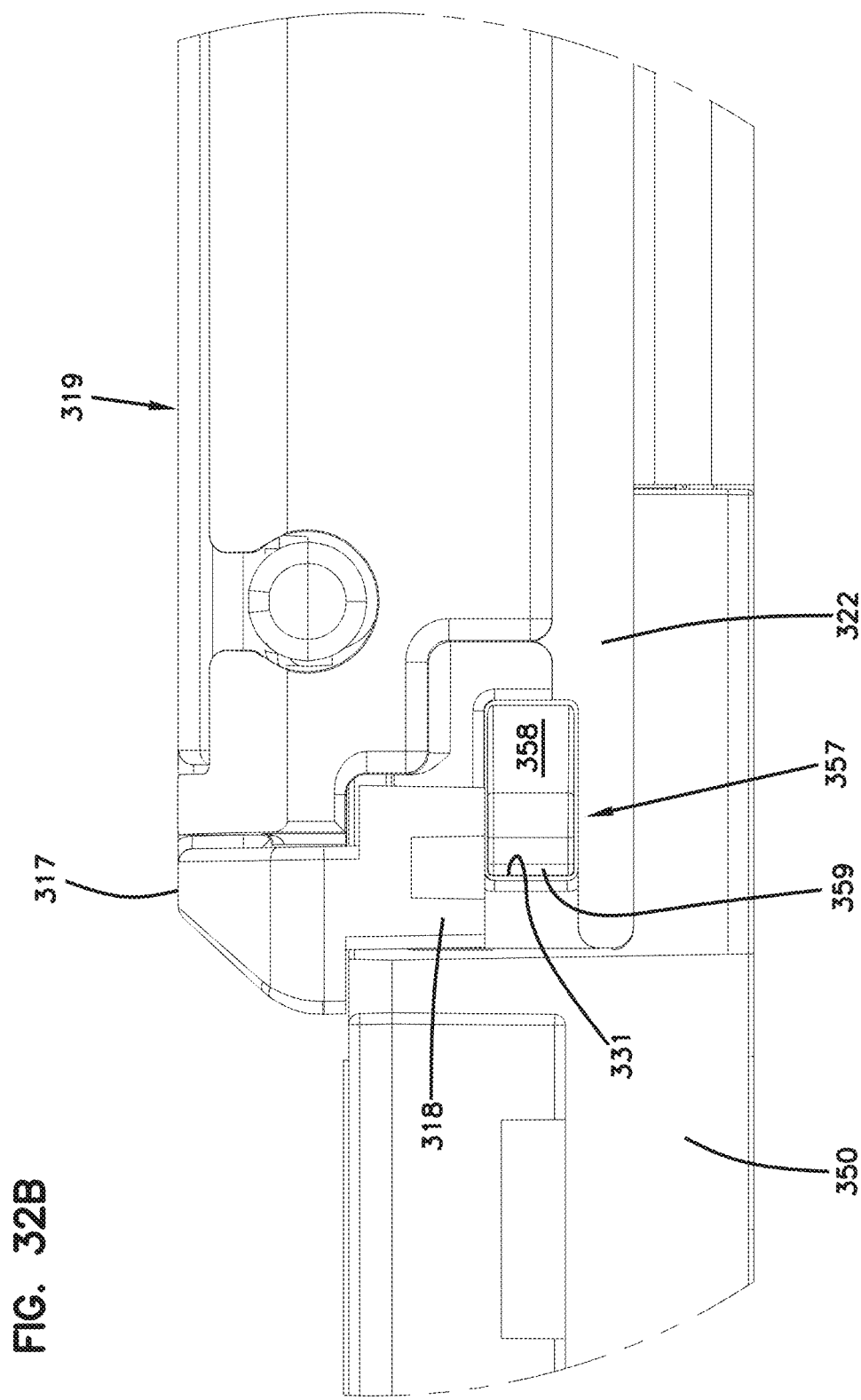

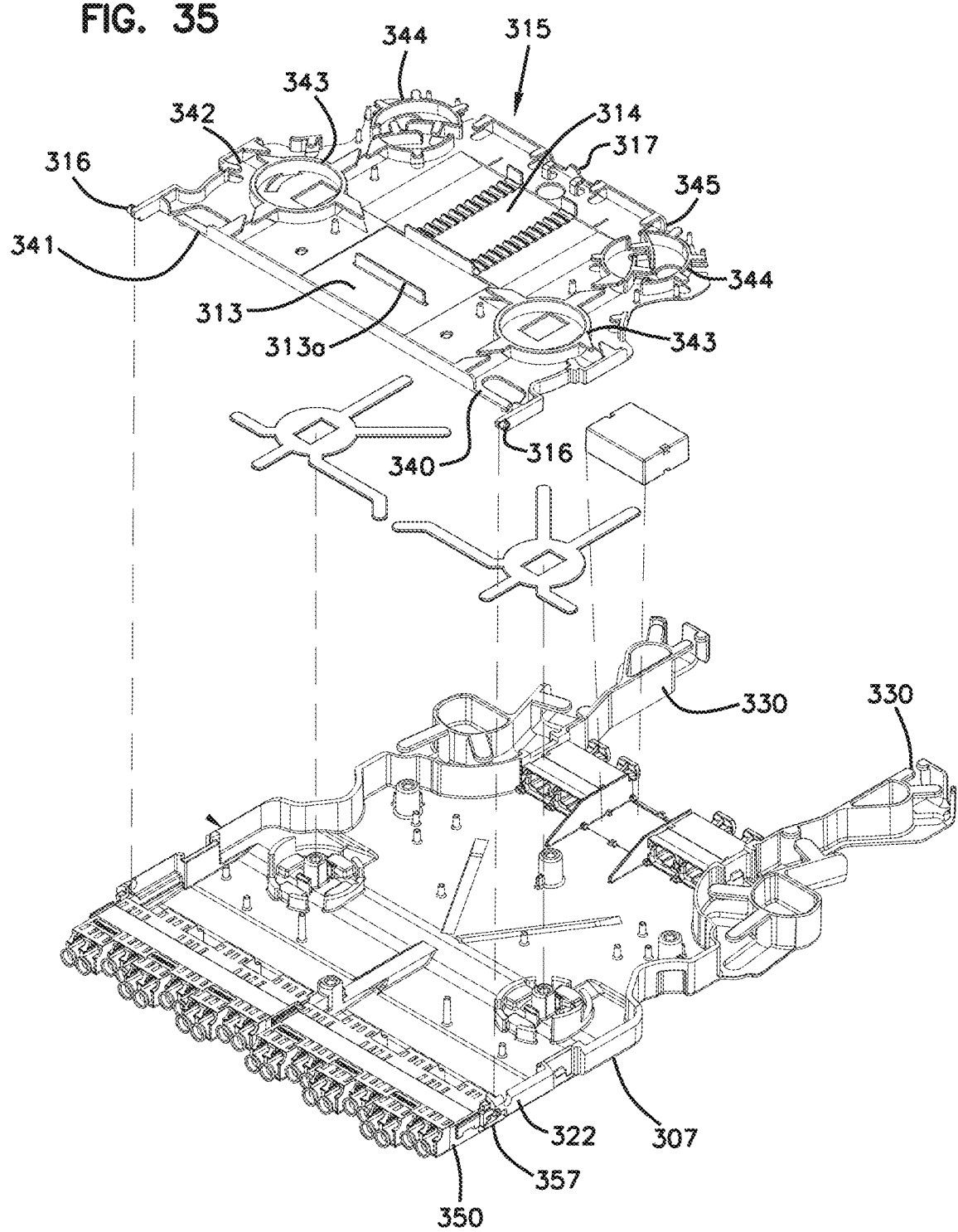

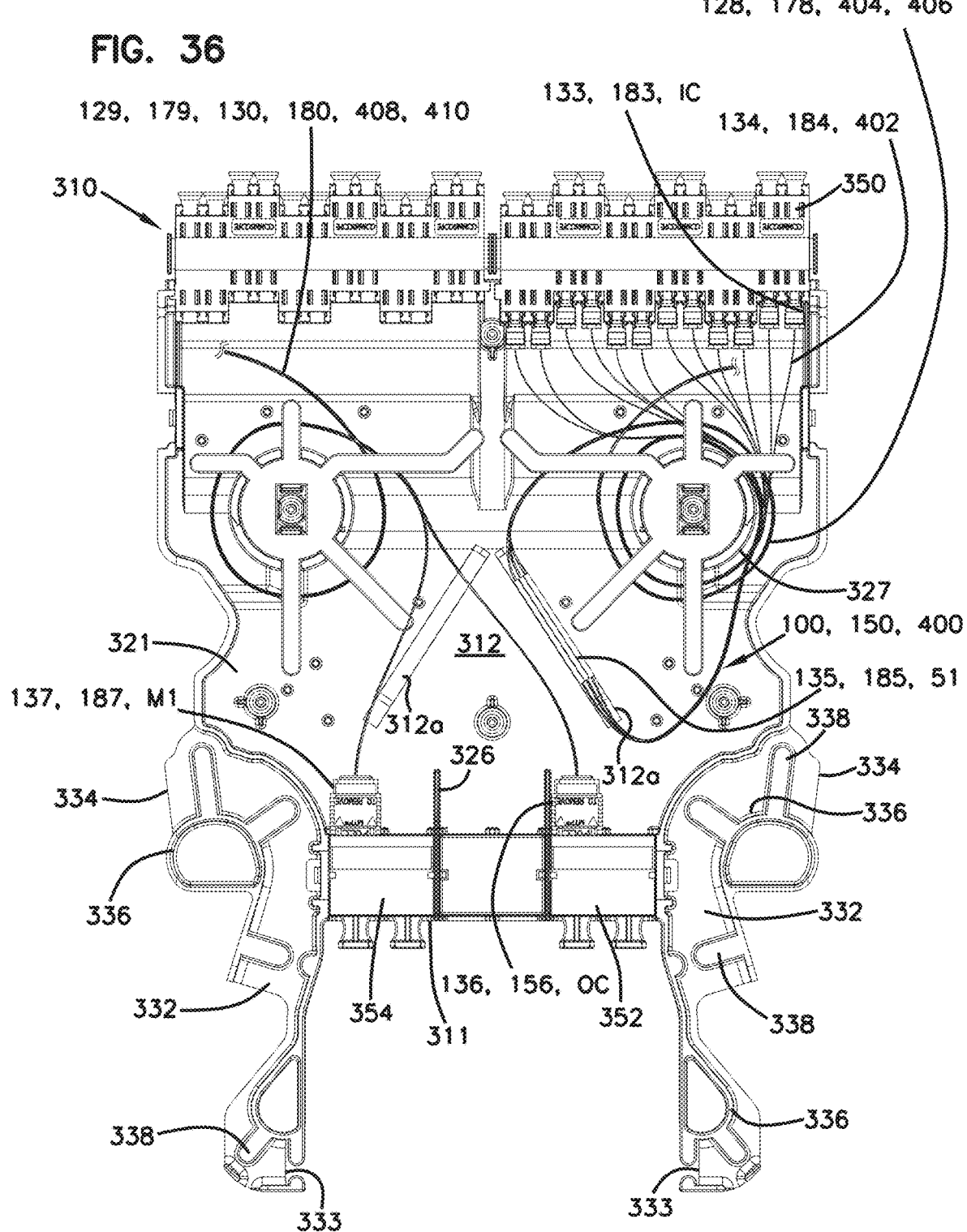

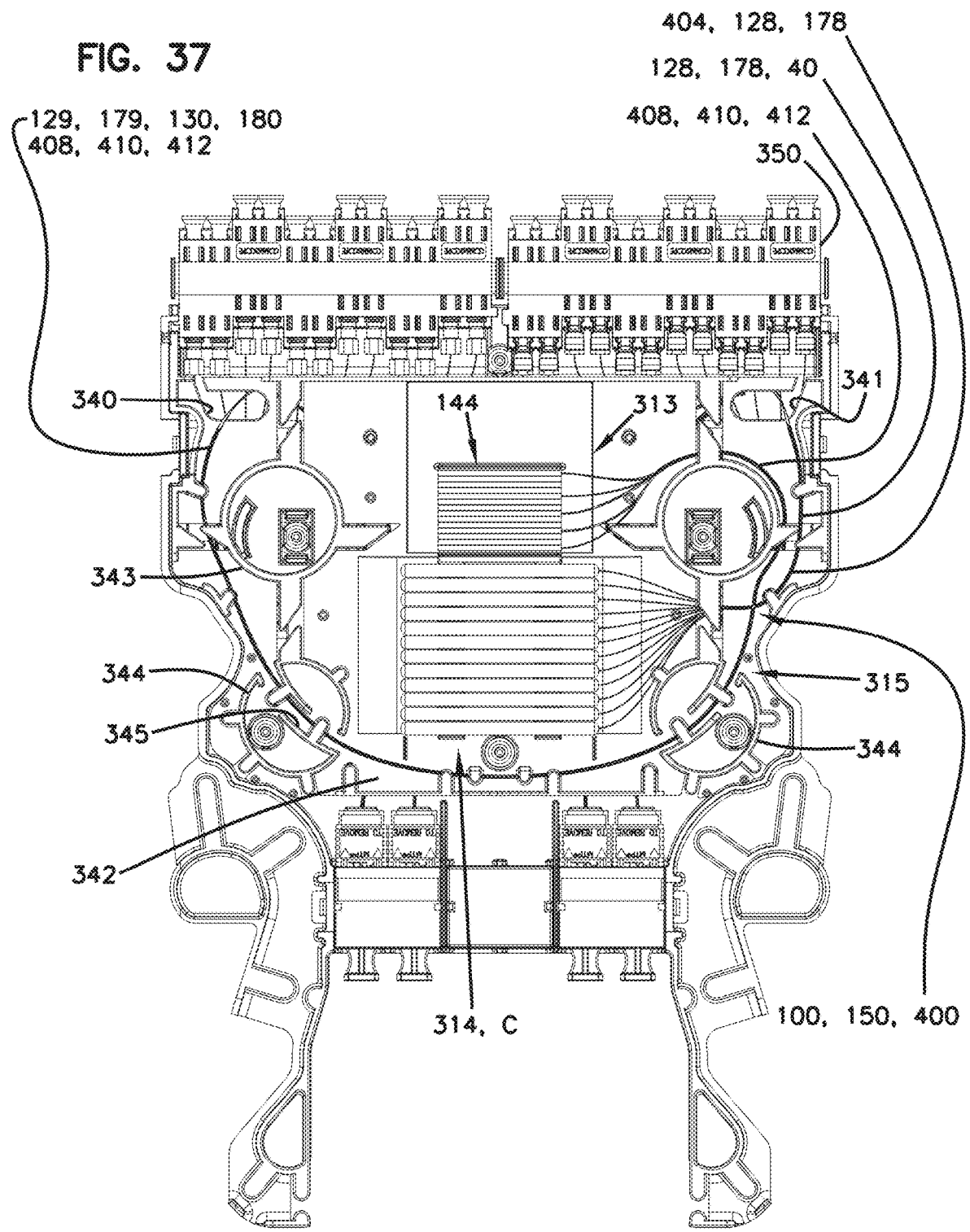

MULTI-LEVEL OPTICAL CASSETTE

CROSS-REFERENCE TO RELATED APPLICATIONS

This application claims the benefit of provisional application Ser. No. 62/718,466, filed Aug. 14, 2018, and provisional application Ser. No. 62/811,786, filed Feb. 28, 2019 which applications are incorporated herein by reference in their entirety.

BACKGROUND

In optical fiber networks, optical signals are transmitted along optical fibers. To monitor the signal level or the conditions of the transmission, a small amount of light can be tapped from the main lines. For example, tapping can be achieved by inserting an optical coating film in the main optical path. The coating film will reflect a small amount of the light being transmitted in the main path, while leaving most of the light transmitted in the main path for communication purposes. This small amount of light that is reflected by the optical coating film is then collected and analyzed in order to monitor the signal level or the conditions of transmission of the optical communication line. Alternatively, optical couplers/splitters can be used to separate out optical signals to be monitored from the optical signals used for communication purposes. Optical couplers/splitters not only split off a portion of optical signals from a main line, but also can add optical signals to the main line.

Improvements are desired.

SUMMARY

An optical cable assembly optically couples at least one input line to at least one output line and to at least one monitoring line. The power of the optical signals received at the input line is split between the output line and the monitoring line.

In accordance with some aspects of the disclosure, an optical cassette has a first termination region at a first end, a second termination region at a second end, and cable management therebetween. In certain examples, the cable management is performed at two different levels (i.e., heights) within the optical cassette. For example, the cable management can be performed on a base of the cassette and on a tray overlaying the base.

In certain examples, the tray can pivot or otherwise move between a closed position and an open position. When closed, the tray blocks access to at least a portion of the first level of the cassette. When open, the tray allows access to the first level of the cassette.

In certain implementations, an optical splice holding region is disposed within the cassette. In certain examples, the optical splice holding region is disposed at the second level within the cassette.

In certain implementations, an optical coupler holding region is disposed within the cassette. In certain examples, the optical coupler holding region is disposed at the second level within the cassette.

In certain implementations, the adapters at the first termination region are different from the adapters at the second termination region. In certain examples, the adapters at the first termination region are single-fiber adapters. In certain examples, the adapters at the second termination region are multi-fiber adapters.

In some implementations, one or more pre-manufactured cable assemblies are installed within the cassette. In certain examples, two cable assemblies are installed within the cassette. In an example, the two cable assemblies are routed along opposite routing schemes. In other implementations, the fibers may be individually installed and routed within the cassette.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE FIGURES

The accompanying drawings, which are incorporated in and constitute a part of the description, illustrate several aspects of the present disclosure. A brief description of the drawings is as follows:

FIG. 2 is a plan view of the first example optical circuit adhesively arranged on one or more substrates to retain the fibers in position;

FIG. 3 is an enlarged view of a portion of FIG. 2;

FIG. 10 is a plan view of the second example optical circuit adhesively arranged on one or more substrates to retain the fibers in position;

FIG. 11 is an enlarged view of a portion of FIG. 10;

FIG. 32B is a side elevational view of the portion of the cassette of FIG. 32A;

FIG. 35 shows the divider tray of the cassette of FIG. 30 exploded away from the base of the cassette;

FIG. 36 is a top plan view of the base of the cassette of FIG. 30 showing cable routing on the first level for a first cable assembly; in particular, a unidirectional cable assembly is shown;

FIG. 37 is a top plan view of the cassette of FIG. 30 showing a first portion of the cable routing on the second level for the first cable assembly, the cable routing is the same for both a unidirectional cable assembly and a bidirectional cable assembly;

DETAILED DESCRIPTION

Figure 1:
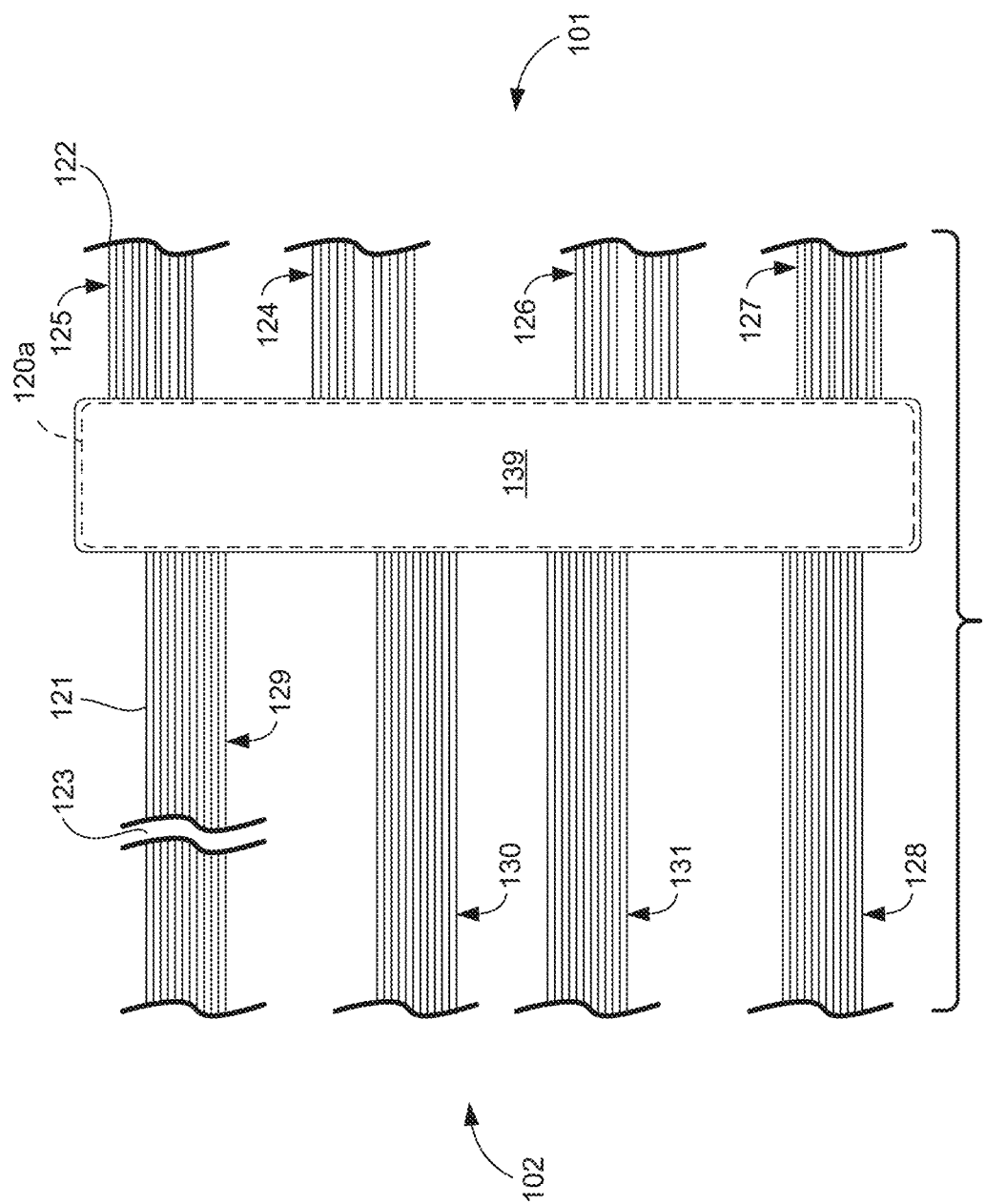
FIG. 1 is a schematic diagram of a first example optical circuit including optical fibers with ribbonized groups of first fiber ends at a first end of the optical circuit and ribbonized groups of second fiber ends at a second end of the optical circuit.
Figure 4:
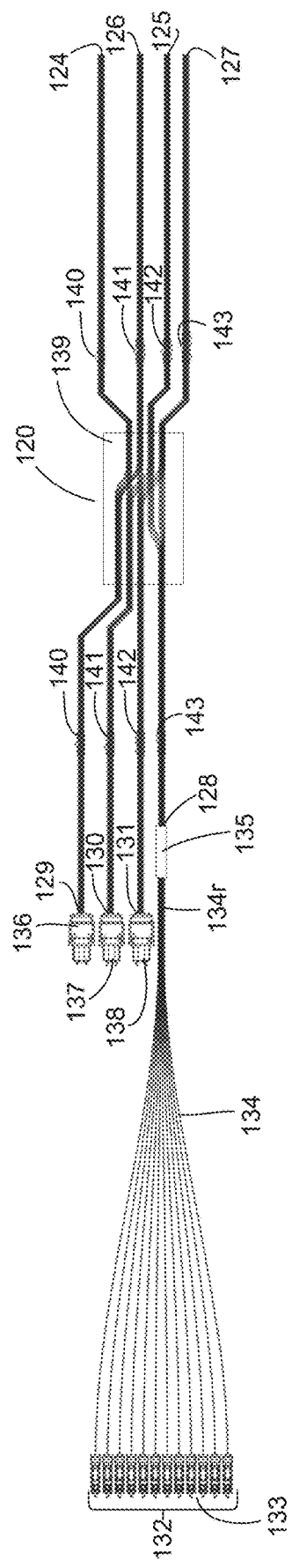
FIG. 4 is a plan view of the first example optical circuit having optical connectors terminating the ribbonized groups at the second end of the optical circuit.
Figure 5:
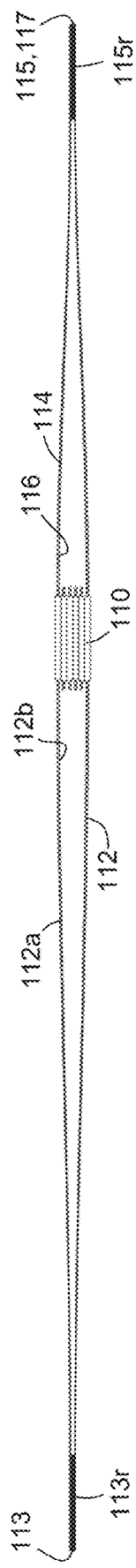
FIG. 5 is a schematic diagram of an optical coupler arrangement including optical couplers each having two coupler input fibers and two coupler output fibers, the input fibers of the optical coupler arrangement being ribbonized together and the output fibers of the optical coupler arrangement being ribbonized together.
Figure 6:
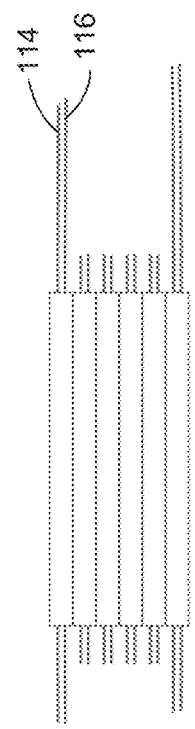
FIG. 6 is an enlarged view of a portion of FIG. 5.
Figure 7:
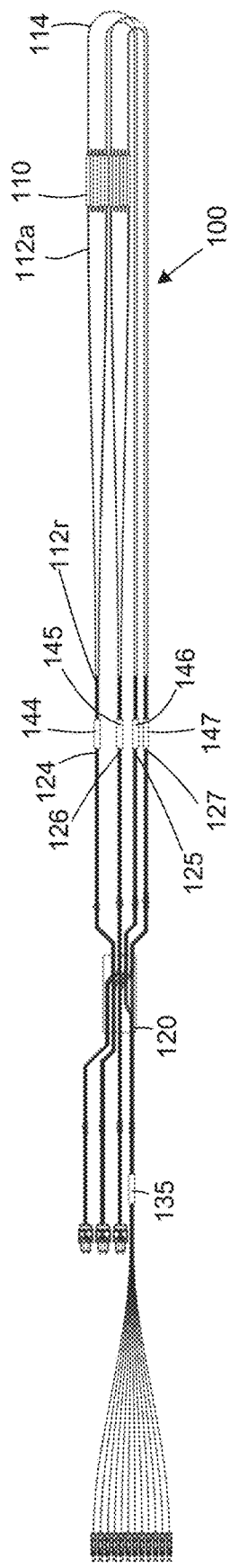
FIG. 7 is a plan view of the first example optical circuit of FIG. 4 spliced to the optical coupler arrangement of FIG. 5 to form a first example cable assembly.

Reference will now be made in detail to exemplary aspects of the present disclosure that are illustrated in the accompanying drawings. Wherever possible, the same reference numbers will be used throughout the drawings to refer to the same or like parts.

The present disclosure is directed to an optical cassette 200 having input lines, output lines, and monitoring lines. Within the optical cassette 200, optical signals received over the input lines from an exterior of the optical cassette 200 are power split onto the output lines and at least some of the monitoring lines. In certain implementations, optical signals received over the output lines from an exterior of the optical cassette 200 are power split onto the input lines and others of the monitoring lines.

In some implementations, the input lines, output lines, and monitoring lines are formed from optical fibers that are separately routed within the optical cassette 200. In other implementations, the input lines, output lines, and monitoring lines are formed by an optical cable assembly, such as either of optical cable assemblies 100, 150 disclosed herein, that is assembled prior to being routed within the optical cassette 200.

In certain implementations, the optical cassette 200 and/or the optical cable assembly 100, 150 can be used for functions other than monitoring (e.g., redundancy). For example, the monitoring connector(s) can be used as redundant output and/or redundant input lines.

Optical Cable Assembly

An optical cable assembly 100, 150 optically couples at least one input line to at least one output line and to at least one monitoring line. The power of the optical signals received at the input line is split between the output line and the monitoring line. In certain implementations, the optical cable assembly 100, 150 optically couples a plurality of input lines to a corresponding number of output lines and a plurality of monitoring lines. For example, the optical cable assembly 100, 150 may optically couple together one or more input connectors 133, 183, one or more output connectors 136, 186, and one or more monitoring connectors 137, 187, 188.

The terms "input" and "output" are not intended to be limiting. Optical signals can travel in both directions between the input line and the output line.

Figure 9:
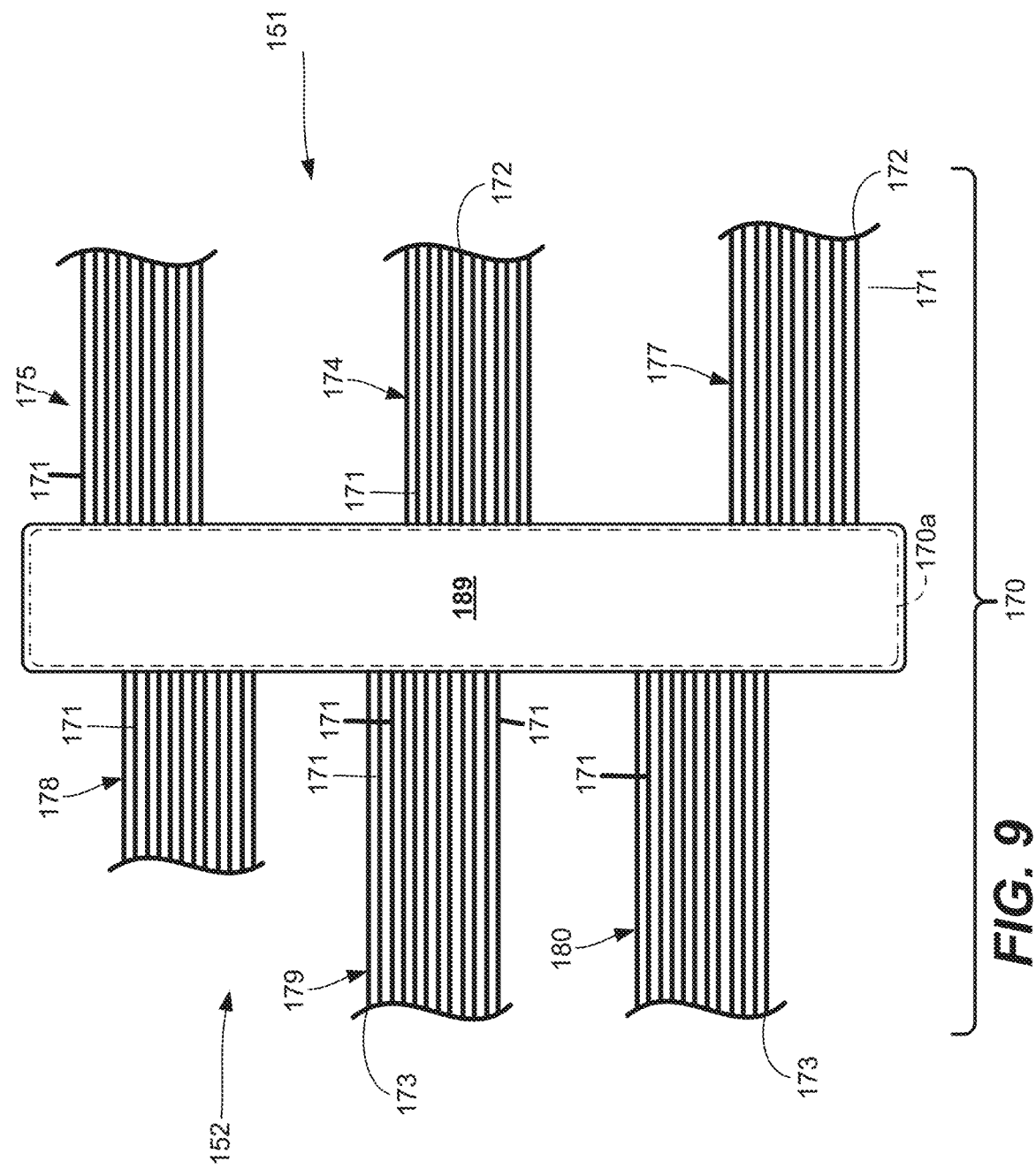
FIG. 9 is a schematic diagram of a second example optical circuit including optical fibers with ribbonized groups of first fiber ends at a first end of the optical circuit and ribbonized groups of second fiber ends at a second end of the optical circuit.
Figure 12:
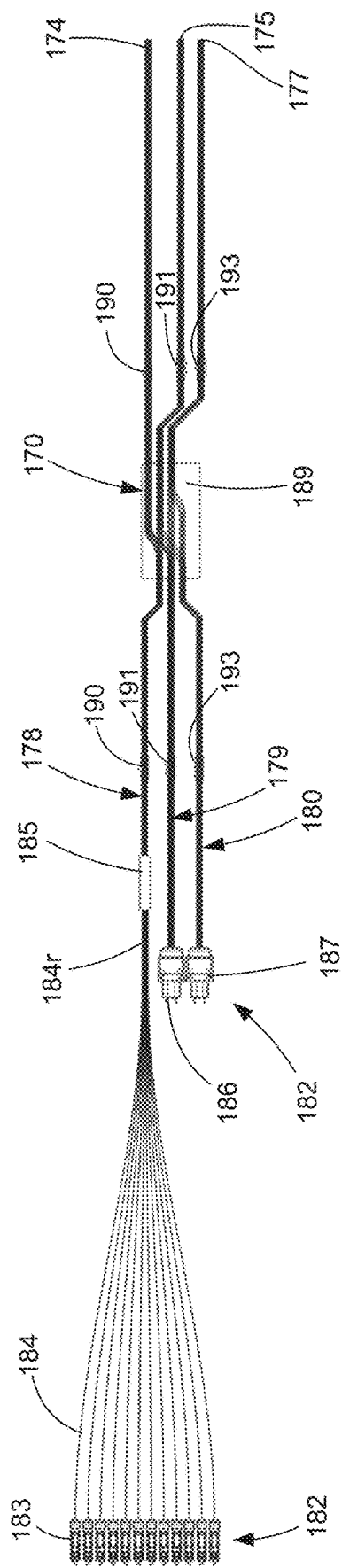
FIG. 12 is a plan view of the second example optical circuit having optical connectors terminating the ribbonized groups at the second end of the optical circuit.
Figure 13:
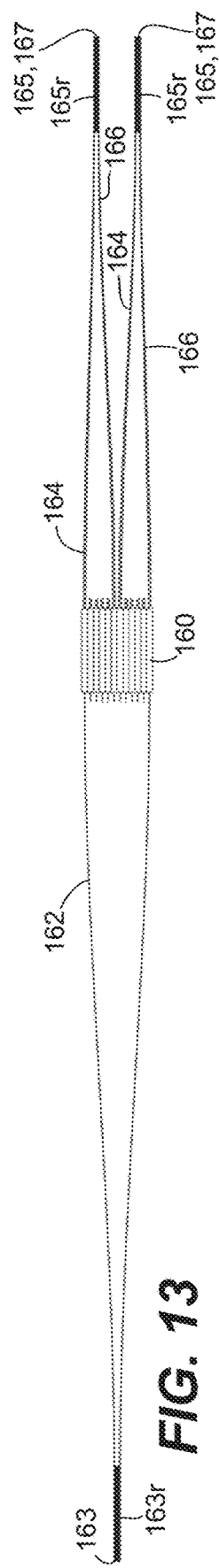
FIG. 13 is a schematic diagram of an optical coupler arrangement including optical couplers each having one coupler input fiber and two coupler output fibers, the input fibers of the optical coupler arrangement being ribbonized together and the output fibers of the optical coupler arrangement being ribbonized together.
Figure 14:
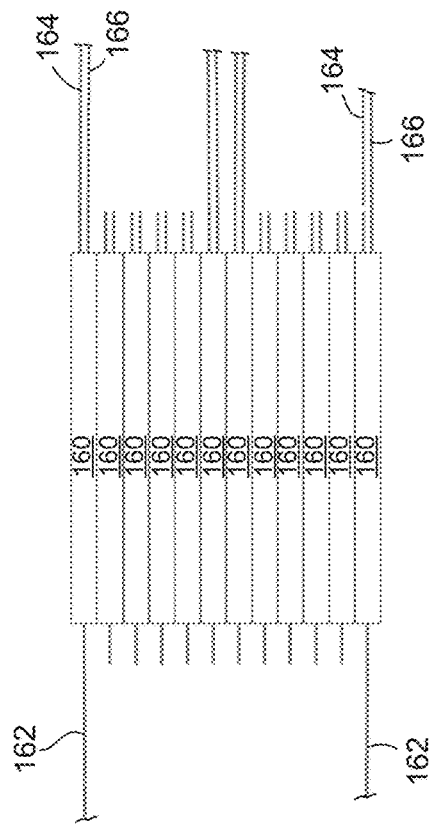
FIG. 14 is an enlarged view of a portion of FIG. 13.
Figure 15:
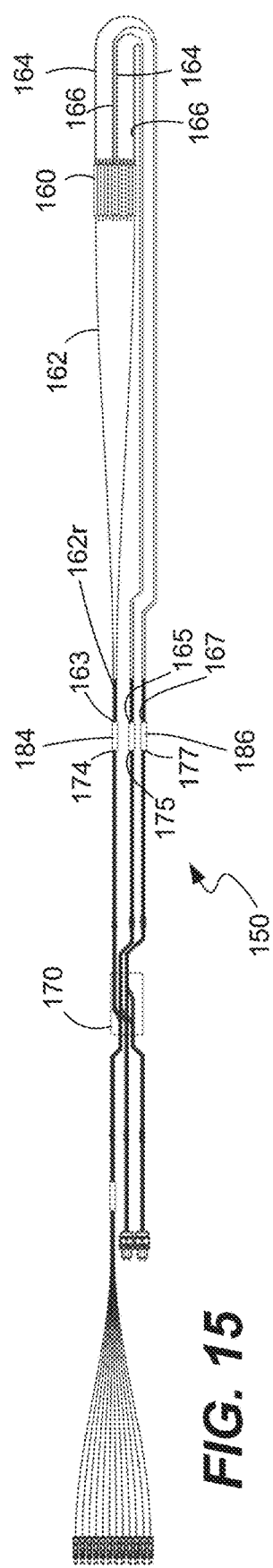
FIG. 15 is a plan view of the second example optical circuit of FIG. 12 spliced to the optical coupler arrangement of FIG. 13 to form a second example cable assembly.
Figure 16:
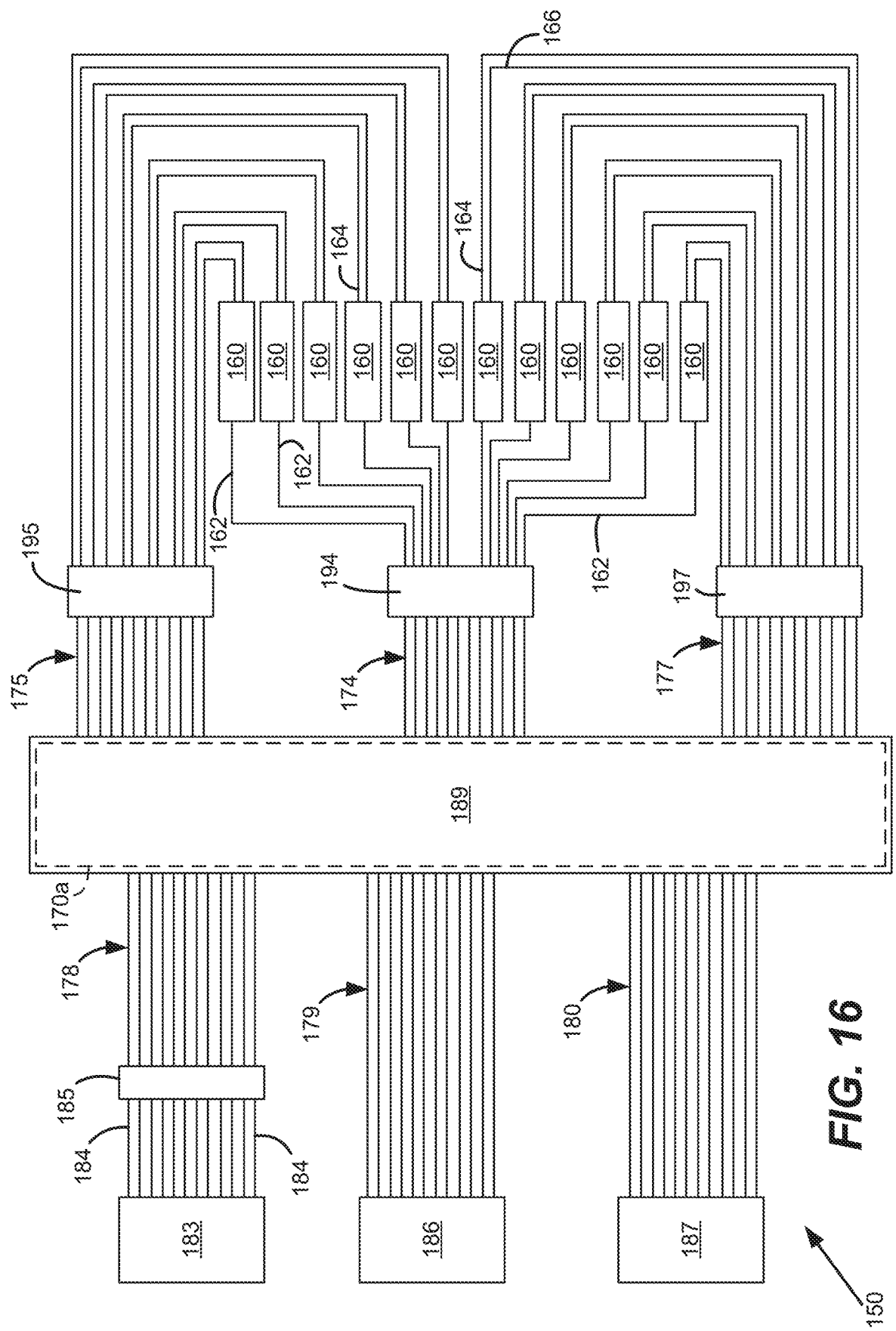
FIG. 16 is a schematic diagram of the second example cable assembly of FIG. 15.
Figure 17:
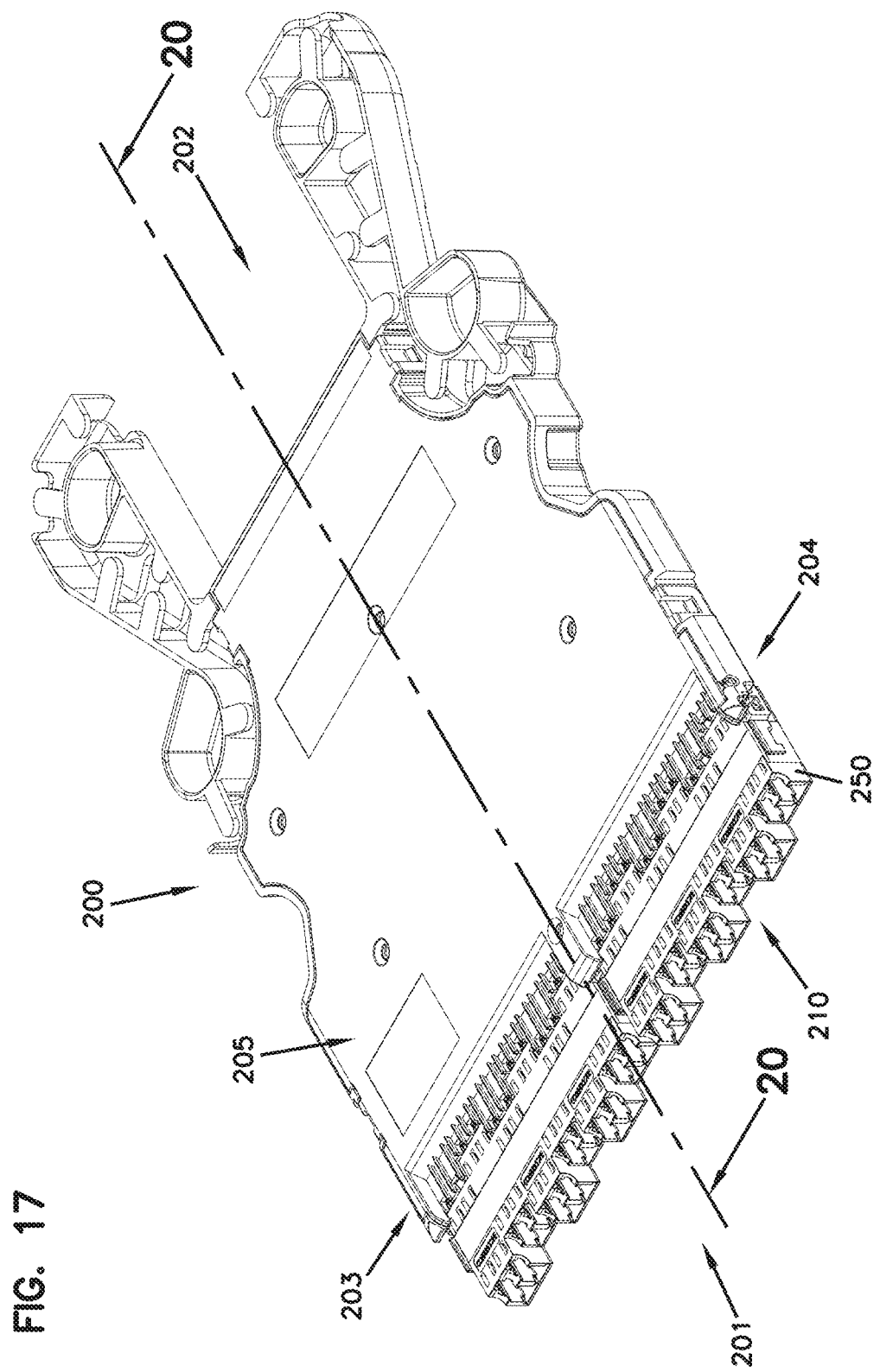
FIG. 17 is a top, front perspective view of an example optical cassette configured in accordance with the principles of the present disclosure.
Figure 18:
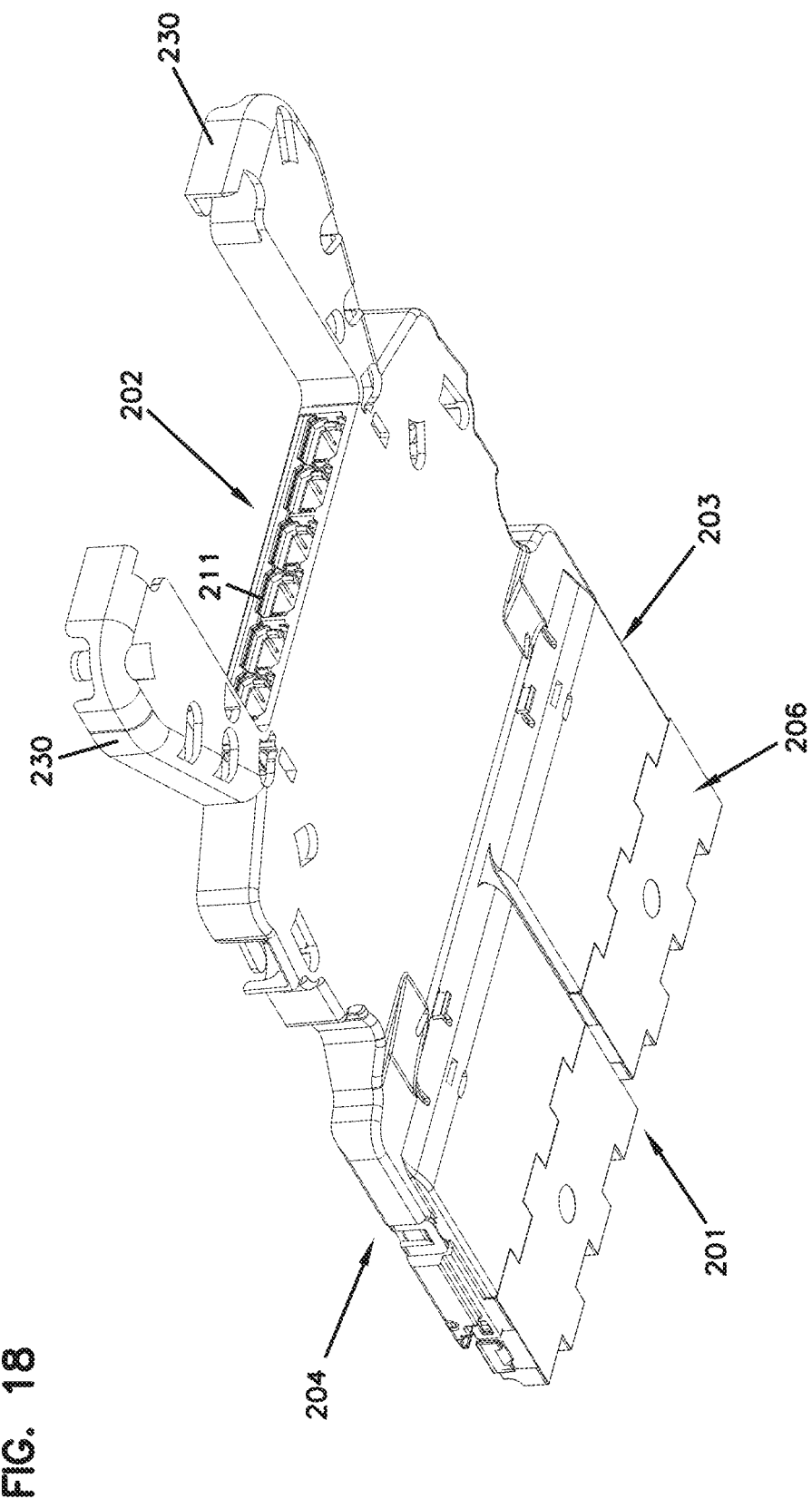
FIG. 18 is a bottom, rear perspective view of the optical cassette of FIG. 17.

In some implementations, the optical cable assembly 150 is unidirectional. In such implementations, a unidirectional optical cable assembly 150 includes the same number of monitoring lines as the number of input lines. The optical signals traveling from the input connector 133, 183 to the output connector 136, 186 are monitored. Example unidirectional optical cable assemblies 150 are shown in FIGS. 9-16. One example unidirectional cable assembly 150 is shown in FIGS. 9 and 16. Another example unidirectional cable assembly 150 is shown in FIGS. 10-15. The unidirectional cable assemblies differ in the routing of the optical fiber lines between the optical couplers 110, 160 and an optical circuit 120, 170.

Figure 8:
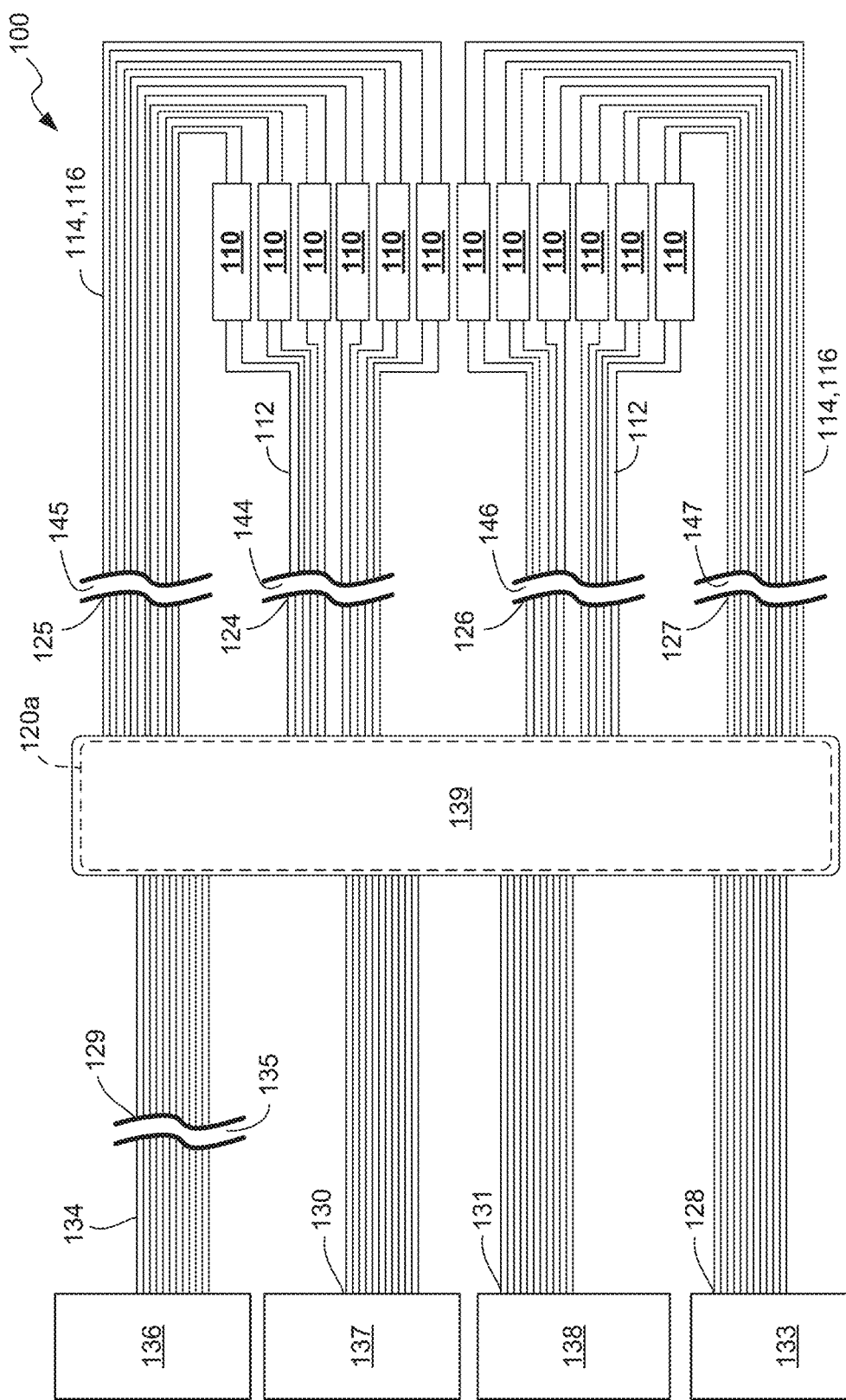
FIG. 8 is a schematic diagram of the first example cable assembly of FIG. 7.

In other implementations, the optical cable assembly 100 is a bidirectional. In such implementations, the optical cable assembly 100 includes the monitoring lines corresponding to the input lines and additional monitoring lines corresponding to the output lines. The additional monitoring lines monitor optical signals traveling from the output connector 136 to the input connector 133. Example bidirectional optical cable assemblies 100 are shown in FIGS. 1-8. One example cable assembly is shown in FIGS. 1 and 8 and another example cable assembly is shown in FIGS. 2-7. The bidirectional cable assemblies differ in the routing of the optical fiber lines between the optical couplers 110, 160 and an optical circuit 120, 170.

In certain implementations, the input lines, output lines, and monitoring lines (referred to herein as "optical lines") are terminated at optical connectors. In some implementations, each optical line can be terminated by a single-fiber optical connector (e.g., an LC plug connector, an SC plug connector, an LX.5 plug connector, etc.). In other implementations, two or more optical lines can be terminated at a multi-fiber connector (e.g., an MPO connector, an HMFOC connector, etc.).

In the examples shown, the input lines are each terminated by single-fiber connectors 133, 173 and the output lines are terminated by a single multi-fiber connector 136, 186. In a unidirectional cable assembly 150, the monitoring lines are terminated by one multi-fiber connector 137, 187. In a bidirectional cable assembly 100, the monitoring lines corresponding to the input lines are terminated by a first multi-fiber connector 137, 187 and the monitoring lines corresponding to the output lines are terminated by a second multi-fiber connector 138, 188.

In other implementations, however, the input lines can be terminated by a single multi-fiber connector, the output lines can be separately terminated by single-fiber connectors, and/or the monitoring lines can be separately terminated by single-fiber connectors.

The optical cable assembly 100, 150 includes an optical coupler 110, 160 for each input line. Each optical coupler 110, 160 has a coupler input 112, 162, a first coupler output 114, 164, and a second coupler output 116, 166. Each optical coupler 110, 160 splits (e.g., power splits) optical signals carried over the coupler input 112, 162 into split optical signals carried over the first and second coupler outputs 114, 164, 116, 166. The coupler input 112, 162 is optically coupled to the input line, the first coupler output 114, 164 is optically coupled to the output line, and the second coupler output 116, 164 is optically coupled to the monitoring line.

In a bidirectional cable assembly 100, each optical coupler 110 includes two input lines 112a, 112b. Each optical coupler 110 splits (e.g., power splits) optical signals carried over the first coupler input 112a into split optical signals carried over the first and second coupler outputs 114, 116. Each optical coupler 110 also power splits optical signals carried over the first output 114 into split optical signals carried over the first and second input lines 112a, 112b. The first input lines 112a are optically coupled to the input lines for the cable assembly 100. The second input lines 112b are optically coupled to the additional monitoring lines of the cable assembly 100.

In some examples, each optical coupler 110, 160 power splits the optical signals in a 50/50 ratio. In other examples, each optical coupler 110, 160 power splits the optical signals in an uneven ratio (e.g., 60/40, 70/30, 75/25, 80/20, 90/10, 95/5, etc.). Typically, in such examples, the smaller amount of power is directed to the corresponding monitoring lines. In other examples, different optical couplers 110, 160 within a cable assembly 100, 150 split the optical signals along different ratios. In In other implementations, each optical coupler splits the optical signals by wavelength instead of by power.

The optical cable assembly 100, 150 can be efficiently assembled by manufacturing an optical circuit 120, 170 including a plurality of optical fibers 121, 171 extending between first ends 122, 172, and second ends 123, 173. The optical circuit 120, 170 separates the unterminated ends 122, 123, 172, 173 of the optical fibers 121, 171 into groups. In some examples, each group of unterminated ends can then be efficiently optically coupled (e.g., fusion spliced) to input lines, output lines, monitoring lines, coupler input lines 112, 162, and/or coupler output lines 114, 116, 164, 166. In other examples, one or more of the groups may form the input lines, the output lines, and/or the monitoring lines.

The optical circuit 120, 170 can be initially assembled by laying the optical fibers 121, 171 over one or more substrates 139, 189. Adhesive or other bonding material holds the optical fibers 121, 171 in position once laid on the substrate 139, 189. Assembling the optical circuit 120, 170 on the substrate(s) 139, 189 allows complex fiber routing (e.g., fiber cross-overs) to be completed easily and efficiently. In certain implementations, a conformal coating 139a, 189a may be laid over the optical fibers on one or more of the substrates 139, 189.

In certain implementations, the substrate 139, 189 includes a flexible foil. In certain implementations, the substrate has an adhesive side and a non-adhesive side. The fibers are laid on the adhesive side. In certain implementations, the substrate 139, 189 includes polyethylene terephthalate (PET). However, it should be understood that PET is simply one non-limiting example polymer that may be used to form the flexible foil of the present disclosure, and other polymers having similar characteristics and that are able to at least semi-rigidly support the fibers in a predetermined orientation are also usable in accordance with the inventive concepts of the present disclosure.

In the example shown in FIGS. 2 and 10, the optical circuit 120, 170 is assembled over five substrates. The first ends 122, 172 of the fibers 121, 171 of the optical circuit 120, 170 are disposed at a first substrate 139, 189 and the second ends 123, 173 of the fibers 121, 171 are disposed at a second substrate 139, 189. In certain examples, a conformal coating 139a, 189a is laid over the fibers 121, 171 to ribbonize the fibers 121, 171 or otherwise hold the fibers in position even after the substrate 139, 189 is removed.

An intermediate portion of the fibers 121, 171 is laid over a third substrate 139, 189. Cross-overs or other complex routing of the optical fibers 121, 171 is performed over this substrate 139, 189. Reference numbers 120a, 170a refer to the complex routing section of the fibers 121, 171. To enhance clarity, the complex routing is shown as a dashed box. The adhesive on the substrate 139, 189 holds the fibers 121, 171 in position. In certain examples, no further coating is layered over the fibers 121, 171. Accordingly, removing this substrate 139, 189 from the fibers 121, 171 results in loose fibers 121, 171. Leaving this section of the fibers 121, 171 loose facilitates routing of the fibers within a cassette or other component.

In certain implementations, a portion of the fibers 121, 171 to be cut is laid over a fourth substrate 139, 189. In certain examples, a conformal coating 139a, 189a is laid over the fibers 121, 171 at the fourth substrate to ribbonize the fibers 121, 171 or otherwise hold the fibers in position even after the substrate 139, 189 is removed.

In certain implementations, the optical circuit 120, 170 is tested prior to being terminated and/or spliced to optical couplers 110, 160 or other optical components. For example, the first ends 122, 172 of the optical fibers 121, 171 may be coupled to testing equipment. In certain examples, the first substrate 139, 189 is removed from the first ends 122, 172 of the fibers 121, 171 during testing. A conformal coating 139a, 189a laid over the fibers at the first substrate 139, 189 holds the fibers in position during testing.

When the testing is complete, the optical fibers 121, 171 may be cut (e.g., at the fourth substrate) to create new first ends 122, 172 of the optical fibers 121, 171. These new first ends 122, 172 may be optically coupled to the optical couplers 110, 160 as will be described below after the fourth substrate 139, 189 is removed. The conformal coating 139a, 189a at the fourth substrate may hold the new first ends 122, 172 of the optical fibers 121, 171 in their groups.

In other implementations, flexible optical circuits essentially comprise one or more fibers sandwiched between two flexible sheets of material, such as Mylar™ or another polymer. An epoxy may be included between the two sheets in order to adhere them together. Alternatively, depending on the sheet material and other factors, the two sheets may be heated above their melting point to heat-weld them together with the fibers embedded between the two sheets.

Additional details regarding the formation of the optical circuit can be found in U.S. Provisional Application No. 62/566,906, filed Oct. 2, 2017, titled "Fiber Optic Circuit and Preparation Method," the disclosure of which is hereby incorporated herein by reference.

The optical circuit 120, 170 separates the unterminated first ends 122, 172 of the optical fibers 121, 171 into at least a first group 124, 126, 174 and a second group 125, 127, 175, 177. Each group of first ends 122, 172 is spaced from the other groups of first ends 122, 172, thereby enhancing the ease of identifying the ends. In certain examples, the adhesive or other bonding material holds the unterminated ends 122, 172 in a row or other configuration to facilitate the optical coupling process (e.g., a mass fusion splice).

In some examples, such as the unidirectional optical cable assembly 150 shown in FIG. 9, the optical circuit 170 separates the unterminated first ends 172 into the first group 174, the second group 175, and another second group 177. In other examples, such as the bidirectional optical cable assembly 100 shown in FIG. 1, the optical circuit 120 separates the unterminated first ends 122 into a first group 124, a second group 125, another first group 126, and another second group 127.

The optical circuit 120, 170 also separates the unterminated second ends 123, 173 of the optical fibers 121, 171 into another plurality of groups including a third group 128, 178, a fourth group 129, 179, and a fifth group 130, 180. In certain examples, the optical circuit 120 may separate the unterminated second ends 123 of the optical fibers 121 into the third group 128, the fourth group 129, the fifth group 130, and a sixth group 131. Each group of second ends 123, 173 is spaced from the other groups of second ends 123, 173, thereby enhancing the ease of identifying the ends. In certain examples, the adhesive or other bonding material holds the unterminated ends 123, 173 in a row or other configuration to facilitate the optical coupling process (e.g., a mass fusion splice).

In some implementations, the first ends 122, 172 of the optical fibers 121, 171 are disposed at a first end 101, 151 of the optical circuit 120, 170 and the second ends 123, 173 are disposed at a second end 102, 152 of the optical circuit 120, 170. In certain implementations, the first end 101, 151 faces in an opposite direction from the second end 102, 152. In some implementations, the number of fiber groups formed at the first end 101, 151 matches the number of fiber groups formed at the second end 102, 152. It is noted that the group numbers provided herein are not intended to indicate placement on the optical circuit. For example, the third, fourth, and fifth groups need not be arranged in sequence. Rather, the third group may be disposed between the fourth and fifth group (e.g., see FIG. 1).

The optical circuit 120, 170 also includes the fiber routing between the groups 124, 125, 126, 127, 174, 175, 177 of first ends 122, 172 and the groups 128-131, 178-181 of second ends 123, 173. The fibers 121, 171 in the optical circuit 120, 170 do not merely extend in rows between the first and second ends. Rather, the optical circuit 120, 170 includes any fiber crossovers and/or regroupings occurring between the first end 101, 151 and the second end 102, 152 of the optical circuit 120, 170. In certain examples, the fiber crossovers and/or regroupings occur over a predetermined length at an intermediate portion of the optical circuit 120, 170. In certain examples, the predetermined length extends over less than a majority of a length of the optical circuit 120, 170. In certain examples, the predetermined length extends over significantly less than a majority of a length of the optical circuit 120, 170.

The optical cable assembly 100, 150 is further assembled by optically coupling (e.g., splicing) the optical couplers 110, 160 to the optical circuit 120, 170. For example, the first group 124, 174 of the unterminated first ends 122, 172 is spliced to free ends 113, 163 of at least some of the coupler input fibers 112, 162.

In the unidirectional cable assembly 150 of FIGS. 9-16, a first group 174 of the unterminated first ends 162 are spliced (e.g., at an optical splice 194) to the free ends 163 of all of the coupler input fibers 162. In the bidirectional cable assembly 100 of FIGS. 1-8, a first group 124 of the unterminated first ends 122 are spliced (e.g., at an optical splice 144) to the free ends 113 of some of the coupler input fibers 112, 112a, 112b and another first group 126 of the unterminated first ends 122 are spliced (e.g., at an optical splice 145) to the free ends 113 of others of the coupler input fibers 112, 112a, 112b. In an example, the first group 124 is spliced to the coupler input fibers 112, 112a, 112b of a first plurality of the couplers 110 and the other first group 126 is spliced to the coupler input fibers 112, 112a, 112b of a second plurality of the couplers 110.

The second group 125, 175 of unterminated first ends 122, 172 is spliced to free ends 115, 165 of some of the coupler output fibers 114, 116, 164, 166. Another second group 127, 177 of unterminated first ends 122, 172 is spliced to free ends 117, 167 of others of the coupler output fibers 114, 116, 164, 166. In an example, the second group 125, 175 is spliced to the coupler output fibers 114, 116, 164, 166 of a first plurality of the couplers 110 and the other second group 127, 177 is spliced to the coupler output fibers 114, 116, 164, 166 of a second plurality of the couplers 110.

In certain implementations, the free ends 113, 163 of the coupler input fibers 112, 112a, 112b, 162 are ribbonized (e.g., bound into a row or matrix using adhesive) before being optically coupled to the first and optionally fourth groups 124, 174, 126. The ribbonized section 113r, 163r of the free ends 113, 163 can then be spliced (e.g., with a mass fusion splice) to the first groups 124, 174, 126. In certain implementations, the free ends 115, 117, 165, 167 of the coupler output fibers 114, 116, 164, 166 are ribbonized before being optically coupled to the second groups 125, 127, 175, 177. The ribbonized section 115r, 165r of the free ends 115, 117, 165, 167 can then be spliced (e.g., with a mass fusion splice) to the second groups 125, 127, 175, 177.

In other implementations, however, the optical circuit 120, 170 includes only two groups of unterminated first ends 122, 172. A first of the groups can be spliced to all coupler input fibers 112, 162 and a second of the groups can be spliced to all coupler output fibers 114, 116, 164, 166. In still other implementations, the optical circuit 120, 170 can include more than four groups of unterminated first ends 122, 172 that each can be spliced to the coupler input fibers 112, 162 and/or coupler output fibers 114, 116, 164, 166.

The optical cable assembly 100, 150 is further assembled by terminating the second ends 123, 173 of the optical fibers 121, 171 of the optical circuit 120, 170 at optical connectors (e.g., plug connectors). In some implementations, the second ends 123, 173 are directly terminated at the optical connectors. In other implementations, the second ends 123, 173 are optically coupled (e.g., spliced) to stub fibers extending outwardly from the optical connectors.

In the examples shown, the third group 128, 178 of the unterminated second ends 123, 173 of the optical fibers 121, 171 form or optically couple to the input lines for the cable assembly 100, 150; the fourth group 129, 179 of the unterminated second ends 123, 173 form or optically couple to the output lines; and the fifth group 130, 180 of the unterminated second ends 123, 173 form or optically couple to monitoring lines. In the unidirectional cable assembly 150, the fifth group 130, 180 forms or optically couples to all of the monitoring lines in the cable assembly 150. In the bidirectional cable assembly 100, the fifth group 130, 180 forms or optically couples to the monitoring lines monitoring optical signals received at the input lines and a sixth group 131 forms or optically couples to the monitoring lines monitoring optical signals received at the output lines.

The second ends 123, 173 of the optical fibers 121, 171 of the third group 128, 178 of the optical circuit 120, 170 are terminated to one or more input plug connectors 133, 183. Accordingly, the one or more input plug connectors 133, 183 are optically coupled to at least some of the coupler input fibers 112, 162. In the example shown, each second end 123, 173 is separately terminated to a single-fiber plug connector 133, 183 (e.g., an LC plug connector, an SC plug connector, etc.). In other examples, the second ends 123, 173 may be terminated together at one or more multi-fiber connectors instead.

In some examples, each of the second ends 123, 173 of the third group 128, 178 may be directly terminated at a single-fiber plug connector 133, 173. In other examples, the second ends 123, 173 of the third group 128, 178 may be spliced (at an optical splice 135, 185) to a plurality of stub fibers 134, 184 extending outwardly from the single-fiber plug connectors 133, 183. In an example, the stub fibers 134, 174 may be ribbonized 134r, 174r prior to being spliced (e.g., mass fusion spliced) to the second ends 123, 173 of the third group 128, 178.

The second ends 123, 173 of the optical fibers 121, 171 of the fourth group 129, 179 of the optical circuit 120, 170 are terminated to one or more output plug connectors 136, 186. Accordingly, the one or more output plug connectors 136, 186 are optically coupled to the first coupler output fibers 114, 164. In the example shown, the second ends 123, 173 of the fourth group 129, 179 are inserted into a multi-fiber plug connector (e.g., an MPO plug connector, etc.) 136, 186. In other examples, the second ends 123, 173 of the fourth group 129, 179 may be separately terminated at corresponding single-fiber connectors instead.

The second ends 123, 173 of the optical fibers 121, 171 of the fifth group 130, 180 of the optical circuit 120, 170 are terminated to one or more monitoring plug connectors 137, 187. Accordingly, the one or more monitoring plug connectors 137, 187 are optically coupled to the second coupler output fibers 116, 166. In the example shown, the second ends 123, 173 of the fifth group 130, 180 are inserted into a multi-fiber plug connector (e.g., an MPO plug connector, etc.) 137, 187. In other examples, the second ends 123, 173 of the fifth group 130, 180 may be separately terminated at corresponding single-fiber connectors instead.

In the bidirectional cable assembly 100, the second ends 123 of the optical fibers 121 of the sixth group 131 of the optical circuit 120 are terminated to one or more additional monitoring plug connectors 138. Accordingly, the one or more additional monitoring plug connectors 138 are optically coupled to the second coupler input fibers 112b while the input connectors 133, 183 are optically coupled to the first coupler input fibers 112a. In the example shown, the second ends 123 of the sixth group 131 are inserted into a multi-fiber plug connector (e.g., an MPO plug connector, etc.) 138. In other examples, the second ends 123 of the sixth group 131, 181 may be separately terminated at corresponding single-fiber connectors instead.

It is noted that the optical fibers 121, 171 of the fourth group 129, 179 of the optical circuit 120, 170 are optically coupled to the first coupler output fibers 114, 164, but not to the second coupler output fibers 116, 166. The optical fibers 121, 171 of the fifth group 130, 180 of the optical circuit 120, 170 are optically coupled to the second coupler output fibers 116, 166, but not to the first coupler output fibers 114, 164. However, each of the second groups 145, 147, 175, 177 of the optical circuit 120, 170 are optically coupled to both the first and second coupler output fibers 114, 116, 164, 166.

As shown in FIGS. 8 and 16, the optical circuit 120, 170 is assembled by laying at least sections of the fibers 121, 171 across one or more substrates 139, 189. For example, a majority of the crossovers between the fibers 121, 171 occurs on a main substrate 139, 189 at an intermediate position along a length of the fibers 121, 171. In some examples, the main substrate 139, 189 holds the entirety of the lengths of the optical fibers 121, 171. In other examples, portions of the fibers 121, 171 are laid on separate substrates. For example, the first ends 122, 172 of the fibers 121, 171 may be grouped along a second substrate 139, 189 and the second ends 123, 173 of the fibers 121, 171 may be grouped along a third substrate 139, 189.

The substrates 139, 189 are removed from the optical fibers 121, 171 before the optical cable assembly 100, 150 is utilized (e.g., routed within a cassette). In some examples, the substrates 139, 189 are removed after the splices 135, 144, 145, 146, 147, 185, 194, 195, 197 are formed. In other examples, the substrates 139, 189 are removed before the splices 135, 144, 145, 146, 147, 185, 194, 195, 197 are formed. In some examples, the substrates 139, 189 are removed after the second ends 123, 173 of the fibers 121, 171 are terminated at the plug connectors 133, 136, 137, 138, 183, 186, 187. In other examples, the substrates 139, 189 are removed before the second ends 123, 173 of the fibers 121, 171 are terminated at the plug connectors 133, 136, 137, 138, 183, 186, 187.

In some implementations, the substrates 139, 189 are removed by peeling the substrates 139, 189 from the fibers 121, 171. In other implementations, the substrates 139, 189 are removed by cutting the fibers 121, 171 so that the substrates 139, 189 are no longer connected to the optical circuit 120, 170. In certain implementations, the substrates 139, 189 at the fiber ends 122, 123, 172, 173 are removed by cutting while the main substrate 139, 189 is removed by peeling.

In certain implementations, portions of the optical fibers 121, 171 are ribbonized prior to removing the substrates 139, 189. For example, the first ends 122, 172 of the fibers 121, 171 in the first and second groups 124, 125, 126, 127, 174, 175, 177 may be ribbonized into the groups prior to cutting off the substrate 139, 189 retaining the second ends 123, 173. Accordingly, the fiber ends 122, 172 may be maintained in the respective groups 124, 125, 126, 127, 174, 175, 177 even after the substrates 139, 189 are removed. The second ends 123, 173 of the fibers 121, 171 in the third, fourth, fifth, and sixth groups 128, 129, 130, 131, 178, 179, 180 may be ribbonized into the groups prior to cutting of the substrate 139, 189 retaining the first ends 122, 172. Accordingly, the fiber ends 123, 173 may be maintained in the respective groups 128, 129, 130, 131, 178, 179, 180 even after the substrates 139, 189 are removed.

In certain implementations, indicators can be added to the fiber groups to identify each fiber group. Example indicators suitable for use with the optical circuit include a sleeve having tactile indicia, printed indicia, and/or color indicia to distinguish the indicator from the other indicators. In the example shown, each indicator includes tactile indicia in the form of bumps on an external surface of the sleeve. Each indicator disposed at a particular side of the optical circuit 120, 170 has a unique number of bumps (e.g., 1, 2, 3, 4, etc.). In other examples, the indicators may be different colors or have different labeling printed thereon.

A first indicator can be disposed at the optical fibers 121, 171 of the first group 124, 174; a second indicator can be disposed at the optical fibers 121, 171 of the second group 125, 175; a third indicator can be disposed at the optical fibers 121, 171 of the other second group 127, 177; and a fourth indicator can be disposed at the optical fibers 121 of the other first group 126. In certain examples, indicators also can be disposed at the fibers 121, 171 of the third, fourth, fifth, and sixth groups 128-131, 178-180.

In certain implementations, substrates are removed from the indicators prior to use of the cable assembly 100, 150. For example, the substrates of the indicators at the first and second groups 124, 126, 174 can be removed after being spliced to the appropriate optical coupler fibers. The substrates of the indicators at the third, fourth, fifth, and/or sixth groups 128, 178, 129, 179, 130, 180, 131 can be removed after the groups are terminated.

In some examples, the optical circuit 120, 170 has a like number of groups at the first end 101, 151 and the second end 102, 152. In such examples, the same indicator can be used at each end 101, 151, 102, 152. In the example shown in FIG. 4, four indicators 140-143 are used to designate the groups on each side of the circuit 120. A first indicator 140 designates the first group 124 at the first end 101 and the fourth group 129 at the second end 102; a second indicator 141 designates another of the first groups 126 at the first end 101 and the fifth group 130 at the second end 102; a third indicator 142 designates one of the second groups 125 at the first end 101 and the sixth group 131 at the second end 102; a fourth indicator 143 designates the other of the second groups 127 at the first end 101 and the third group 128 at the second end 102. In the example shown in FIG. 12, three indicators 190, 191, 193 are used to designate the groups on each side of the circuit 150. A first indicator 190 designates the first group 174 at the first end 151 and the third group 178 at the second end 152; a second indicator 191 designates one of the second groups 175 at the first end 151 and the fourth group 179 at the second end 152; and a third indicator 193 designates the other of the second groups 177 at the first end 151 and the fifth group 180 at the second end 152. In other examples, however, each indicator in the optical circuit 120, 170 could be unique.

Figure 45:
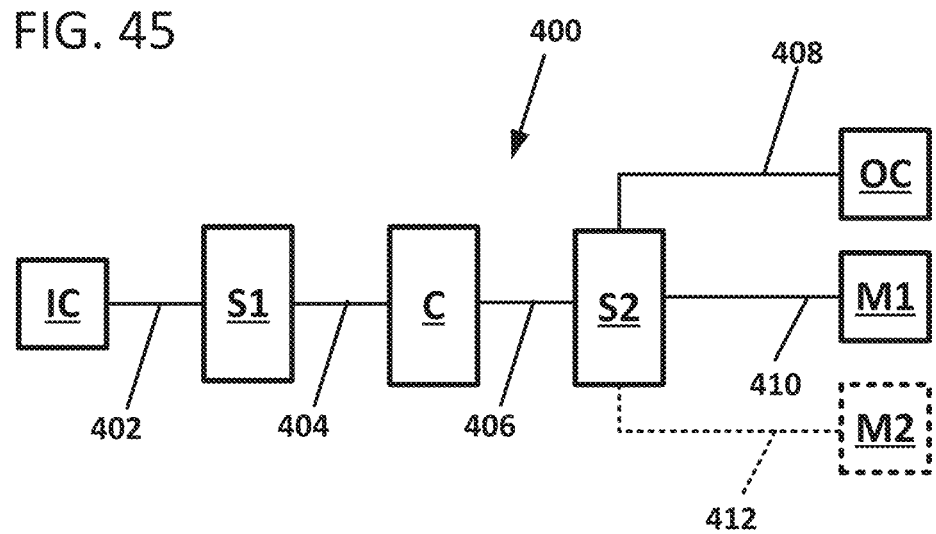
FIG. 45 is a schematic diagram of another example cable assembly.

FIG. 45 shows another optical cable assembly 400 that is not manufactured using the flexible substrate. Rather, optical lines extends between one or more input connectors IC and one or more output connectors OC. The optical cable assembly 400 also includes monitoring lines terminated at monitoring connectors M1, M2. The connectors IC, OC, M1, M2 are optically coupled to each other at one or more optical couplers at a coupler region C.

In certain examples, the input connector IC may be spliced to the coupler(s) at a first splice S1. For example, one or more fiber lines 402 extending from the input connector(s) IC may be spliced to fiber lines 404 extending from a first side of the coupler region C. The output connectors OC may be spliced to the coupler(s) at a second splice S2. For example, one or more fiber lines 408 extending from the output connector(s) OC may be spliced to fiber lines 406 extending from an opposite, second side of the coupler region C. The monitoring connectors M1, M2 also may be spliced to the coupler(s) at the second splice S2. For example, the monitoring lines 410, 412 may be spliced to the fiber lines 406 extending from the second side of the coupler region C.

As noted above, the terms input and output are not intended to be limiting; each input connectors IC can be associated with either a transmit signal Tx or a receive signal Rx and each output connectors OC can be associated with either a transmit signal Tx or a receive signal Rx. First monitoring lines 410 are optically coupled to the connectors IC, OC associated with the transmit signals. The first monitor lines 410 may be terminated at one or more first monitor connectors M1. Optionally, second monitor lines 412 are optically coupled to the connectors IC, OC associated with the receive signals. The second monitor lines 412 may be terminated at one or more second monitor connectors M2. Cables 400 with only first monitoring lines 410 are considered "unidirectional cables" while cables 400 with both first and second monitoring lines 410, 412 are considered "bidirectional cables."

For ease in viewing in FIG. 45, the cable assembly 400 is shown with one input connector IC, one output connector OC, one first monitoring connector M1, and one second monitoring connector M2. Only a single line is shown extending from each connector IC, OC, M1, M2 in FIG. 45. However, each line represent one or more optical fibers extending from each connector. Further, in certain implementations, the cable assembly 400 include multiple input connectors IC. In certain examples, the multiple input connectors IC are single-fiber connectors; the output connector OC and monitoring connectors M1, M2 are multi-fiber connectors.

Similar to the cable assemblies 100, 150, each coupler at the coupler region C has a first coupler input line, a first coupler output line, and a second coupler output line. In bidirectional cable assemblies 400, each coupler also has a second coupler input line. Each coupler receives a transmit signal at the first coupler input line. If the first coupler input line is optically coupled to an input connector IC, then the first coupler output line is optically coupled to an output connector OC and the second coupler output line is optically coupled to a first monitoring connector M1. If the first coupler input line is optically coupled to an output connector OC, however, then the first coupler output line is optically coupled to an input connector IC and the second coupler output line is optically coupled to the first monitoring connector M1.

Optical Cassette

FIGS. 17-29 illustrate an example optical cassette 200 in which the optical cable assembly 100, 150 can be routed. FIGS. 30-44 illustrate another example optical cassette 300 in which the optical cable assembly 100, 150 can be routed. Alternatively, the optical lines of the cable assembly 100, 150 can be separately mounted with the cassette 200, 300 without first forming the cable assembly.

The optical cassette 200, 300 has a length extending between a front 201, 301, and a rear 202, 302, a width extending between a first side 203, 303 and a second side 204, 304, and a height extending between a top 205, 305 and a bottom 206, 306. In some implementations, input lines of the cassette 200, 300 are accessible at the front 201, 301, output lines are accessible at the rear 202, 302, and monitoring lines are accessible at the rear 202, 302. Other arrangements are possible.

Figure 19:
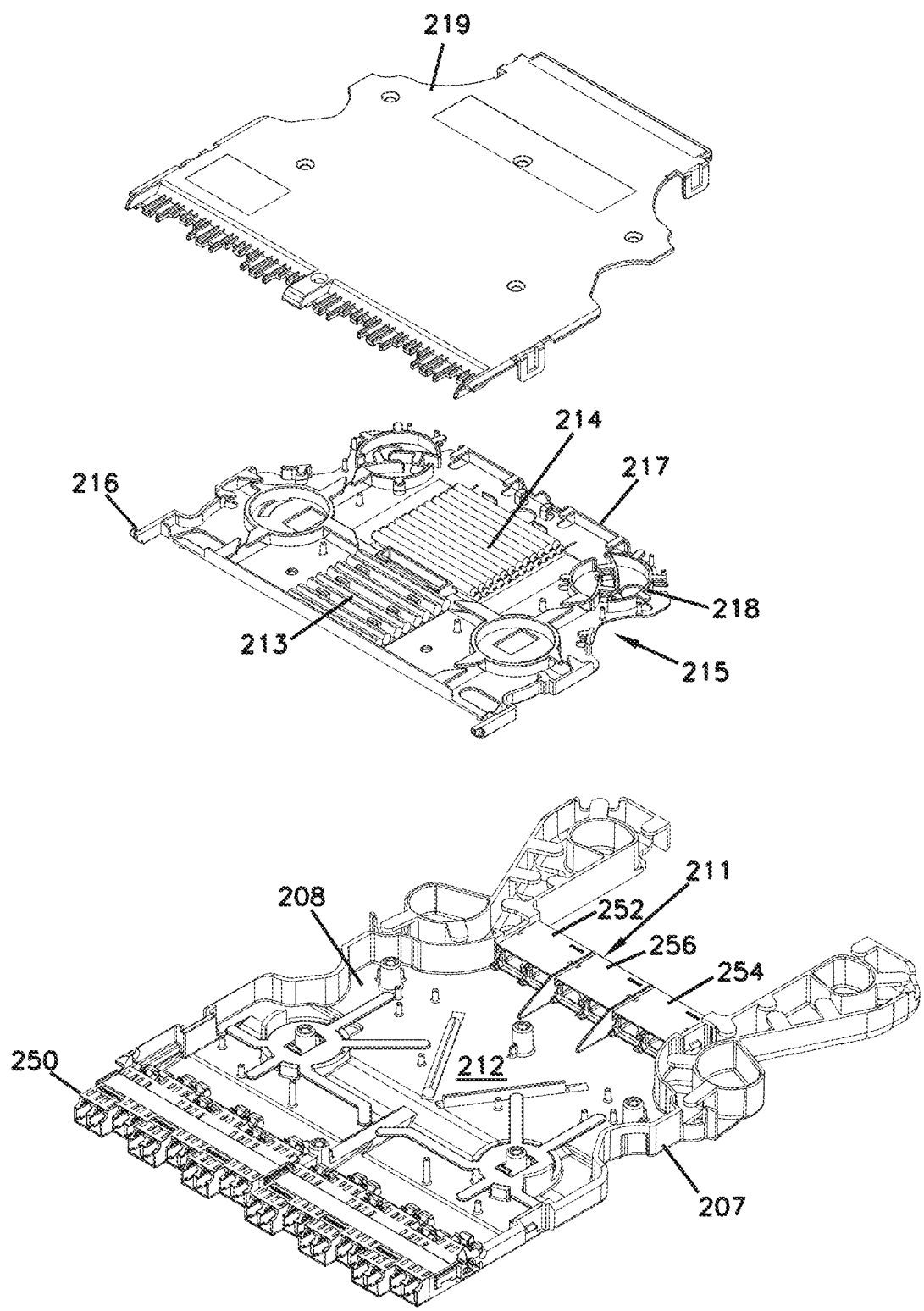
FIG. 19 is an exploded view of the optical cassette of FIG. 17 showing the body, divider tray, and cover of the cassette.
Figure 20:
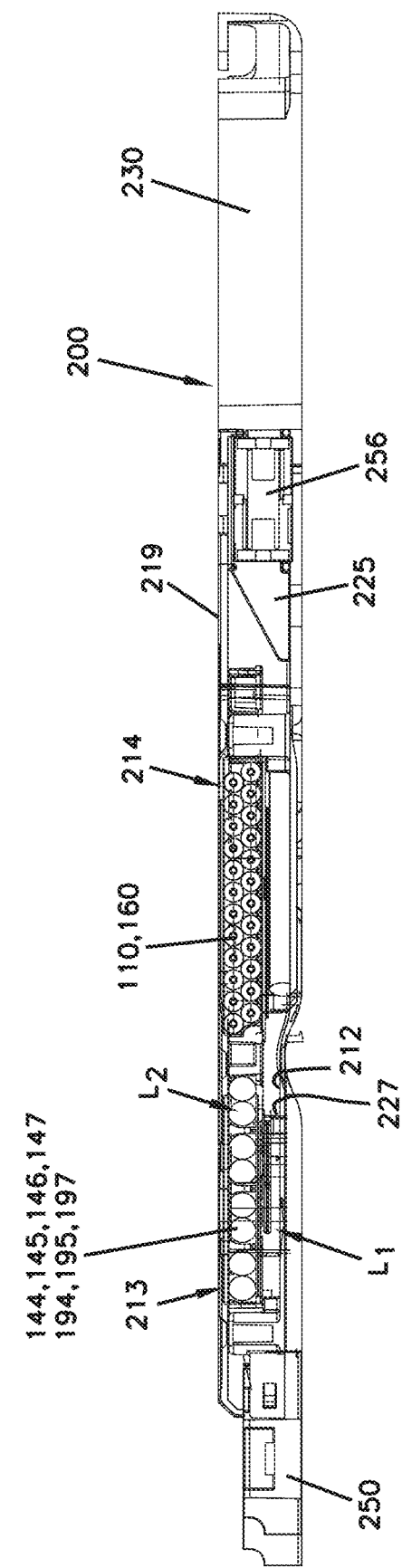
FIG. 20 is a cross-sectional view of the optical cassette of FIG. 17 taken along the 20-20 line.

The optical cassette 200, 300 includes a body 207, 307 defining an interior 208 (see FIG. 19). At least part of the interior 208 of the body 207, 307 is separated into a first level L1 and a second level L2 along the height. A cover 219, 3019 mounts to the body 207, 307 to close the interior 208. In certain examples, the cover 219, 319 is removable from the body 207, 307. In certain examples, the cover 219, 319 latches to the body 207, 307. In certain examples, the cover 219, 319 is fastened to the body 207, 307 using one or more fasteners (e.g., screws).

The optical cassette 200, 300 includes a first termination region 210, 310 defined at the first end 201, 301 of the cassette 200, 300. In certain implementations, the optical cassette 200, 300 includes a second termination region 211, 311 defined at the second end 202, 302 of the cassette 200, 300. A cable routing region 212, 312 is disposed within the interior 208, 308 of the body 207, 307 between the first and second termination regions 210, 211, 310, 311. An optical splice holding region 213, 313 is disposed within the interior 208 of the body 207, 307 between the first and second termination regions 210, 211, 310, 311. An optical coupler holding region 214, 314 is disposed within the interior 208, 308 of the body 207, 307 between the first and second termination regions 210, 211, 310, 311.

In certain implementations, the cable routing region 212, 312 is disposed at the first level L1 within the body 207, 307 and the optical coupler holding region 214, 314 is disposed at the second level L2 within the body 207, 307. In certain examples, the optical splice holding region 213, 313 also is disposed at the second level L2 within the body 207, 307. In certain examples, one or more optical splices also may be disposed at the first level L1 of the body 207, 307. For example, one or more optical splices may be disposed within the cable routing region 212, 312.

In the example shown in FIGS. 19 and 35, the first and second levels L1, L2 within the body 207, 307 are separated by a divider tray 215, 315. The first level L1 is defined by the body 207, 307 and the second level L2 is defined by the divider tray 215, 315.

The divider tray 215, 315 is removably coupled to the body 207, 307. In certain implementations, the divider tray 215, 315 is movable relative to the body 207, 307 between open and closed positions. In an example, the divider tray 215, 315 is pivotal relative to the body 207, 307 between the open and closed positions. When in the closed position, the divider tray 215, 315 covers the first level L1 (see FIGS. 20 and 31). When in the open position, the divider tray 215, 315 provides access to the first level L1 (see FIG. 24).

Figure 21:
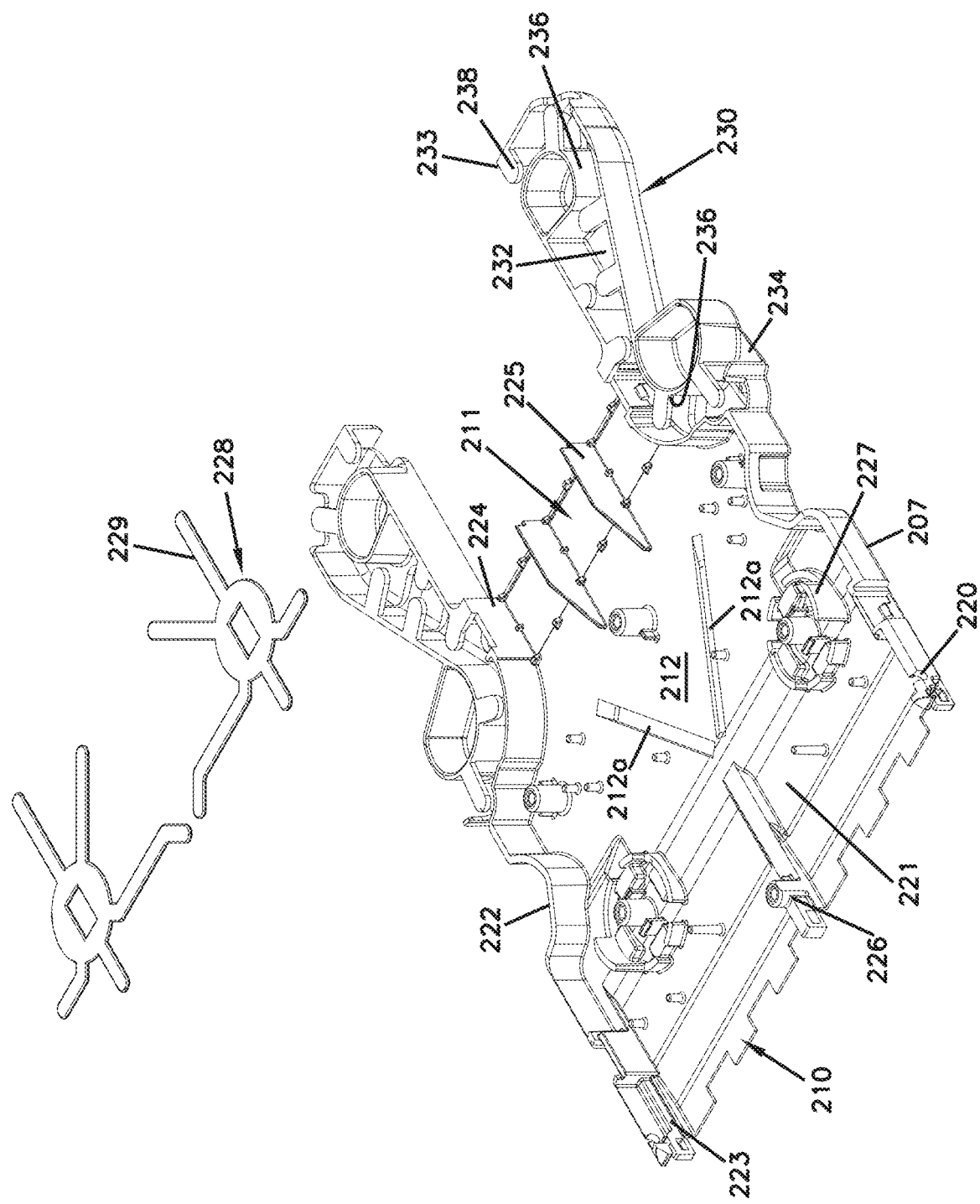
FIG. 21 is a perspective view of a body of the cassette of FIG. 19 with the cover, divider tray, and adapters removed for ease in viewing and retention fingers exploded upwardly.

FIGS. 21 and 35 illustrates example cassette bodies 207, 307 that defines the first termination region 210, 310, the second termination region 211, 311, and the cable routing region 212, 312. The body 207, 307 includes a base 221, 321 extending between the front 201, 301 and rear 202, 302 of the cassette 200, 300 and extending between the first and second sides 203, 204, 303, 304 of the cassette 200, 300. Sidewalls 222, 322 extend upwardly from the base 221, 321 along the first and second sides 203, 204, 303, 304.

The body 207, 307 defines an open front 223 extending between the sidewalls 222, 322. The body 207, 307 also defines an open rear 224. One or more optical adapters 250, 350 can be disposed at the open front 223 to form the first termination region 210, 310. In some examples, the optical adapters 250, 350 include single-fiber adapters (e.g., LC adapters, SC adapters, etc.). In other examples, the optical adapters 250, 350 include multi-fiber adapters (e.g., MPO adapters). In certain examples, the adapters 250, 350 are formed as one or more adapter blocks defining a plurality of front and rear ports.

The optical adapters 250, 350 may snap-fit to the cassette body 207, 307. For example, the body 207, 307 may define apertures 231, 331 through the sidewalls 222, 322 of the body 207, 307. Certain example adapters 250, 350 are formed in blocks that have ramped shoulders 357 at opposite ends. As an adapter block 250, 350 is slid into the termination region 210, 310 of the body 207, 307, the sidewall 222, 322 flexes outwardly over the ramp 258, 358 until the shoulder 259, 359 aligns with the aperture 231, 331. The sidewall 222, 322 then snaps over the shoulder 259, 359 to hold the adapter block 250, 350 at the body 207, 307.

In certain implementations, the cover 319 of the optical cassette 300 includes a securing arrangement 316 that inhibits removal of the adapter blocks 350 from the cassette body 307. The securing arrangement 316 includes a first portion 317 extending over the sidewall 322 of the body 307 and a second portion 318 extending downwardly from the first portion 317 and over a portion of the sidewall 322 (see FIGS. 32A and 32B). Accordingly, when the cover 319 is mounted to the body 307, the securing arrangement 316 inhibits outward flexing of the sidewall 322, which prevents unlatching of the adapter block 350 from the body 307. In certain examples, the cover 319 has a securement arrangement 316 at opposite sides of the cover 319 to hold the adapter blocks 350 at opposite sides of the body cassette 307.

One or more optical adapters 252, 254, 256, 352, 354 can be disposed at the open rear 224 to form the second termination region 211, 311. In some examples, the optical adapters 252, 254, 256, 352, 354 include single-fiber adapters (e.g., LC adapters, SC adapters, etc.). In other examples, the optical adapters 252, 254, 256, 352, 354 include multi-fiber adapters (e.g., MPO adapters). In certain examples, the adapters 252, 254, 256, 352, 354 are formed as one or more adapter blocks defining a plurality of front and rear ports.

In certain implementations, the adapters 252, 254, 256, 352, 354 at the second termination region 211, 311 are a different type from the adapters 250, 350 at the first termination region 210, 310. In the example shown, the adapters 250, 350 at the first termination region 210, 310 are single-fiber adapters and the adapters 252, 254, 256, 352, 354 at the second termination region 211, 311 are multi-fiber adapters.

In certain implementations, one or more dividing walls 225, 325 can separate the open rear 224 into two or more adapter locations. An adapter or adapter block 252, 254, 256, 352, 354 can be disposed at each adapter location. In certain implementations, one or more dividing walls 226, 326 can separate the open front 223 into two or more adapter locations. An adapter or adapter block 250, 350 can be disposed at each adapter location.

One or more guide members (e.g., bend radius limiters, spools, etc.) can be disposed on the base 221, 321 to guide optical fibers along the first level of the body 207, 307. In certain examples, one or more bend radius limiters 227, 327 extend upwardly from the base 221, 321. In certain implementations, retention fingers 229 extend outwardly from the bend radius limiters 227, 327 to aid in retaining the optical fibers on the first level. In certain examples, the retention fingers 229 are removable from the bend radius limiters 227, 327 to aid in cabling the fibers on the first level. For example, the retention fingers 229 may be coupled to a central hub 228 that mounts to a bend radius limiter 227, 327 (see FIG. 20).

In certain implementations, the base 212, 312 defines one or more splice retention stations 212a, 312a to retain optical splices at the cable routing region 212, 312. In the example shown, each splice retention stations 212a defines a recess in the base 212, 312. In other implementations, each splice retention stations 212a, 312a may include fingers to pinch the optical splice, walls between which the splice may be friction fit, or other retaining structures. In the example shown, the retention stations 212a, 312a are angled relative to the front 201, 301 and rear 202, 302 of the cassette 200, 300.

In certain implementations, the body 207, 307 is configured to manage cables coupled to exterior ports of the second termination field 211, 311. For example, the body 207, 307 may be configured to inhibit excessive bending of the cables as the cables extend away from the second termination field 211, 311. In certain examples, the body 207, 307 is configured to inhibit excessive bending as the cassette 200, 300 moves relative to a rack to which the cables are anchored.

In certain implementations, the body 207, 307 includes a guide arrangement 230, 330 extending rearwardly from the rear 202, 302 of the cassette 200, 300. In certain examples, the body 207, 307 includes a first guide arrangement 230, 330 extending rearwardly from the first side 203, 303 of the rear 202, 302 and a second guide arrangement 230, 330 extending rearwardly from the second side 204, 304 of the rear 202, 302. In certain examples, the second termination region 211, 311 is disposed between the first and second guide arrangement 230, 330.

Each guide arrangement 230, 330 defines a channel 232, 323 extending between an entrance 233, 333 and an exit 234, 334. One or more bend radius limiters 236, 336 are disposed within the channel 232, 332 to inhibit excessive bending of any cable routed through the channel 232, 332. One or more tabs 238, 338 may extend over the channel 232, 332 to aid in holding the cable within the channel 232, 332.

In certain implementations, the entrance 233, 333 faces in a different direction from the exit 234, 334. In certain implementations, the entrance 233, 333 faces towards one of the sides 203, 204, 303, 304 of the cassette 200, 300 and the exit 234, 334 faces towards the other side 204, 203, 304, 303. In certain examples, the entrances 233, 333 of the guide arrangements 230, 330 face each other. In an example, the channel 232, 332 has an S-shape. In certain examples, the entrances 233, 333 are disposed at the rear of the guide arrangements 230, 330. In certain examples, the exits 234, 334 are disposed at the front of the guide arrangements 230, 330. Accordingly, a cable may extend rearwardly from the second termination region 211, 311 along the guide arrangement 230, 330, enter the channel 232, 332 at the entrance 233, 333 of the guide arrangement 230, 330, extend through the channel 232, 332 around the bend radius limiters 236, 336, and exit the channel 232, 332 at one side 203, 204, 303, 304 of the body 207, 307.

Figure 34:
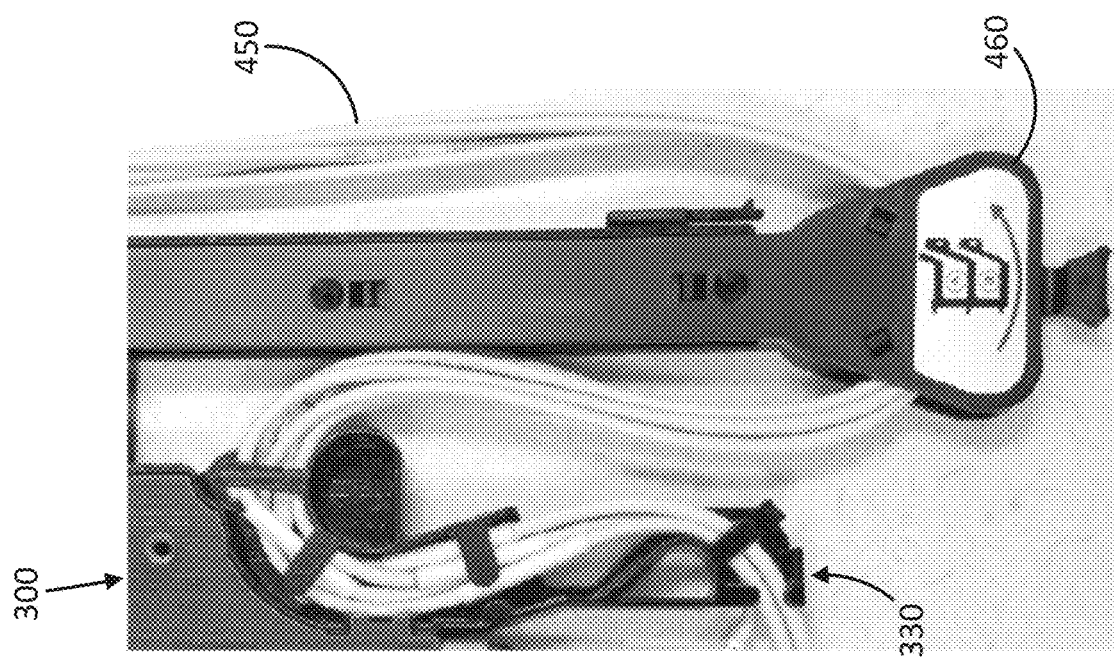
FIG. 34 is a top plan view of a cassette of FIG. 30 showing cable routing through a guide arrangement.
Figure 33:
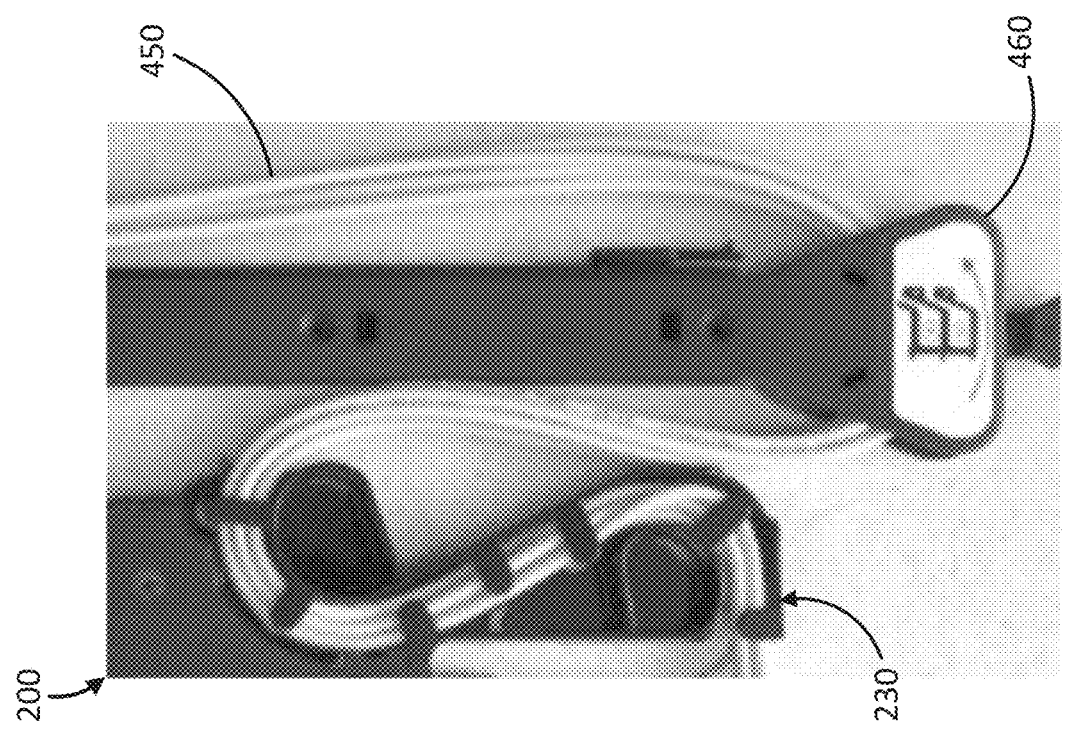
FIG. 33 is a top plan view of a portion of the cassette of FIG. 16 showing cable routing through a guide arrangement.

FIGS. 33 and 34 show the differences between the guide arrangements 230 and the guide arrangement 330. The channel 332 of the guide arrangement 330 of FIG. 34 is narrower than the channel 232 of the guide arrangement 230 shown in FIG. 33. The narrower channel 332 may facilitate sliding of the cassette 300 within a chassis or other housing. In FIGS. 33 and 34, the cassettes 200, 300 are shown mounted on a tray having a cable guide member 410 relative to which the cassettes 200, 300 can slide. The guide arrangements 230 also have open sections (i.e., interruptions in the sidewalls) adjacent the rearward radius limiters 336 compared to the guide arrangements 230. Accordingly, cables 450 leaving the guide arrangement 330 have more clearance than the cables 450 leaving the guide arrangement 230.

Figure 22:
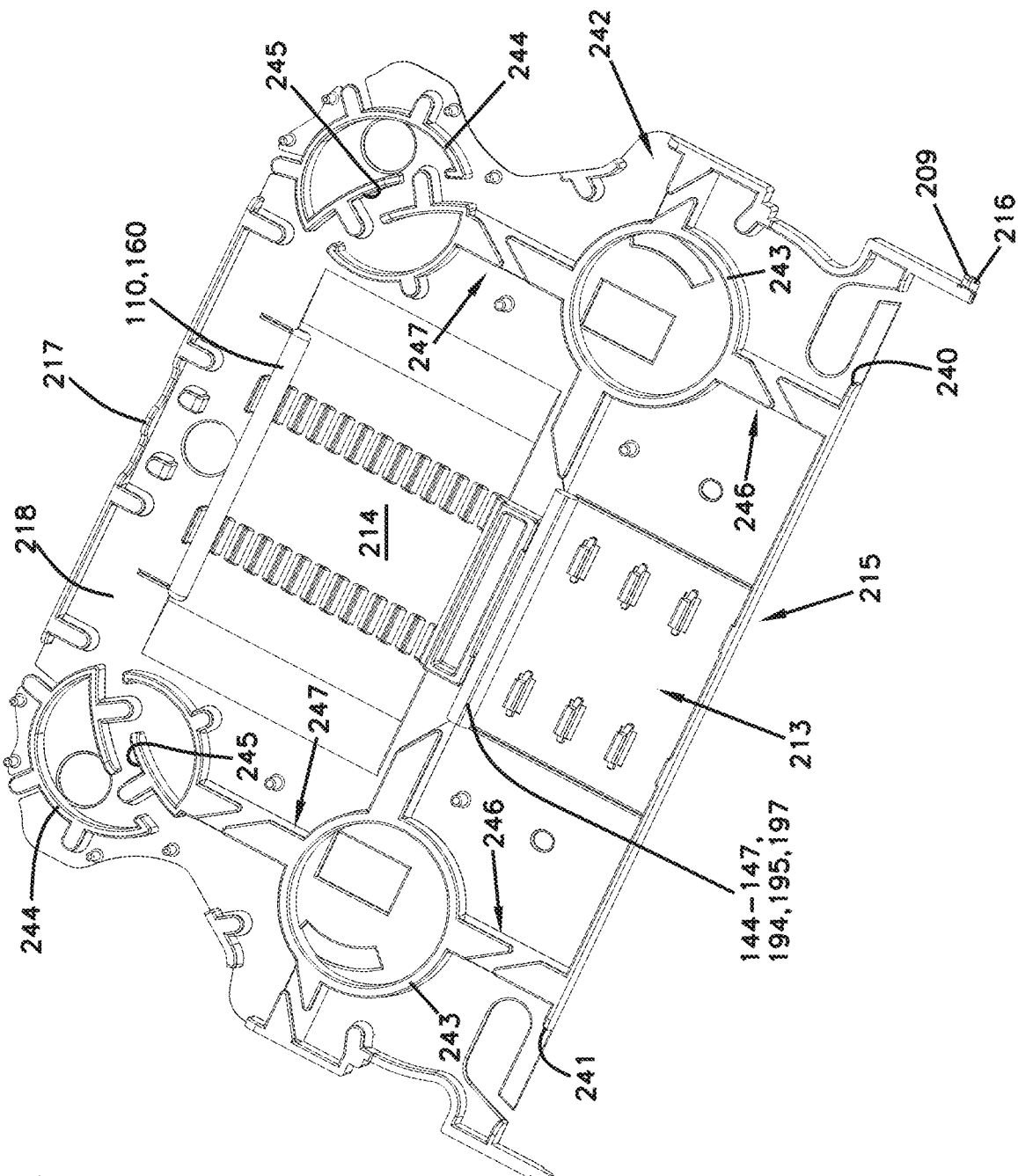
FIG. 22 is a perspective view of the divider tray of FIG. 19 with all but one of the optical splices removed and all but one of the optical couplers removed.
Figure 23:
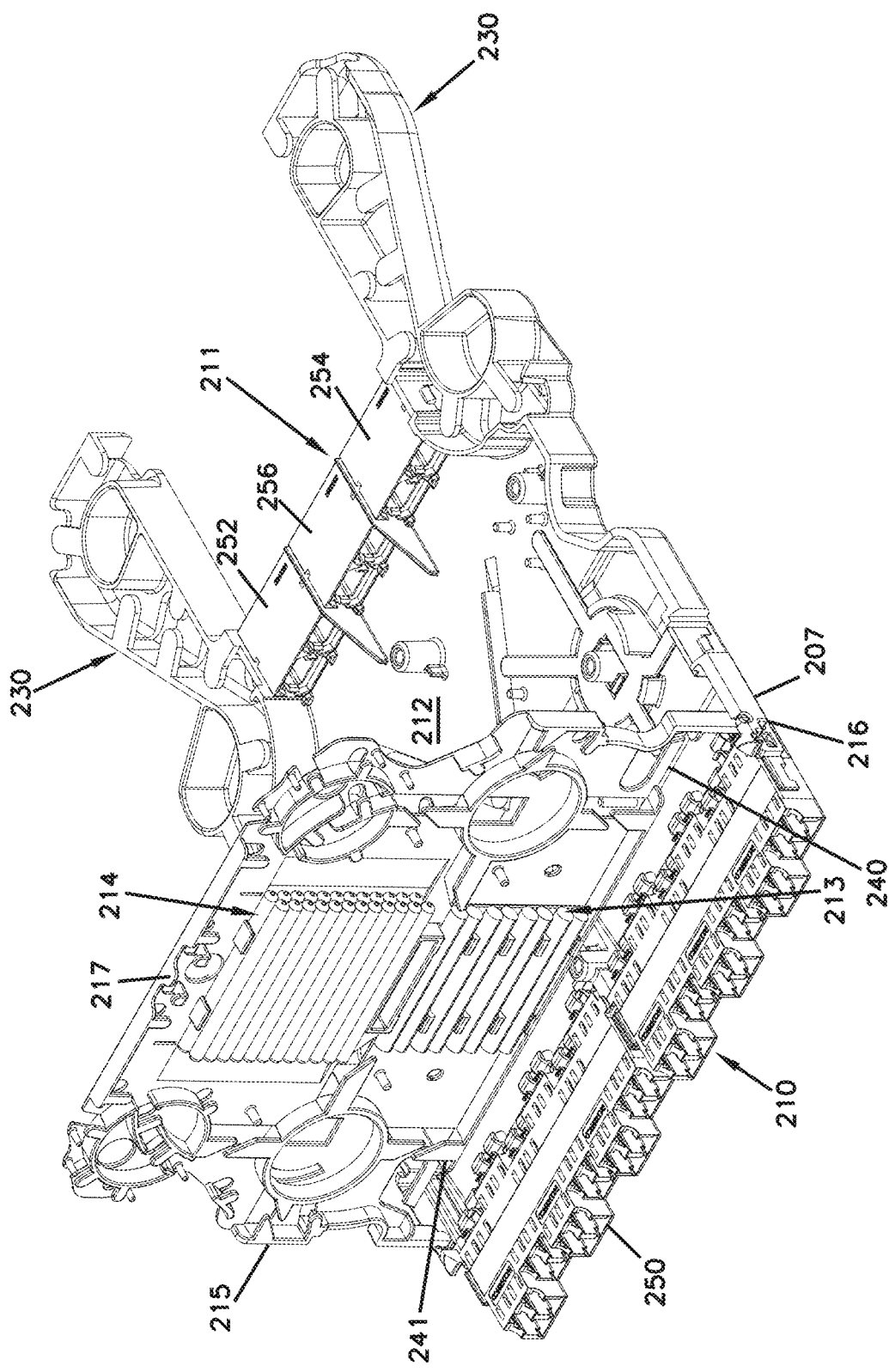
FIG. 23 is a front perspective view of the cassette of FIG. 17 with the cover removed and the divider tray disposed in the open position.
Figure 24:
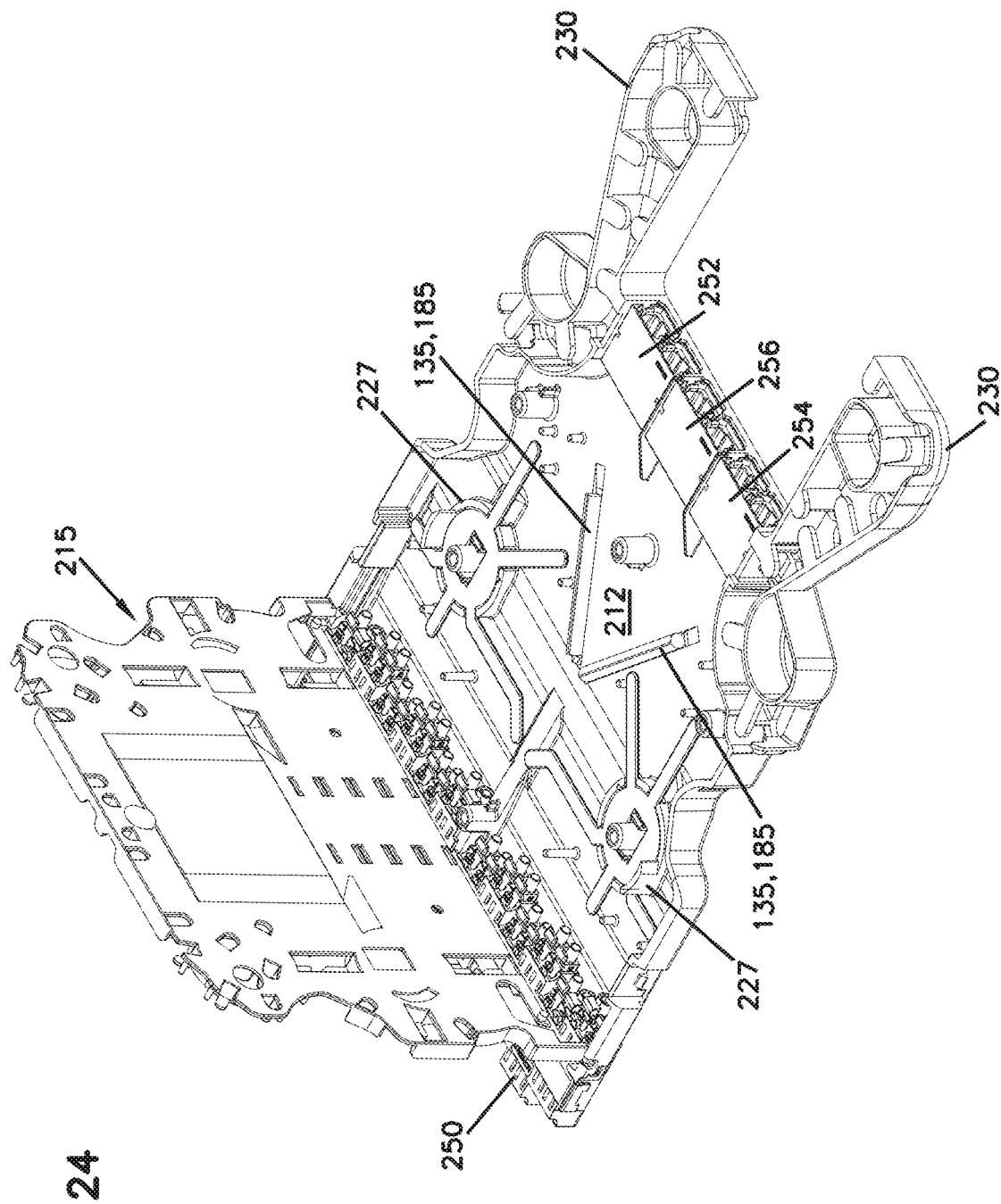
FIG. 24 is a rear perspective view of the cassette of FIG. 17 with the cover removed and the divider tray disposed in the open position.

FIGS. 22 and 35 illustrates an example divider tray 215, 315 includes a base 218 that defines the optical splice holding region 213, 313 and the optical coupler holding region 214, 314. The divider tray 215, 315 includes one or more mounting members 216 that secure to the body 207, 307 of the cassette 200, 300. In the example shown, the mounting members 216 define hinge pins 209 that mounts within a mounting recess 220 defined in the body 207, 307. The divider tray 215, 315 pivots about the hinge pins 209. In certain examples, the divider tray 215, 315 includes a grip member 217, 317 at an opposite end from the mounting members 216.

In certain implementations, the splice holding region 213, 313 and the coupler holding region 214, 314 are disposed along a central region of the divider tray 215, 315. In certain examples, the splice holding region 213, 313 is disposed closer to the mounting members 216 and the coupler holding region 214, 314 is disposed closer to the grip member 217, 317. The splice holding region 213, 313 is configured to hold a plurality of optical splices. In the example shown, the optical splices are held so that fibers extending from opposite ends of the splices extend towards the sides 203, 204, 303, 304 of the cassette 200, 300. The coupler holding region 214, 314 is configured to hold a plurality of optical couplers. In the example shown, the optical couplers are held so that fibers extending from opposite ends of the couplers extend towards the sides 203, 204, 303, 304 of the cassette 200, 300.

In certain implementations, the divider tray 215, 315 defines first and second entrances/exits 240, 241, 340, 341 at the front end of the tray 215, 315. For example, the first entrance/exit 240, 340 may be disposed at the front of the tray 215, 315 towards the first side 203, 303 of the cassette 200, 300 and the second entrance/exit 241, 341 may be disposed at the front of the tray 215, 315 towards the second side 204, 304 of the cassette 200, 300. A guide channel 242, 342 extends around a periphery of the divider tray 215, 315 between the first and second entrances/exits 240, 241, 340, 341.

One or more bend radius limiters are disposed along the guide channel 242, 342 to guide the optical fibers around the divider tray 215, 315. In certain implementations, the bend radius limiters include a first set of spools 243, 343 disposed closer to the entrances/exits 240, 241, 340, 341 and a second set of spools 244, 344 disposed further from the entrances/exits 240, 241, 340, 341. In certain examples, each of the spools 244, 344 of the second set defines a bypass channel 245, 345 that guides one or more fibers through the spool 244, 344 instead of around the spool 244, 344. Retention tabs may extend over the guide channel 242, 342, outwardly from any of the spools 243, 244, 343, 344, and/or over the bypass channel 245, 345.

First passages 246 each lead between the splice holding region 213, 313 and the guide channel 242, 342 at a respective one of the entrances/exits 240, 241, 340, 341. Second passages 247 lead between the coupler holding region 214, 314 and the guide channel 242, 342. Each second passage 247 extends between a spool 243, 343 from the first set and a spool 244, 344 from the second set. Retaining fingers may extend over the first and second passages 246, 247.

In some implementations, any of the cable assemblies 100, 150 disclosed herein can be routed within the cassette 200, 300. For example, the input connector(s) 133, 183 may be plugged into the rear port(s) of the optical adapter(s) 250, 350 at the first termination region 210, 310. The output connector 136, 186 may be plugged into the front port of the optical adapter 252, 352 at the second termination region 211, 311. The monitoring connector 137, 187 that monitors signals received at the input connector(s) 133, 183 may be plugged into a front port of the adapter 254, 354 at the second termination region 211, 311. If the cable assembly 100 includes bidirectional couplers 110, then the monitoring connector 138 that monitors signals received at the output connector 136, 186 may be plugged into a front port of the adapter 256, 356 at the second termination region 211, 311.

If the input connectors 133, 183 are optically spliced to the remainder of the cable assembly 100, 150, then the optical splices 134, 184 may be disposed in the splice retention stations 212a in the cable routing region 212, 312 on the first level L1 of the cassette 200, 300.

The optical couplers 110, 160 of the cable assembly 100, 150 are mounted to the optical coupler holding region 214, 314 on the second level L2 of the cassette 200, 300. For example, the optical couplers 110, 160 may be mounted to the divider tray 215, 315. In certain examples, the optical couplers 110, 160 are mounted so that the coupler input lines 112, 162 extend towards the same side as the first entrance/exit 240, 340 of the divider tray 215, 315 and the coupler output lines 114, 164 extend towards the same side as the second entrance/exit 241, 341 of the divider tray 215, 315. In certain examples, the couplers 110, 160 are oriented such that the coupler input fibers 112, 162 and coupler output fibers 114, 164 extend from the couplers 110, 160, through the second passages 247, to the guide channel 242, 342.

The optical splices 145-147, 194, 195, 197 of the cable assembly 100, 150 are mounted to the optical splice holding region 213, 313 on the second level L2 of the cassette 200, 300. For example, the optical splices 145-147, 194, 195, 197 may be mounted to the divider tray 215, 315. In certain examples, the optical splices 145-147, 194, 195, 197 are mounted so that the free ends 133, 163 of the coupler input fibers 112, 162 and free ends 115, 117 of the coupler output fibers 114, 116 extend in a first direction from the optical splices, through one of the first passages 246, to the guide channel 242, 342. First and second groups 124-127 of the optical circuit 120, 170 extend in a second direction from the optical splices 145-147, 194, 195, 197, through another of the first passages 246, to the guide channel 242, 342.

In some implementations, an optical cassette 200, 300 holds a single cable assembly 100, 150. In other implementations, an optical cassette 200, 300 holds multiple cable assemblies 100, 150. In certain implementations, a first cable assembly 100, 150 can be mounted primarily at a first side of the cassette 200, 300 and a second cable assembly 100, 150 can be mounted primarily at a second side of the cassette 200, 300. For example, the input connectors 133, 183 of the first cable assembly 100, 150 may be mounted at a first side of the first termination region 210, 310 and the input connectors 133, 183 of the second cable assembly 100, 150 may be mounted at a second side of the first termination region 210, 310.

In some implementations, the splice region 213 includes a plurality of support members between which the optical splices may be mounted (e.g., see FIG. 22). In other implementations, the splice region 313 includes a dividing wall 313a that separates out the splice region 313 into two sections (e.g., see FIG. 35). In certain examples, the optical splices 144 of the first cable assembly 100, 150 are disposed at a first of the sections and the optical splices 144 of the second cable assembly 100, 150 are disposed at a second of the sections as will be described in more detail herein.

In certain implementations, like connectors of the cable assemblies 100, 150 may be grouped together at the second termination region 211, 311. For example, the output connectors 136, 186 of two or more cable assemblies 100, 150 may be mounted at the same adapter or adapter block 256, 356 at the second termination region 211, 311 while the monitoring connectors 137, 187 may be mounted at a common adapter or adapter block 254, 354 at the second termination region 211, 311. In cables 100 with bidirectional couplers 110, the monitoring connectors 138 of the cables 100 may be mounted at a common adapter or adapter block 256, 356 at the second termination region 211, 311.

Figure 25:
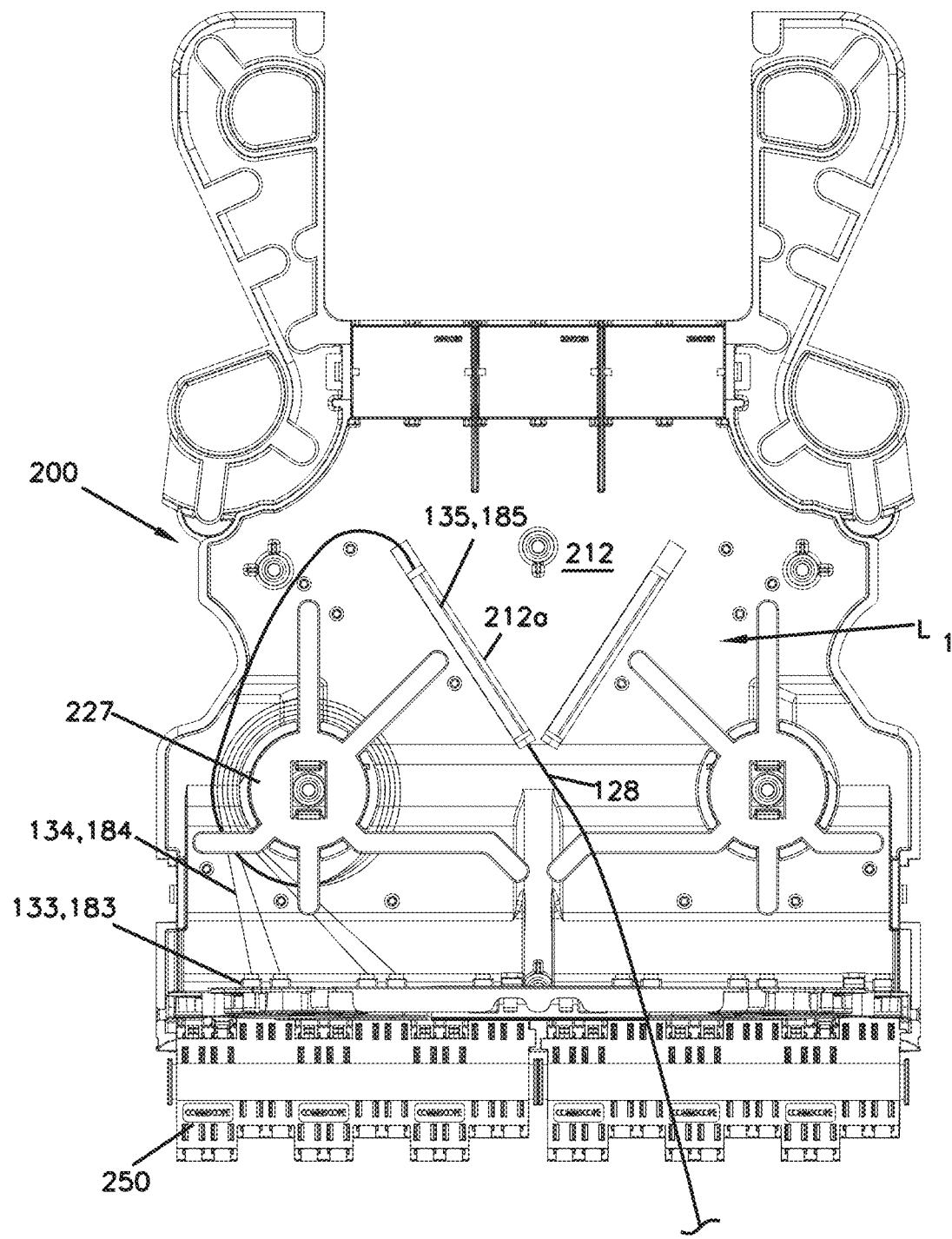
FIG. 25 is a top plan view of the body of the cassette of FIG. 17 showing the input lines of a first cable assembly routed along a first level of the cassette.
Figure 26:
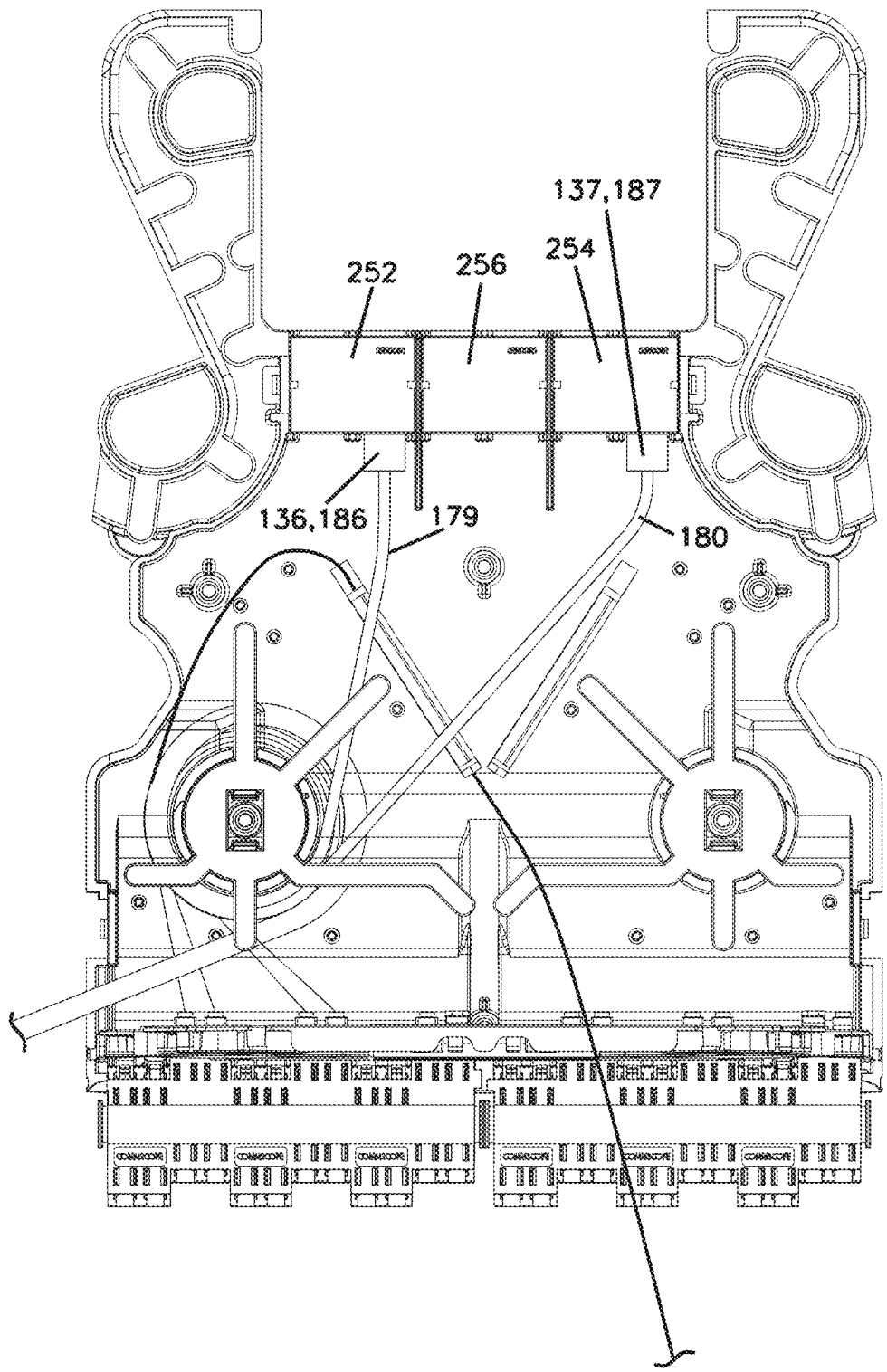
FIG. 26 is a top plan view of the body of the cassette of FIG. 25 with the output and monitoring lines of the cable assembly also shown routed along the first level of the cassette.
Figure 27:
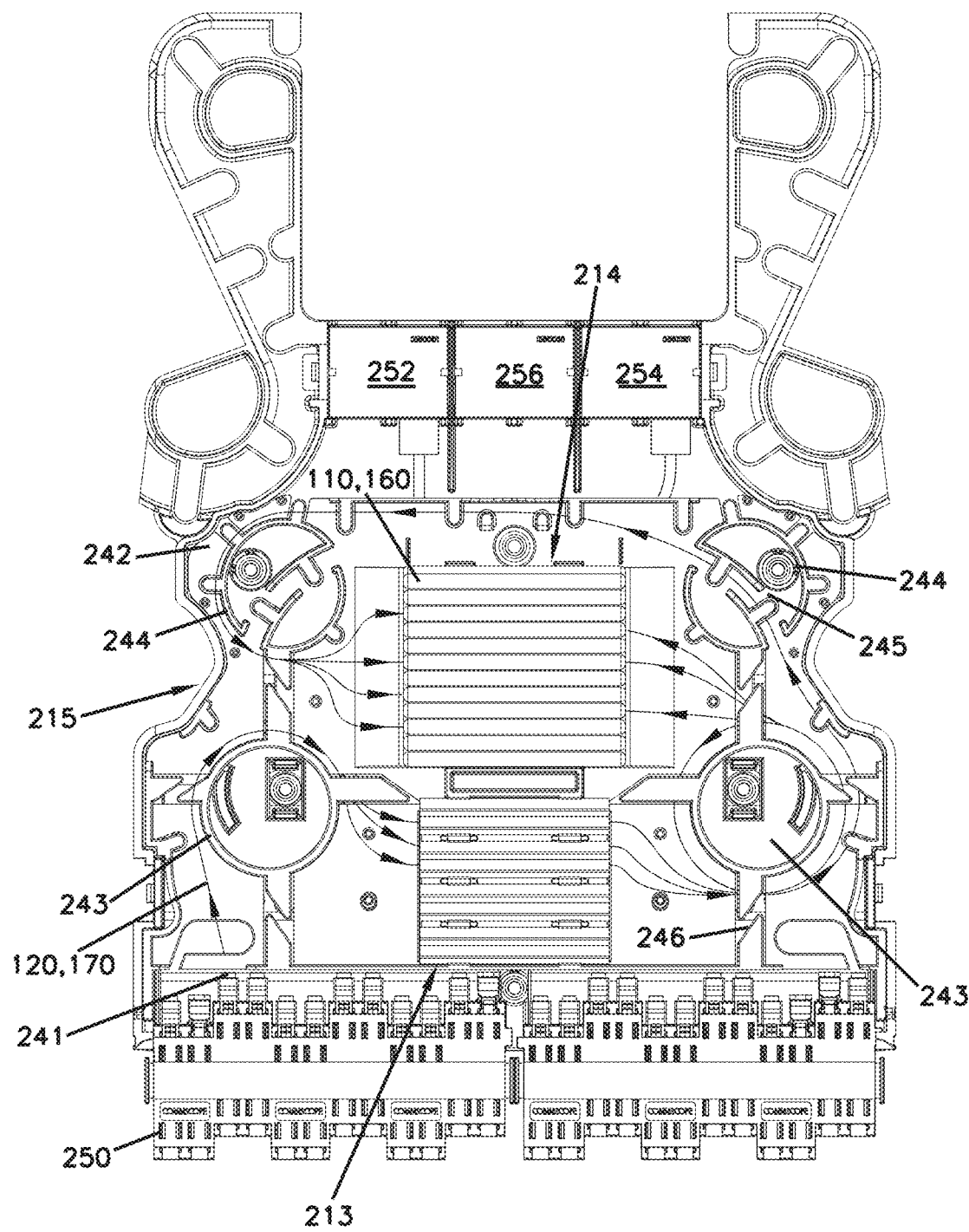
FIG. 27 is a top plan view of the cassette with the cover removed so that the divider tray is visible; cable routing along the divider tray is shown schematically.

FIGS. 25-27 illustrate an example routing scheme for a cable assembly 100, 150 within the cassette 200. As shown in FIG. 25, the input connectors 133, 183 of a first cable assembly 100, 150 are plugged into rear ports of optical adapters 250 at the first termination region 210. In certain examples, the input connectors 133, 183 are plugged into the rear ports of the optical adapters 250 at one side of the first termination region 210.

The fibers terminated by the input connectors 133, 183 are routed through the cable routing region 212 and towards the front 201 of the cassette 200. For example, stub fibers 134, 184 terminated by the input connectors 133, 183 may be wound around a bend radius limiter 227 at the cable routing region 212. An optical splice 135, 185 that optically couples the stub fibers 134, 184 to a third group 128, 178 of fibers of the optical circuit 120, 170 may be disposed at the splice retention station 212a. The third group 128, 178 of fibers of the optical circuit 120, 170 is routed towards the front 201 of the cassette 200. After the splice 135 is secured at the retention station 212a, the third group 128, 178 is further wound around the bend radius limiter 227 before transitioning to the second level L2.

As shown in FIG. 26, the output connector 136, 186 of the cable assembly 100, 150 is plugged into a front port of an output optical adapter 252 at the second termination region 211. The monitoring connector 137, 187 of the cable assembly 100, 150 is plugged into a front port of a first monitor optical adapter 254 at the second termination region 211. In certain examples, the output connector 136, 186 is plugged into one of two rear ports of the output optical adapter 252 and the monitoring connector 137, 187 is plugged into one of two rear ports of the monitor optical adapter 254. In certain examples, a second monitor connector 138, 188 is plugged into a front port of a second monitor optical adapter 256.

The fourth group 129, 179 of the second ends of the fibers 121, 171 of the optical circuit 120, 170 is routed from the output connector 136, 186 and wound around the bend radius limiter 227 with the stub fibers 134, 184 (or other input lines). The fifth group 130, 180 of the second ends of the fibers 121, 171 of the optical circuit 120, 170 is routed from the monitoring connector 136, 186 and wound around the bend radius limiter 227 with the fourth group 129, 179 and the stub fibers 134, 184 (or other input lines).

In certain implementations, the substrate 139, 189 has been removed from the optical circuit 120, 170. Accordingly, the optical fibers 121, 171 of the optical circuit 120, 170 are freely bendable and movable by the user. As the optical circuit 120, 170 is routed through the cable routing region 212 and/or between the first level L1 and the second level L2, the optical fibers 121, 171 transition from the third, fourth, fifth, and sixth groups 128-131, 178-180 to the first and second groups 125-127, 174, 175, 177. For example, the optical circuit 120, 170 may be routed onto the divider tray 215 through one of the entrances/exits 240, 241.

Figure 28:
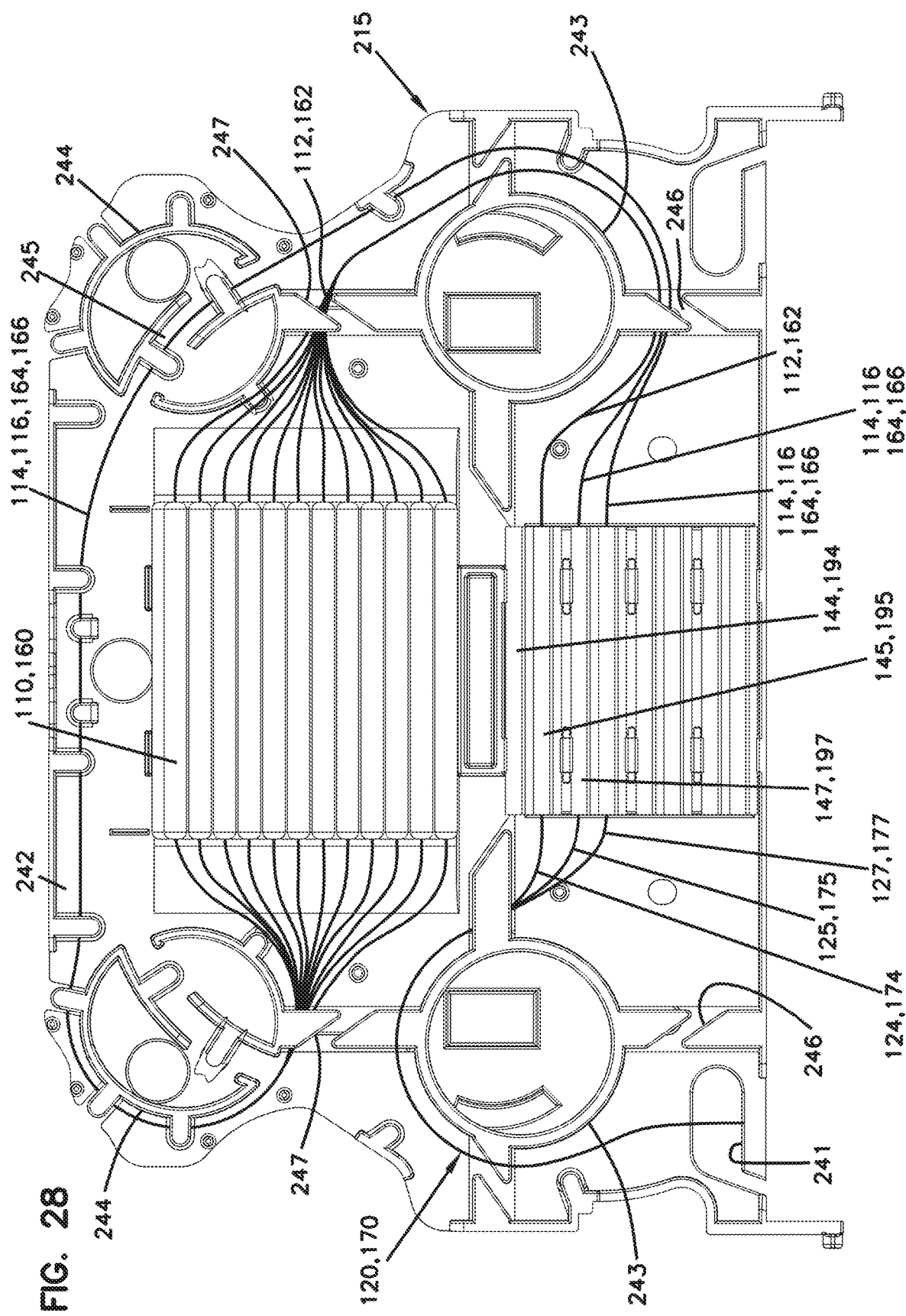
FIG. 28 is an enlarged top plan view of the divider tray of FIG. 27 showing how the fiber groups of a first optical cable assembly are routed.

As shown in FIGS. 27 and 28, the first and second groups 125-127, 174, 175, 177 are routed over the second level L2 of the cassette. The first and second groups 125-127, 174, 175, 177 are routed at least partially around one of the first bend radius limiters 243 of the divider tray 215, through one of the second passages 247, to the optical splice holding region 213.

An optical splice 144, 194 between the first group 124, 174 and the coupler input fibers 112, 162 is mounted at the optical splice holding region 213. The coupler input fibers 112, 162 are routed from the optical splice holding region 213, through one of the first passages 246, around one of the bend radius limiters 243, through one of the second passages 247, to the optical coupler holding region 214. The optical coupler 110, 160 from which the coupler input fibers 112, 162 extend is mounted at the optical coupler holding region 214.

An optical splice 145, 195 between the second group 125, 175 and some of the coupler output fibers 114, 116, 164, 166 is mounted at the optical splice holding region 213. The coupler output fibers 114, 116, 164, 166 are routed from the optical splice holding region 213, through one of the first passages 246, around one of the bend radius limiters 243, and around the tray 215 to an opposite side of the optical splice holding region 214. For example, the coupler output fibers 114, 116, 164, 166 may be routed from the first bend radius limiter 243, through the guide channel 242, through the bypass channel 245 in one of the second bend radius limiters 244, further along the guide channel 242 past the optical splice holding region 214, around another of the second bend radius limiters 244, through another of the second passages 247, to the optical coupler holding region 214 at which the optical coupler 110, 160 from which the some of the coupler output fibers 114, 116, 164, 166 extend is mounted.

An optical splice 147, 197 between another of the second groups 127, 177 and others of the coupler output fibers 114, 116, 164, 166 is mounted at the optical splice holding region 213. The coupler output fibers 114, 116, 164, 166 are routed from the optical splice holding region 213, through one of the first passages 246, around one of the bend radius limiters 243, and around the tray 215 to an opposite side of the optical splice holding region 214. For example, the coupler output fibers 114, 116, 164, 166 may be routed from the first bend radius limiter 243, through the guide channel 242, through the bypass channel 245 in one of the second bend radius limiters 244, further along the guide channel 242 past the optical splice holding region 214, around another of the second bend radius limiters 244, through another of the second passages 247, to the optical coupler holding region 214 at which the optical coupler 110, 160 from which the others of the coupler output fibers 114, 116, 164, 166 extend is mounted.

In certain implementations, a second cable assembly 100, 150 also can be installed within the cassette 200. In certain examples, the input connectors 133, 183 of the second cable assembly 100, 150 may be plugged into the rear ports of the optical adapters 250 at an opposite side of the first termination region 210 from the input connectors 133, 183 of the first cable assembly 100, 150. In certain examples, the output connector 136, 186 of the second cable assembly 100, 150 is plugged into the other of the two rear ports of the output optical adapter 252 and the monitoring connector 137, 187 is plugged into the other of the two rear ports of the monitor optical adapter 254.

Figure 29:
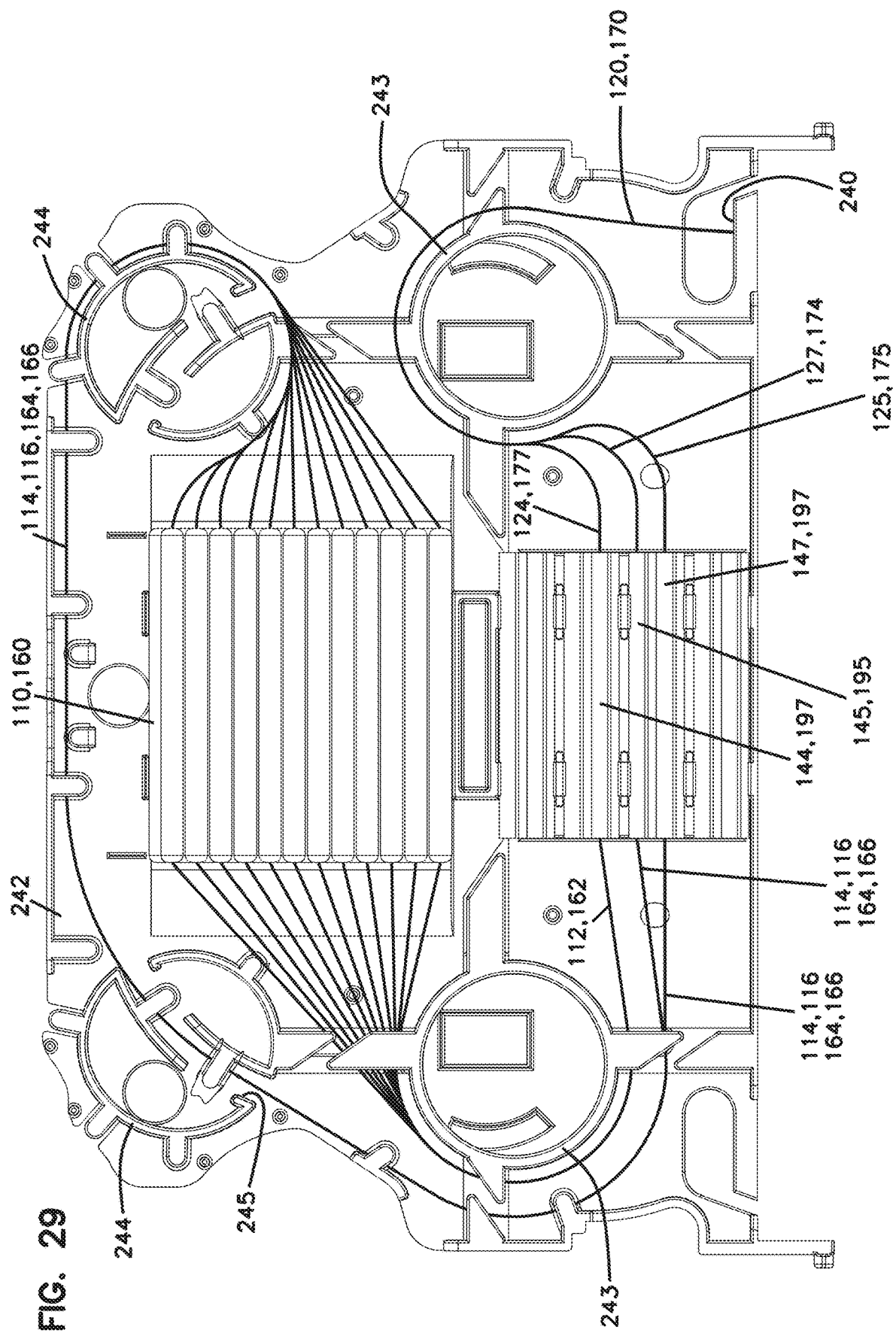
FIG. 29 is a top plan view of the divider tray of FIG. 27 showing how a second optical cable assembly can be routed along the divider tray; the first cable assembly being hidden from view for ease in viewing the second cable assembly.
Figure 30:
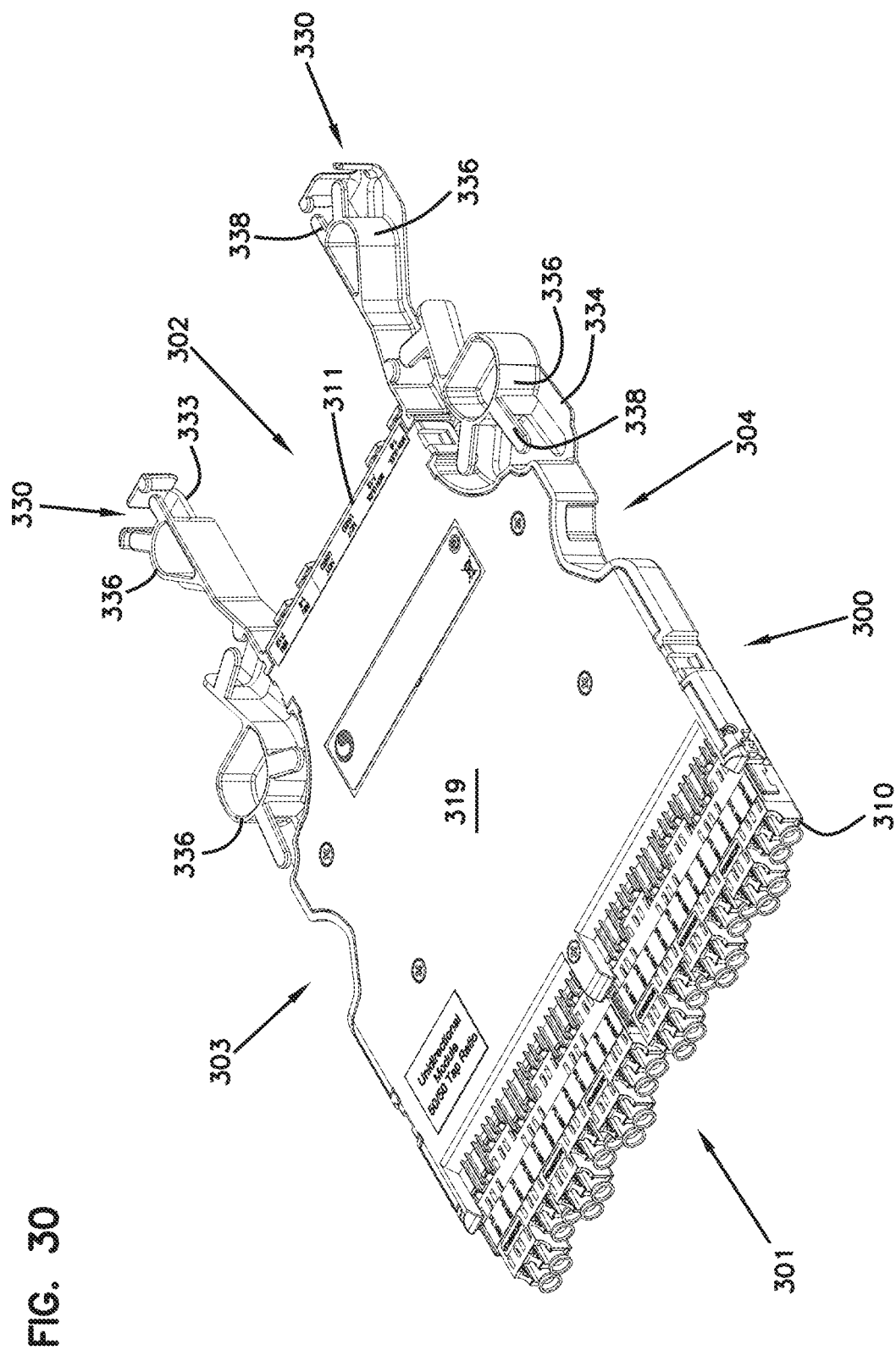
FIG. 30 is a top, front perspective view of another example optical cassette configured in accordance with the principles of the present disclosure.
Figure 31:
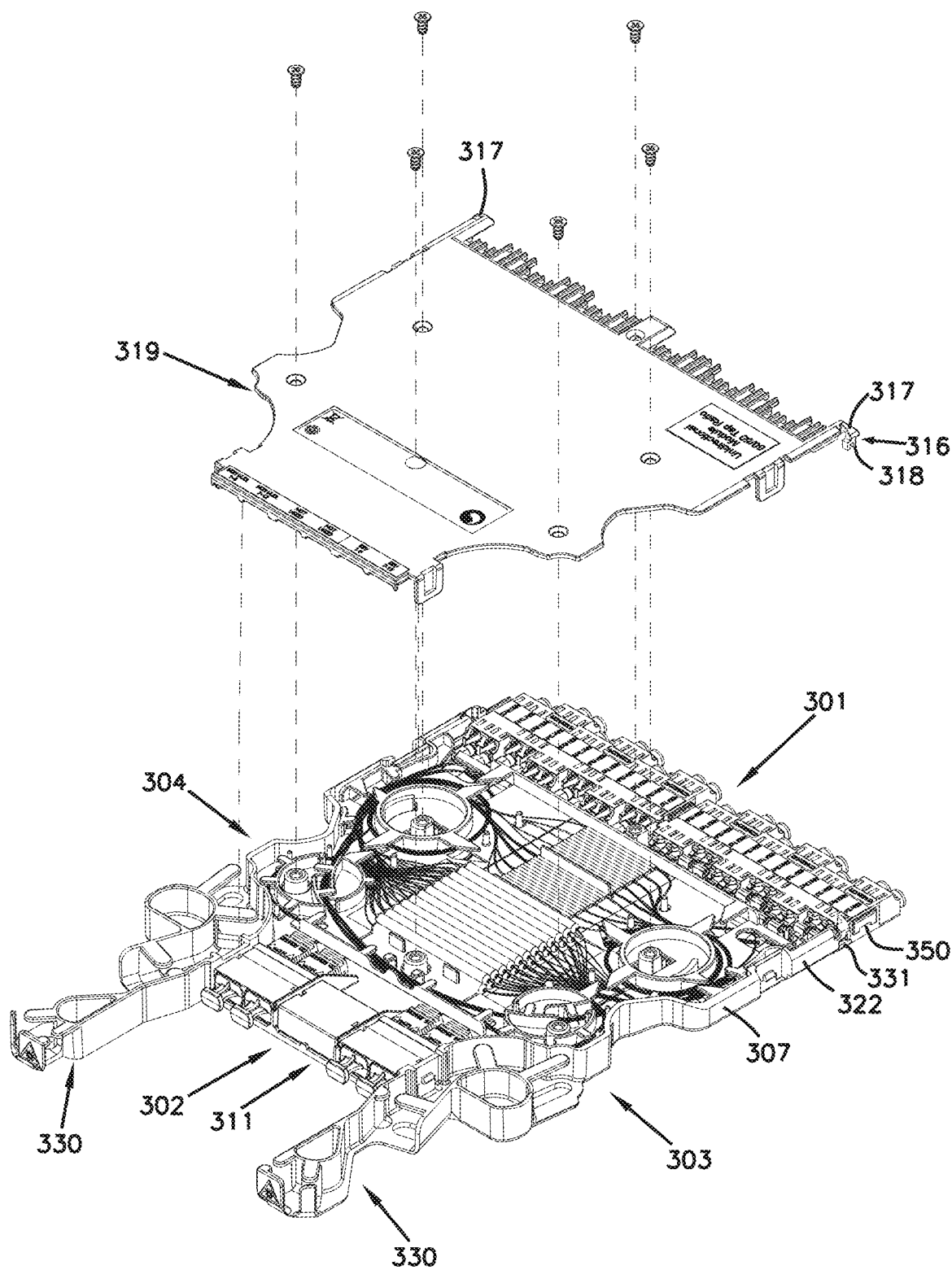
FIG. 31 shows the cassette of FIG. 30 with the cover exploded upwards so that the dividing tray is visible.
Figure 32A:
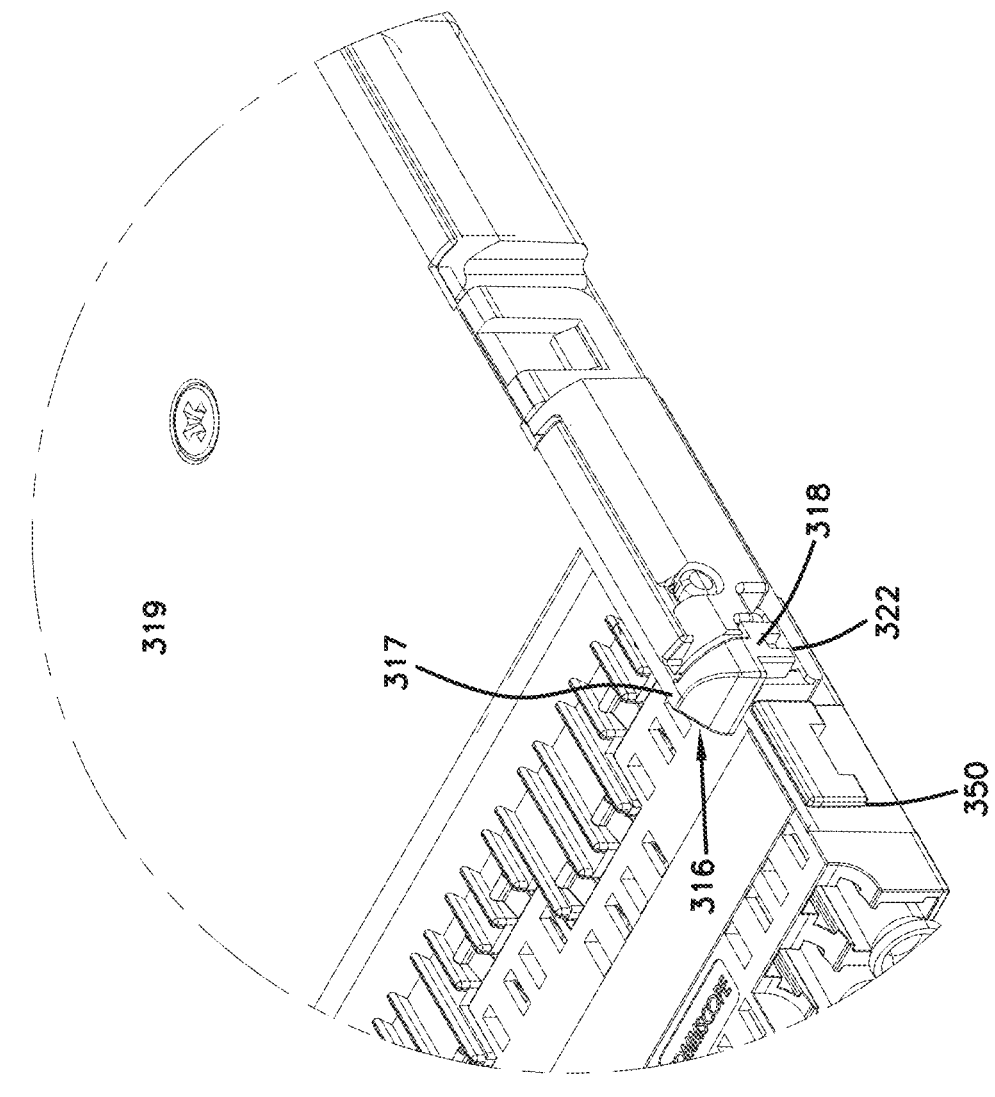
FIG. 32A is a perspective view of an enlarged portion of the cassette of FIG. 30 showing a securing arrangement that inhibits removal of the adapter blocks from the cassette body.

As shown in FIG. 29, the second cable assembly 100, 150 is routed in a mirror image of the first cable assembly 100, 150. For ease in viewing, the first cable assembly 100, 150 is not visible in FIG. 29. The optical circuit 120, 170 of the second cable assembly 100, 150 may be routed onto the divider tray 215 using the other entrance/exit 241, 240. In certain implementations, the couplers 110, 160 and optical splices 144, 145, 146, 147, 194, 195, 197 of the second cable assembly 100, 150 are rotated 180° relative to the couplers 110, 160 and optical splices 144, 145, 146, 147, 194, 195, 197 of the first cable assembly 100, 150 to accommodate the mirrored cable routing. In certain examples, the couplers 110, 160 of the first cable assembly 100, 150 form a first row at the optical coupler holding region 214 and the couplers 110, 160 of the second cable assembly 100, 150 form a second row disposed over the first row at the optical coupler holding region 214.

Figure 38:
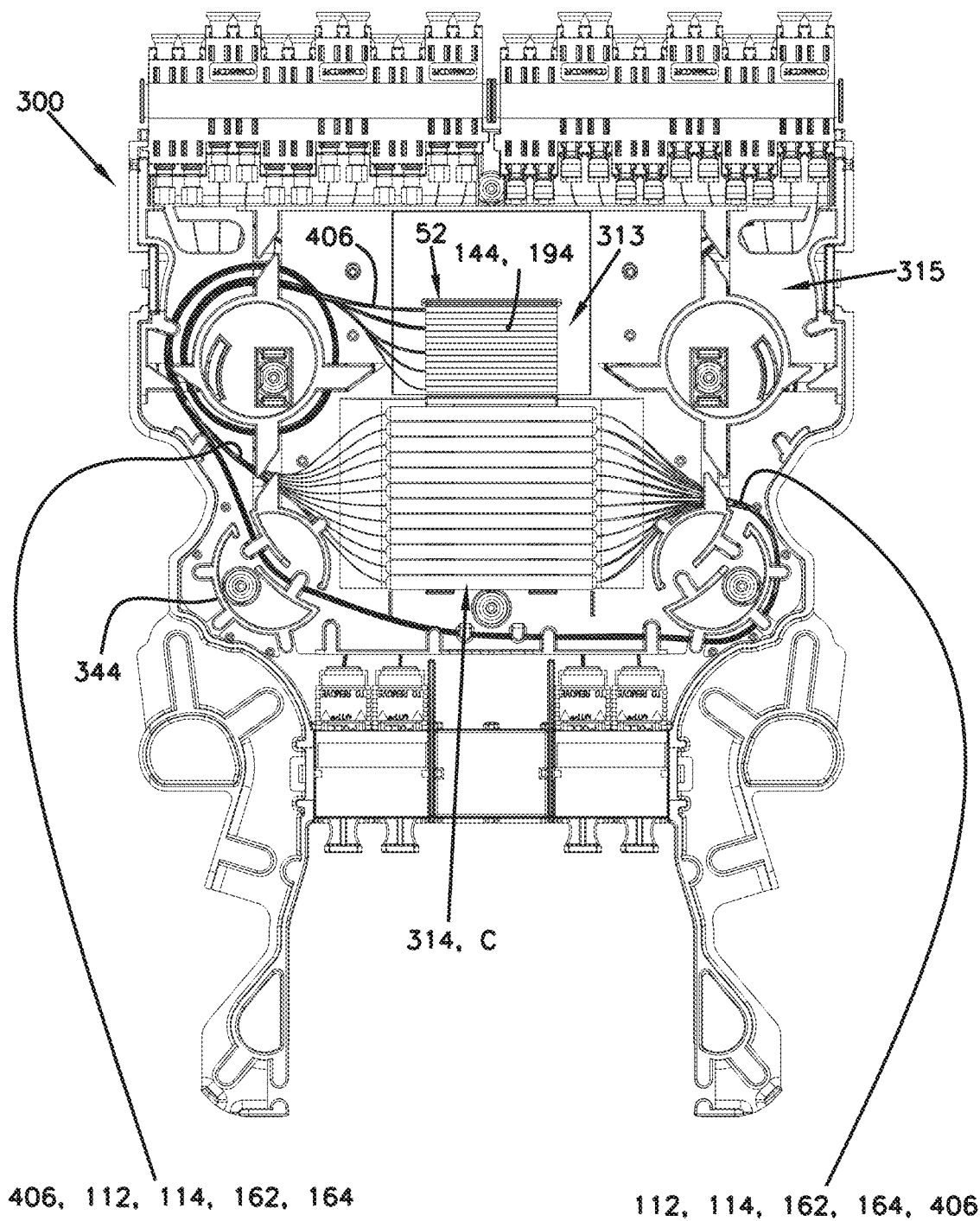
FIG. 38 is a top plan view of the cassette of FIG. 37 showing a second portion of the cable routing on the second level for the first cable assembly, the first portion of the cable routing being hidden; the cable routing is the same for both a unidirectional cable assembly and a bidirectional cable assembly.
Figure 39:
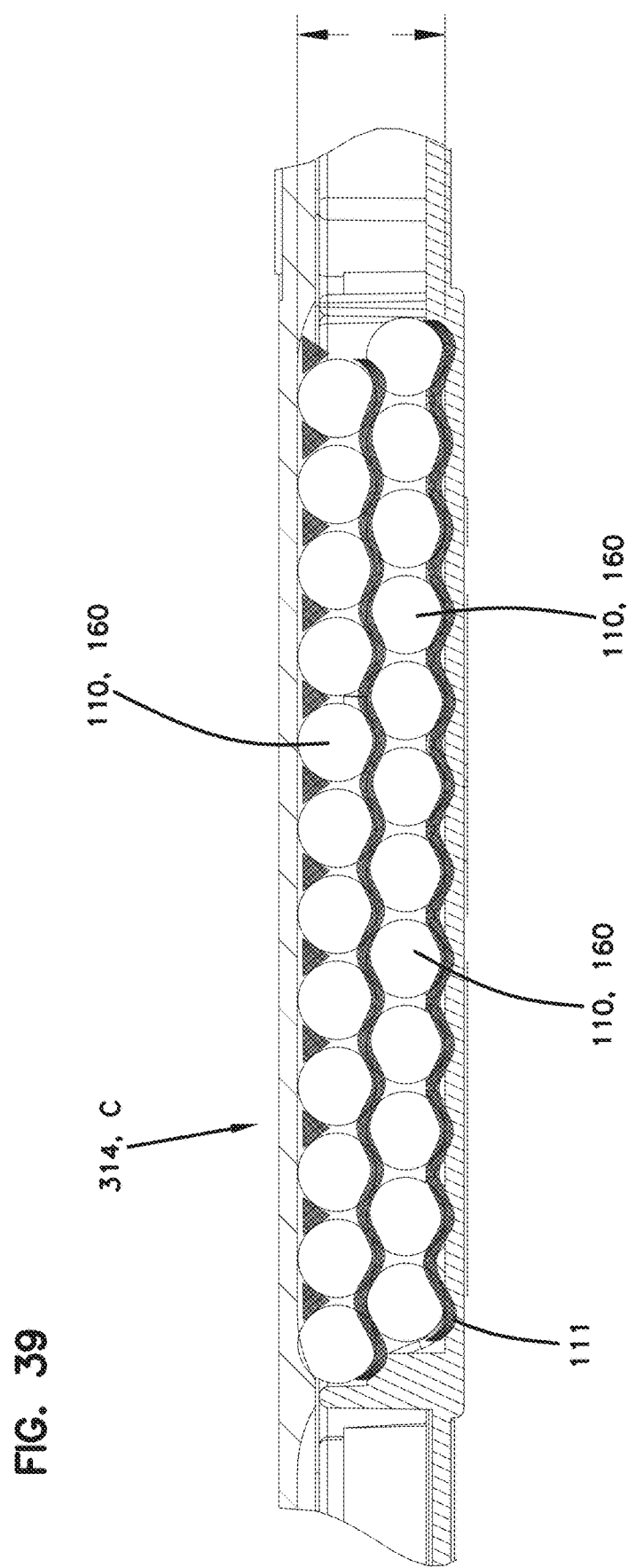
FIG. 39 is a cross-sectional view of the coupler holding region on the divider tray of the cassette of FIG. 30.
Figure 40:
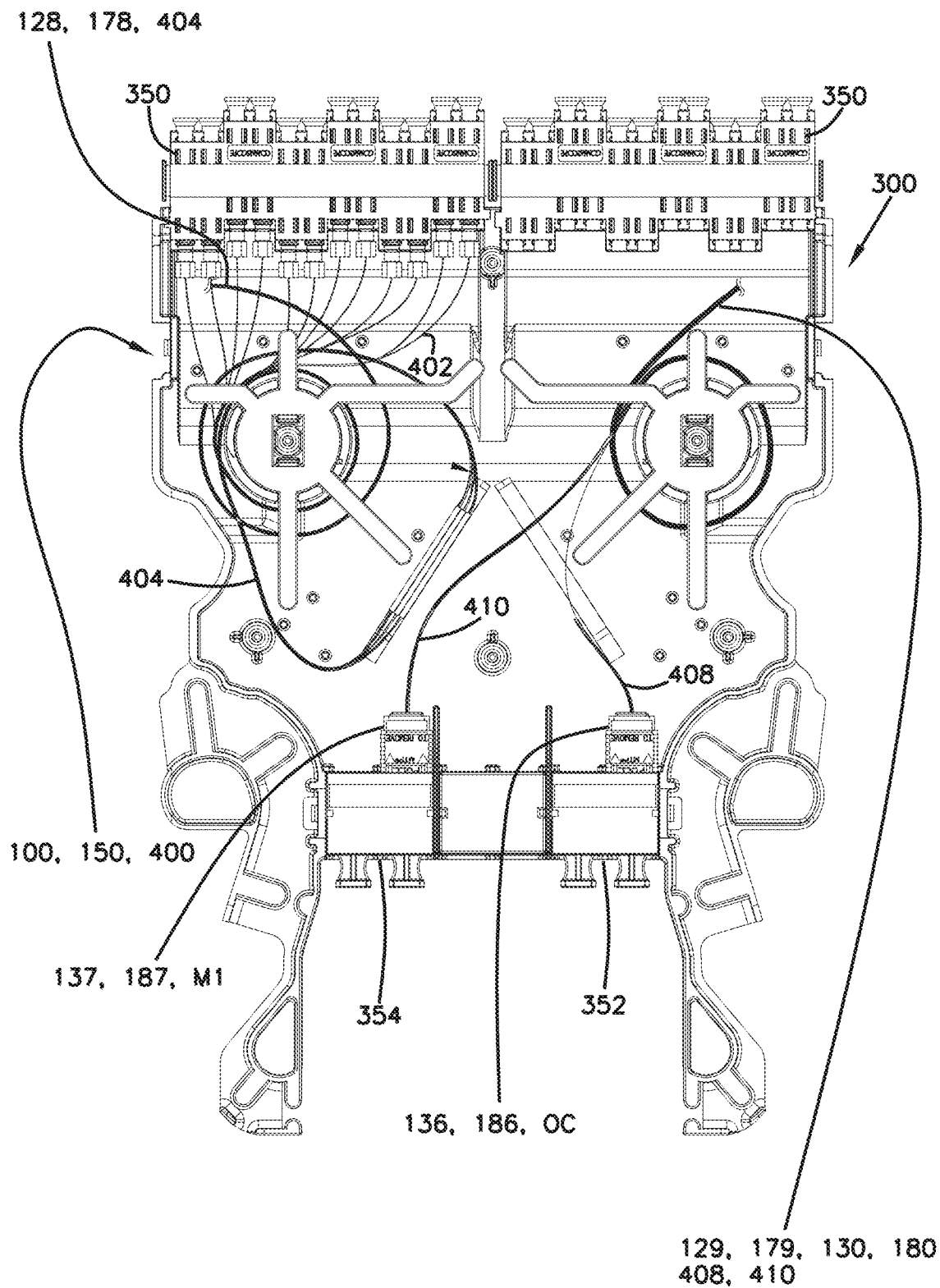
FIGS. 40-42 show the routing for a second cable assembly within the cassette of FIG. 30.
Figure 41:
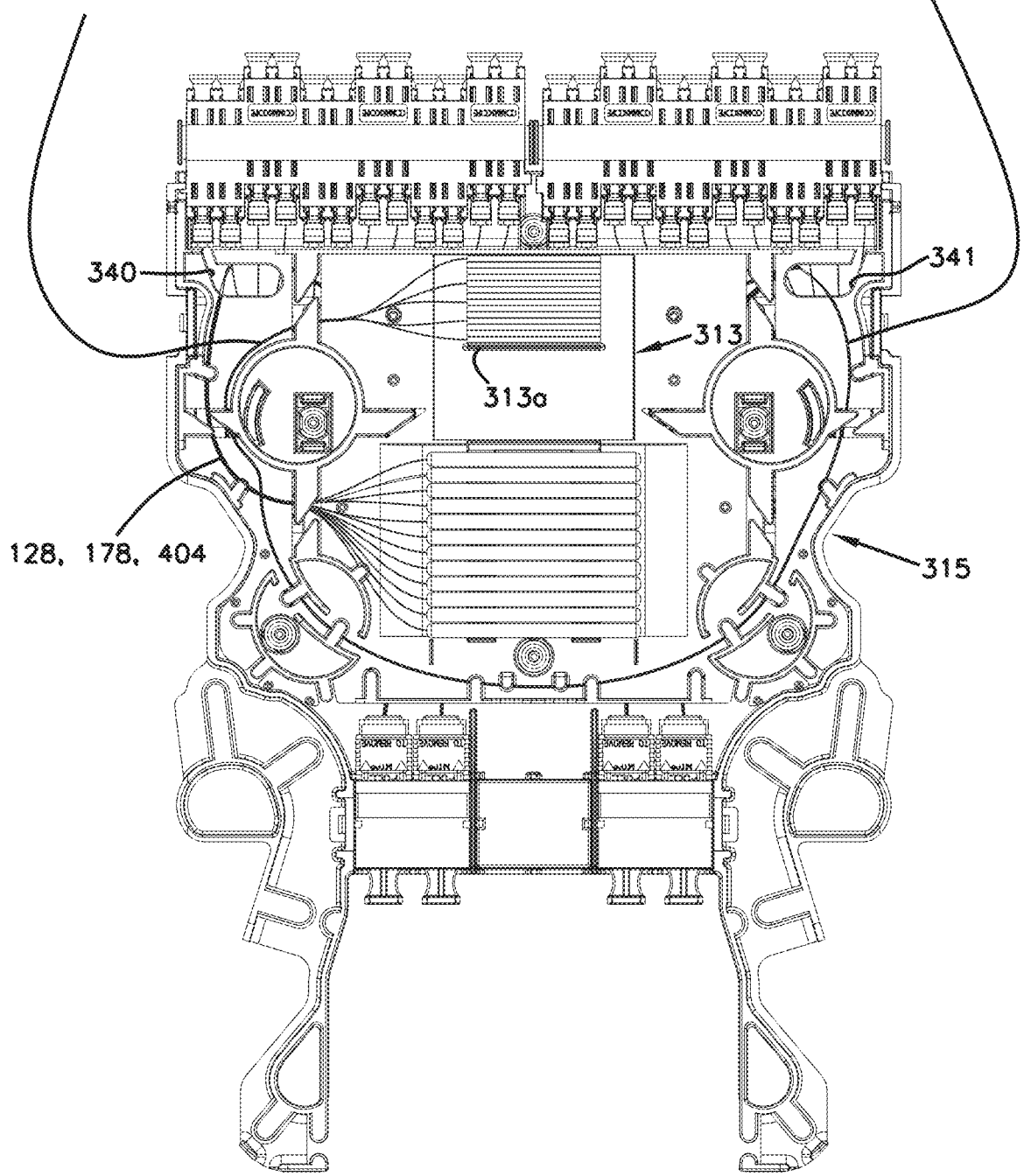
Figure 42:
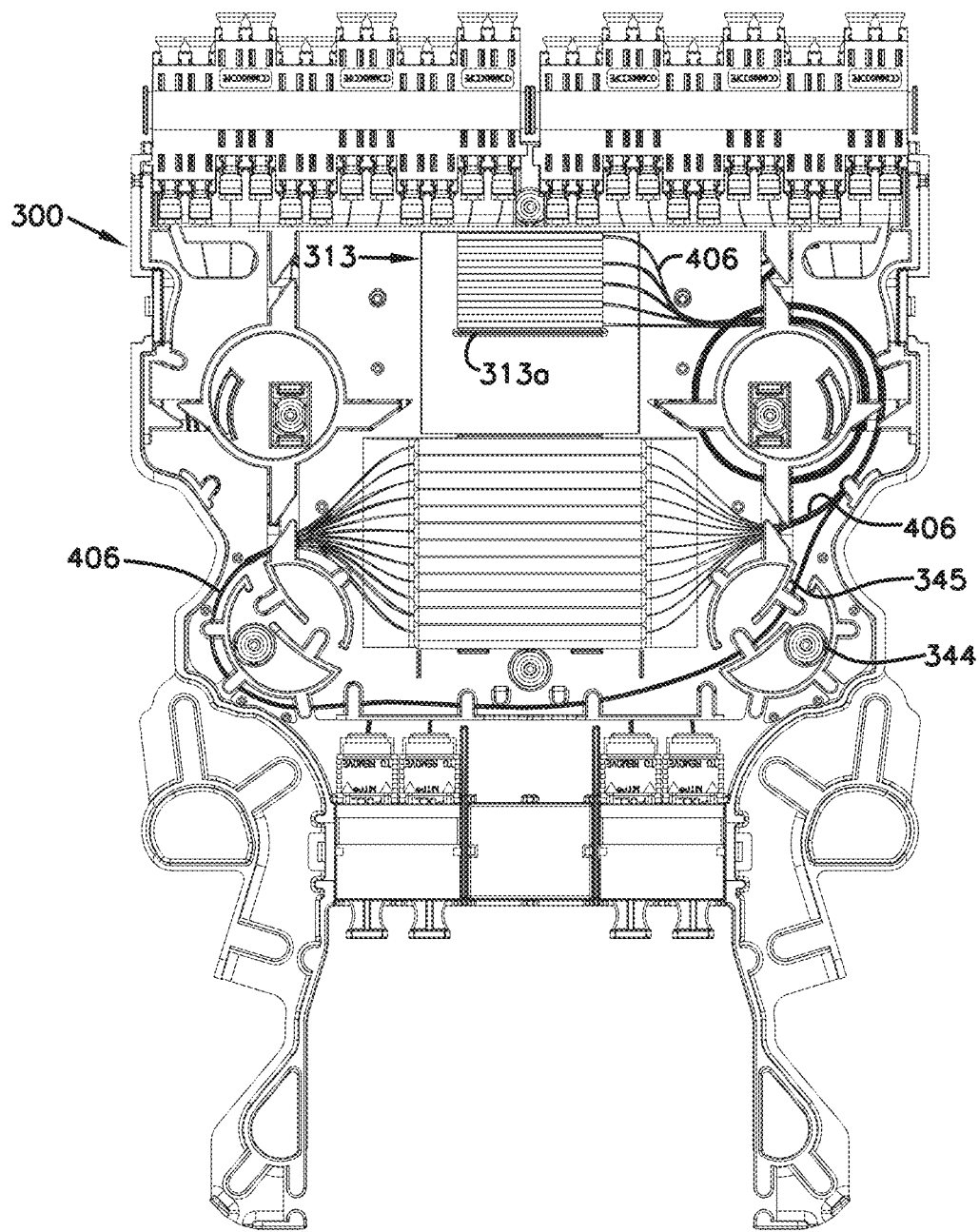
Figure 43:
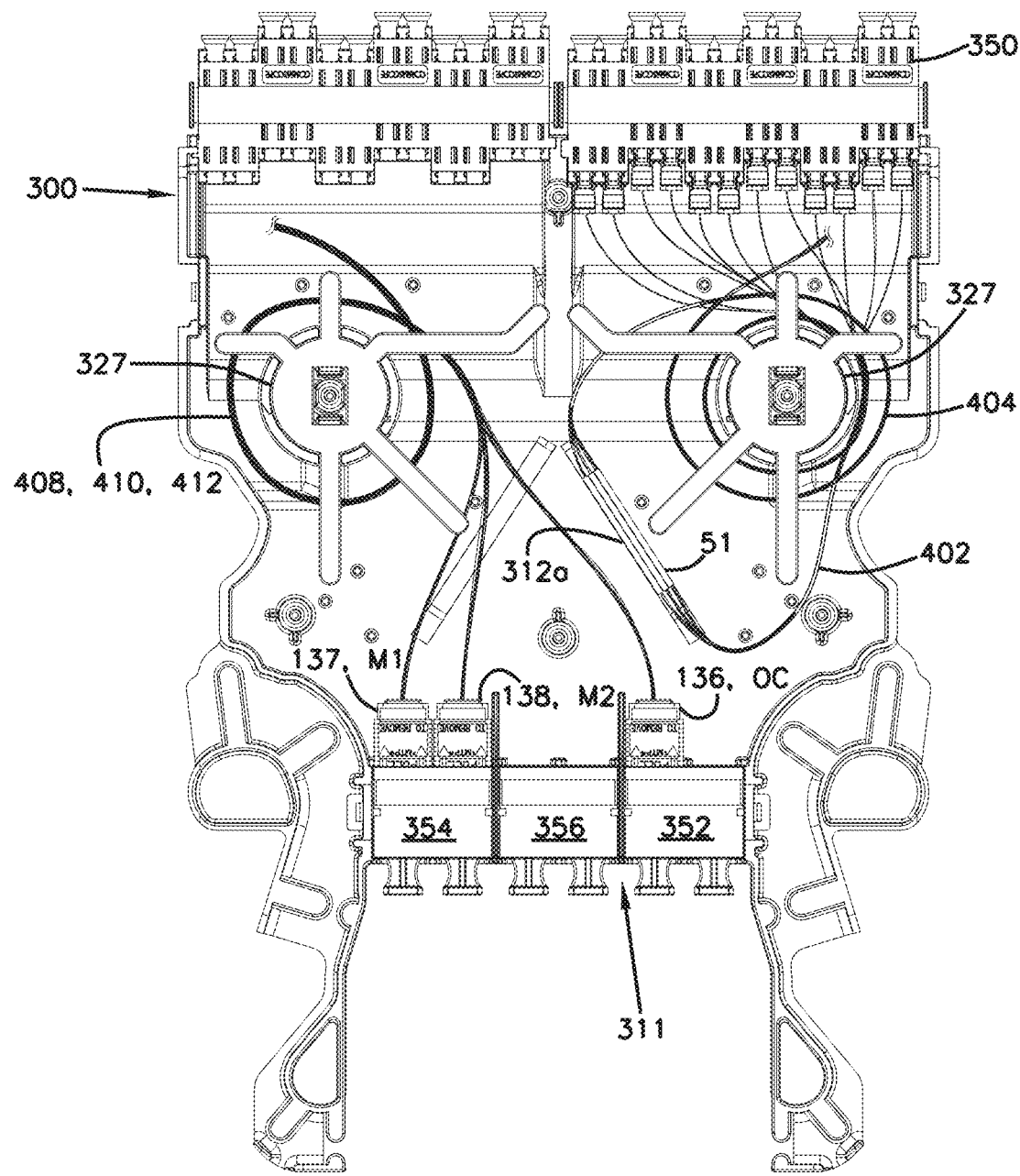
FIGS. 43 and 44 show the cable routing on the first level L1 of the cassette of FIG. 30 when the first and second cable assemblies are bidirectional cable assemblies.
Figure 44:
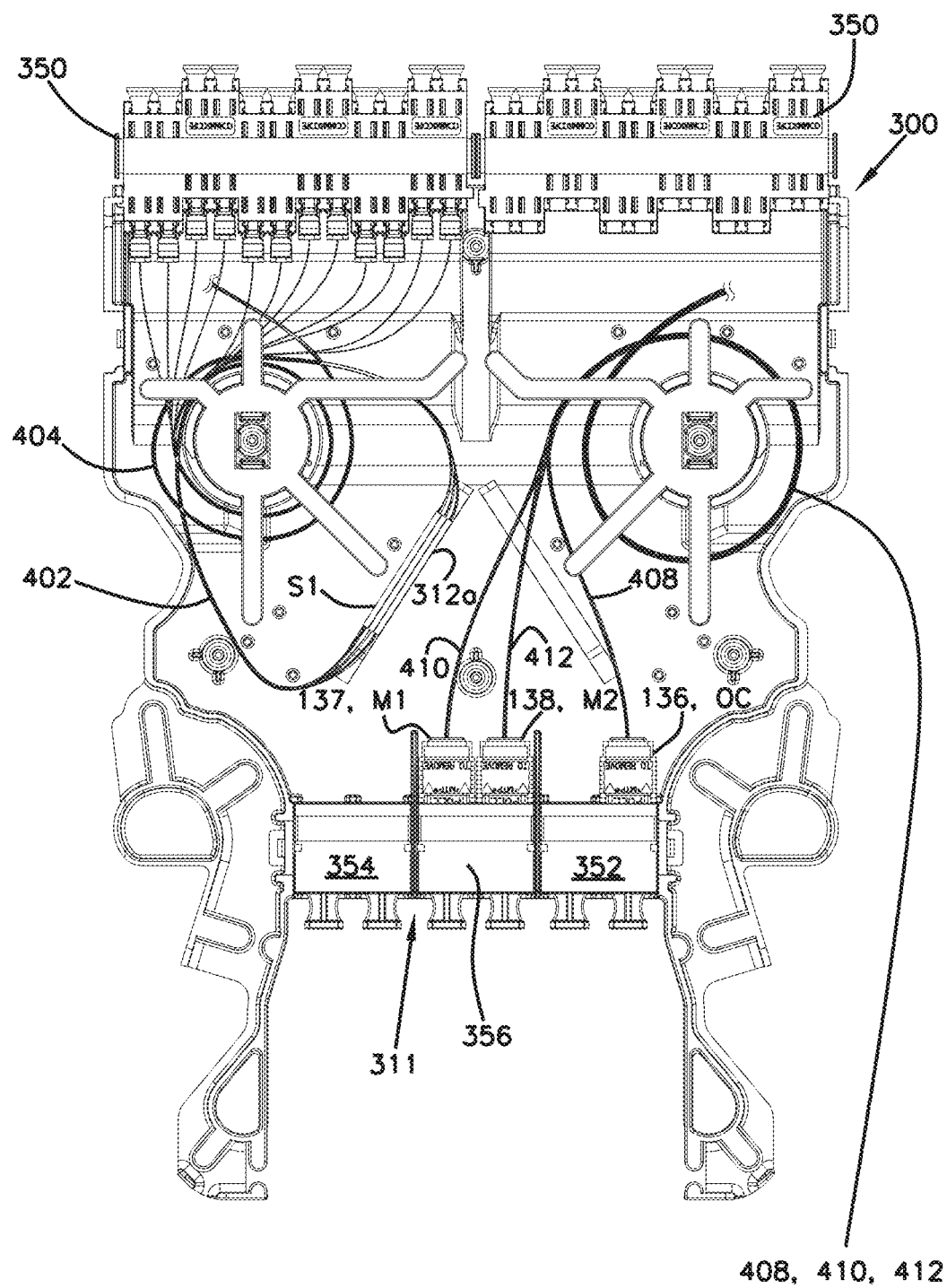

FIGS. 36-44 illustrate example routing schemes for a cable assembly 100, 150, 400 within the cassette 300. FIGS. 36-39 show the routing for a first cable assembly 100, 150, 400 within the cassette. FIGS. 40-42 show the routing for a second cable assembly 100, 150, 400 within the cassette. In FIGS. 36 and 40, the first and second cable assemblies 100, 150, 400 are unidirectional cable assemblies. FIGS. 43 and 44 show the cable routing on the first level L1 of the cassette 300 when the first and second cable assemblies 100, 150, 400 are bidirectional cable assemblies.

As shown in FIG. 36, the input connectors 133, 183, IC of a first cable assembly 100, 150, 400 are plugged into rear ports of optical adapters 350 at the first termination region 310. In certain examples, the input connectors 133, 183, IC are plugged into the rear ports of the optical adapters 350 at one side of the first termination region 310.

Stub fibers 134, 184, 402 terminated by the input connectors 133, 183, IC may be wound around a bend radius limiter 327 at the cable routing region 312. One or more optical splices 135, 185, S1 that optically couples the input connectors 133, 183, IC to the optical couplers 110, 160 may be disposed at the splice retention station 312a. In certain examples, the optical splice(s) 135, 185 optically couple the stub fibers 134, 184 to the third group 128, 178 of fibers of the optical cable assembly 100, 150. In certain examples, the optical splice(s) S1 optically couples the input fibers 402 to the fibers 406 at the first side of the coupler region C.

The third group 128, 178 of fibers (or fibers 406) is routed towards the front 301 of the cassette 300. For example, the third group 128, 178 (or fibers 406) may be wound around the bend radius limiter 327 one or more times. The third group 128, 178 (or fibers 406) can then be transitioned to the second level L2 by entering the divider tray 315 through one of the entrances/exits 340, 341.

As further shown in FIG. 36, the output connector 136, 186, OC of the cable assembly 100, 150, 400 is plugged into a front port of an output optical adapter 352 at the second termination region 311. The first monitoring connector 137, 187, M1 of the cable assembly 100, 150, 400 is plugged into a front port of a first monitor optical adapter 354 at the second termination region 311. In certain examples, a second monitor connector 138, 188, M2 may be plugged into a front port of a second monitor optical adapter 356 (e.g., see FIG. 44). The fourth group 129, 179 of fibers 121, 171 (or fibers 408) and the fifth group 130, 180 of fibers 121, 171 (or fibers 410) are routed from the second termination region 311, wound one or more times around one of the bend radius limiters 327, and routed towards the front 301 of the cassette 300. The fourth and fifth groups 129, 179, 130, 180 of fibers (or fibers 410, 412) can then be transitioned to the second level L2 by entering the divider tray 315 through one of the entrances/exits 340, 341.

In the example shown in FIG. 36, the fourth and fifth groups 129, 179, 130, 180 of fibers (or fibers 410, 412) are wound around a different bend radius limiter 327 than the third group 128, 178 of fibers (or fibers 404). In the example shown, the fourth and fifth groups 129, 179, 130, 180 (or fibers 408, 410) enter the divider tray 315 through a different entrance/exit 340, 341 than the third group 128, 178 (or fibers 404).

As shown in FIGS. 37 and 38, the third group 128, 178 (or fibers 404), the fourth group 129, 179 (or fibers 408), and the fifth group 130, 180 (or fibers 410) of the optical circuit are routed over the second level L2 of the cassette 300. As shown in FIG. 37, the third fiber group 128, 178 (or fibers 404) are routed from the second entrance 341, through guide channel 342, to one side of the coupler region C. The fourth and fifth fiber groups 129, 179, 130, 180 (or fibers 408, 410) are routed from the first entrance 340, through the guide channel 342, through bypass channels 345, at least partially around one of the first bend radius limiters 343, to the optical splice holding region 313. In certain examples, the fibers 404 enter the coupler holding region 314, C and the fibers 408, 410, 412 enter the splice holding region 313 from a common side of the divider tray 315.

In certain examples, the fourth and fifth fiber groups 129, 179, 130, 180 (or fibers 408, 410, 412) of a first cable assembly 400 are routed to a first section of the splice holding region 313 (e.g., see FIG. 37) and the fourth and fifth fiber groups 129, 179, 130, 180 (or fibers 408, 410, 412) of a second cable assembly 400 are routed to a second section of the splice holding region 313 (e.g., see FIG. 41).

As shown in FIG. 38, the optical lines are routed between the splice holding region 313, S2 and the coupler holding region 314, C. For ease in viewing, the fibers shown routed in FIG. 37 are hidden from view. In certain examples, in FIG. 38, the coupler input fibers 112, 162 extend between the splice holding region 313 and the coupler holding region 314. In certain examples, the fibers 406 extend between the second splice region S2 and the coupler holding region C. One or more optical splices 144, 194 between the fibers 124-127, 174-177, 408, 410, 412 and the coupler input and output fibers 112, 114, 162, 164, 406 are disposed at the splice holding region 313, S2.

FIG. 39 illustrates one example configuration of couplers 110, 160 disposed at the coupler holding region 314, C. In the example shown, the couplers 110, 160 are mounted in two rows. A first layer of adhesive 111 holds a bottom row of couplers 110, 160 to the divider tray 315. A second layer of adhesive holds an upper row of couplers 110, 160 to the bottom row.

As shown in FIGS. 41 and 42, a second cable assembly 400 can be mounted to the cassette 300 in a mirror configuration from the first cable assembly 400. The fibers 404 of the second cable assembly 400 extend from the first entrance 340 of the divider tray 315 to the coupler holding region 314, C. The fibers 408, 410, 412 of the second cable assembly 400 extend from the second entrance 341 of the divider tray 315 to the splice holding region 313. In certain examples, the fibers 404 enter the coupler holding region 314, C and the fibers 408, 410, 412 enter the splice holding region 313 from a common side of the divider tray 315.

As shown in FIGS. 43 and 44, bidirectional cables 100, 400 include an output connector 136, OC, a first monitoring connector 137, M1, and a second monitoring connector 138, M2 received at the second termination region 311. The output lines 136, 408 and monitoring lines 137, 138, 410, 412 are routed around a bend radius limiter 327 and towards the front 301 of the cassette to be transitioned to the second level L2. The input lines 134, 402 are routed to a splice retention station 312a, S1 at which the input lines 402 are spliced to coupler input and/or output lines 112, 114, 404. The coupler input output lines 112, 114, 404 are routed around another bend radius limiter 327 and towards the front 301 of the cassette 300 to be transitioned to the second level L2. The routing on the second level L2 for the first of the bidirectional cable 100, 400 of FIG. 43 is shown in FIGS. 37 and 38. The routing on the second level L2 for the second of the bidirectional cable 100, 400 of FIG. 44 is shown in FIGS. 41 and 42.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Other Aspects of the Disclosure

Aspect 1. An optical cable assembly comprising:

a plurality of optical couplers, each optical coupler having at least one coupler input fiber, a first coupler output fiber, and a second coupler output fiber;

a plurality of optical fibers adhesively laid on a substrate to form an optical circuit, each optical fiber extending from an unterminated first end to an unterminated second end, the optical circuit separating the unterminated first ends of the optical fibers into a plurality of groups including a first group and a second group, the first group of the unterminated first ends being spliced to free ends of at least some of the coupler input fibers, the second group of the unterminated first ends being spliced to free ends of at least some of the first and second coupler output fibers, the optical circuit also separating the unterminated second ends of the optical fibers into another plurality of groups including a third group, a fourth group, and a fifth group;

one or more input plug connectors terminating the third group of the unterminated second ends to optically couple the one or more input plug connectors to at least some of the input coupler fibers;

one or more output plug connectors terminating the fourth group of the unterminated second ends to optically couple the one or more output plug connectors to at least some of the output coupler fibers; and one or more monitor plug connectors terminating the fifth group of the unterminated second ends to optically couple the one or more monitor plug connectors to others of the output coupler fibers.

Aspect 2. An optical cable assembly comprising:

a plurality of optical couplers, each optical coupler having at least one coupler input fiber, a first coupler output fiber, and a second coupler output fiber;

an optical circuit having been manufactured on a flexible substrate, the optical circuit including a plurality of optical fibers, each optical fiber extending from an unterminated first end to an unterminated second end and being free to flex along a length of the optical fiber, the optical circuit separating the unterminated first ends of the optical fibers into a plurality of ribbonized groups including a first group and a second group, the first group of the unterminated first ends being spliced to free ends of at least some of the coupler input fibers, the second group of the unterminated first ends being spliced to free ends of at least some of the first and second coupler output fibers, the optical circuit also separating the unterminated second ends of the optical fibers into another plurality of ribbonized groups including a third group, a fourth group, and a fifth group;

one or more input plug connectors terminating the third group of the unterminated second ends to optically couple the one or more input plug connectors to at least some of the input coupler fibers after removing the flexible substrate;

one or more output plug connectors terminating the fourth group of the unterminated second ends to optically couple the one or more output plug connectors to at least some of the output coupler fibers after removing the flexible substrate; and one or more monitor plug connectors terminating the fifth group of the unterminated second ends to optically couple the one or more monitor plug connectors to others of the output coupler fibers after removing the flexible substrate.

Aspect 3. The optical cable assembly of Aspect 1 or Aspect 2, wherein the one or more input plug connectors include one multi-fiber plug connector that receives all of the second ends of the third group.

Aspect 4. The optical cable assembly of Aspect 1 or Aspect 2, wherein the one or more input plug connectors include a plurality of single-fiber plug connectors that each receive a respective one of the second ends of the third group.

Aspect 5. The optical cable assembly of Aspect 1 or Aspect 2, wherein the one or more input plug connectors include a plurality of duplex-fiber plug connectors that each receive a respective pair of the second ends of the third group.

Aspect 6. The optical cable assembly of Aspect 1 or Aspect 2, wherein the one or more output plug connectors include one multi-fiber plug connector that receives all of the second ends of the fourth group.

Aspect 7. The optical cable assembly of Aspect 1 or Aspect 2, wherein the one or more monitor plug connectors include one multi-fiber plug connector that receives all of the second ends of the fifth group.

Aspect 8. The optical cable assembly of any of Aspects 1-7, wherein each optical coupler includes only a single coupler input fiber.

Aspect 9. The optical cable assembly of any of Aspects 1-7, wherein each optical coupler includes a pair of coupler input fibers.

Aspect 10. The optical cable assembly of Aspect 1 or Aspect 2, wherein the input plug connectors are optically coupled to all of the input coupler fibers.

Aspect 11. A method of assembling an optical cable assembly including a plurality of optical couplers, each optical coupler having at least one coupler input fiber, a first coupler output fiber, and a second coupler output fiber, the method comprising:

laying a plurality of optical fibers into an adhesive layer on a substrate to form an optical circuit, each optical fiber extending from an unterminated first end to an unterminated second end, the optical circuit separating the unterminated first ends of the optical fibers into a plurality of groups including a first group and a second group, the optical circuit also separating the unterminated second ends of the optical fibers into another plurality of groups including a third group, a fourth group, and a fifth group;

splicing the first group of the unterminated first ends to free ends of at least some of the coupler input fibers;

splicing the second group of the unterminated first ends to free ends of at least some of the first and second coupler output fibers;

terminating the third group of the unterminated second ends to one or more input plug connectors to optically couple the one or more input plug connectors to at least some of the input coupler fibers;

terminating the fourth group of the unterminated second ends to one or more output plug connectors to optically couple the one or more output plug connectors to at least some of the output coupler fibers; and terminating the fifth group of the unterminated second ends to one or more monitor plug connectors to optically couple the one or more monitor plug connectors to others of the output coupler fibers;

removing the substrate from the optical circuit.

Aspect 12. The method of Aspect 11, wherein each optical coupler includes a pair of coupler input fibers.

Aspect 13. The method of Aspect 11, wherein the another plurality of groups also includes a sixth group; and wherein the method further comprises terminating the sixth group of the unterminated second ends to one or more second monitor plug connectors to optically couple the one or more second monitor plug connectors to others of the input coupler fibers.

Aspect 14. The method of Aspect 11, further comprising:

ribbonizing the free ends of the coupler input fibers prior to splicing the free ends of the coupler input fibers to the first group of the unterminated first ends; and ribbonizing the free ends of the first and second coupler output fibers prior to splicing the second group of the unterminated first ends to free ends of the first and second coupler output fibers.

Aspect 15. The method of Aspect 11, wherein the optical circuit separates the unterminated first ends of the optical fibers into the plurality of groups also including a seventh group and an eighth group; and wherein the method further comprises:

splicing the seventh group of the unterminated first ends to free ends of others of the coupler input fibers;

splicing the eighth group of the unterminated first ends to free ends of others of the first and second coupler output fibers.

What is claimed is:

1. An optical cassette comprising:

a body defining an interior and extending along a length between a first end and a second end, the body also having a width and a height, at least part of the interior of the body being separated into a first level and a second level along the height;
a first termination region defined at the first end of the body;
a second termination region defined at the second end of the body;
a cable routing region disposed at the first level of the body;
an optical splice holding region disposed at the second level of the body;
an optical coupler holding region disposed at the second level of the body;
a plurality of optical couplers disposed at the optical coupler holding region;
an optical circuit including a plurality of optical fibers, the optical circuit separating first ends of the plurality of optical fibers into groups that are optically spliced to input and output lines of the plurality of optical couplers, the optical circuit also separating second ends of the plurality of optical fibers into another plurality of groups;
an output connector disposed at the second termination region, the output connector terminating a respective one of the plurality of groups of the second ends of the plurality of optical fibers; and
a monitoring connector disposed at the second termination region, the monitoring connector terminating a respective one of the groups of the second ends of the plurality of optical fibers.

2. The optical cassette as claimed in claim 1, wherein the first and second levels are separated by a dividing tray that pivots relative to the body.

3. The optical cassette as claimed in claim 1, further comprising a cover that mounts to the body to close the interior.

4. The optical cassette as claimed in claim 1, further comprising:
a plurality of first optical adapters disposed at the first termination region; and
a plurality of second optical adapters disposed at the second termination region.

5. The optical cassette as claimed in claim 4, wherein the first optical adapters include single-fiber optical adapters.

6. The optical cassette as claimed in claim 4, wherein the second optical adapters include multi-fiber optical adapters.

7. The optical cassette as claimed in claim 1, wherein the plurality of optical couplers include unidirectional optical couplers.

8. The optical cassette as claimed in claim 1, wherein the plurality of optical couplers include bidirectional optical couplers each having a second coupler input.

9. The optical cassette as claimed in claim 1, wherein the cable routing region is configured to accommodate an optical splice.

10. The optical cassette as claimed in claim 1, wherein an optical cable assembly comprises a plurality of input connectors disposed at the first termination region, the plurality of input connectors terminating a respective one of the groups of the second ends of the plurality of optical fibers.

11. The optical cassette as claimed in claim 10, wherein the optical cable assembly is a first optical cable assembly, and wherein the optical cassette further comprises a second optical cable assembly disposed within the body, the second optical cable assembly including:
a plurality of second optical couplers disposed at the optical coupler holding region;
a second optical circuit including a plurality of second optical fibers, the second optical circuit separating first ends of the plurality of second optical fibers into groups that are optically spliced to input and output lines of the plurality of second optical couplers, the second optical circuit also separating second ends of the plurality of second optical fibers into a plurality of second groups;
a second output connector disposed at the second termination region, the second output connector terminating a respective one of the plurality of second groups of the second ends of the plurality of second optical fibers; and
a second monitoring connector disposed at the second termination region, the second monitoring connector terminating a respective one of the plurality of second groups of the second ends of the plurality of second optical fibers.

12. The optical cassette as claimed in claim 11, wherein the second termination region extends along a width of the body between a first side and a second side, and wherein both the monitoring connector and the second monitoring connector are located closer to the first side of the body than the output connector and the second output connector.

13. The optical cassette as claimed in claim 11, wherein the second optical cable assembly further comprises a plurality of second input connectors disposed at the first termination region, the second input connectors terminating a respective one of the groups of the second ends of the plurality of second optical fibers.

14. The optical cassette as claimed in claim 13, wherein the second termination region extends along a width of the body between a first side and a second side, and wherein the plurality of input connectors of the first optical cable assembly are disposed closer to the first side of the body than the plurality of second input connectors of the second optical cable assembly.

15. The optical cassette as claimed in claim 1, wherein the body of the optical cassette is mounted to a tray that is slidably mounted within a chassis.

16. A method of cabling an optical cassette with a cable assembly, the optical cassette having a length extending along a longitudinal axis between first and second ends of the optical cassette, a width extending between first and second sides of the optical cassette, and a height extending between a top and bottom of the optical cassette, the optical cassette being symmetrical along the longitudinal axis, the cable assembly including at least one optical coupler optically spliced to an output connector, at least a first monitoring connector, and at least a first input connector via multiple optical splices, the method comprising:
positioning the first input connector at the first end of the optical cassette and at the first side of the optical cassette;
positioning the output and monitoring connectors at the second end of the optical cassette and at the first side of the optical cassette;
grouping optical fibers terminated by the output and monitoring connectors with a first optical fiber terminating the first input connector to form a first fiber bundle and routing the first fiber bundle through a first cable management region disposed at the first side of the optical cassette between the first and second ends of the optical cassette;
routing the first fiber bundle onto a divider tray disposed above the first cable management region;
positioning at least two of the optical splices of the cable assembly on the divider tray; and positioning the at least one optical coupler of the cable assembly on the divider tray.

17. The method as claimed in claim 16, wherein the cable assembly is a first cable assembly, and wherein the method further comprises routing a second cable assembly within the optical cassette including:
- positioning a second input connector of the second cable assembly at the first end of the optical cassette and at the second side of the optical cassette;
- positioning output and monitoring connectors of the second cable assembly at the second end of the optical cassette and at the second side of the optical cassette;
- grouping optical fibers terminated by the output and monitoring connectors of the second cable assembly with a first optical fiber terminating the second input connector of the second cable assembly to form a second fiber bundle and routing the second fiber bundle through a second cable management region disposed at the second side of the optical cassette adjacent the first cable management region;
- routing the second fiber bundle onto the divider tray;
- positioning at least two optical splices of the second cable assembly on the divider tray; and
- positioning at least one optical coupler of the second cable assembly on the divider tray.

18. The optical cassette as claimed in claim 1, wherein the first termination region includes a first optical adapter defining a port facing outwardly from the body in a first direction and the second termination region includes a second optical adapter defining a port facing outwardly from the body in a second direction.

\* \* \* \* \*

UNITED STATES PATENT AND TRADEMARK OFFICE
CERTIFICATE OF CORRECTION

PATENT NO. : 11,249,269 B2
APPLICATION NO. : 16/540681
DATED : February 15, 2022
INVENTOR(S) : Scott C. Sievers It is certified that error appears in the above-identified patent and that said Letters Patent is hereby corrected as shown below:

On the Title Page

Item [60], delete "Aug. 14, 2019." should read --Aug. 14, 2018.--

Signed and Sealed this
Twenty-first Day of June, 2022

Katherine Kelly Vidal
*Director of the United States Patent and Trademark Office*